(12) United States Patent
Smith et al.

(10) Patent No.: US 9,096,282 B2
(45) Date of Patent: Aug. 4, 2015

(54) RIG WITH DRAWWORKS AND HOISTING DEVICE

(71) Applicants: Shawn R. Smith, Hillsboro, OR (US); Harlan B. Smith, Hillsboro, OR (US)

(72) Inventors: Shawn R. Smith, Hillsboro, OR (US); Harlan B. Smith, Hillsboro, OR (US)

(73) Assignee: Entro Industries, Inc., Hillsboro, OR (US)

( * ) Notice: Subject to any disclaimer, the term of this patent is extended or adjusted under 35 U.S.C. 154(b) by 0 days.

(21) Appl. No.: 13/909,969

(22) Filed: Jun. 4, 2013

(65) Prior Publication Data

US 2014/0158342 A1 Jun. 12, 2014

Related U.S. Application Data

(66) Continuation-in-part of application No. 13/711,193, filed on Dec. 11, 2012, now Pat. No. 8,573,334, and a continuation-in-part of application No. 13/711,269, filed on Dec. 11, 2012, now Pat. No. 8,561,733, and a continuation-in-part of application No. 13/711,315, filed on Dec. 11, 2012, now Pat. No. 8,490,724, Substitute for application No. 61/576,657, filed on Dec. 16, 2011.

(60) Provisional application No. 61/757,517, filed on Jan. 28, 2013.

(51) Int. Cl.
*B62D 51/06* (2006.01)
*B62D 57/032* (2006.01)
*B62D 57/02* (2006.01)
*E21B 15/00* (2006.01)

(52) U.S. Cl.
CPC .............. *B62D 57/032* (2013.01); *B62D 57/02* (2013.01); *E21B 15/003* (2013.01)

(58) Field of Classification Search
CPC ........................... B62D 57/022; B62D 57/028
USPC ............................... 180/8.1, 8.5, 8.6; 175/203
See application file for complete search history.

(56) References Cited

U.S. PATENT DOCUMENTS

| | | | | | |
|---|---|---|---|---|---|
| 1,001,299 | A | * | 8/1911 | Page .............................. | 180/8.1 |
| 1,879,446 | A | * | 9/1932 | Page .............................. | 180/8.5 |
| 2,132,184 | A | * | 10/1938 | Poche ........................... | 180/8.5 |
| 2,259,200 | A | * | 10/1941 | Cameron et al. .............. | 180/8.5 |
| 2,541,496 | A | * | 2/1951 | Busick, Jr. et al. ............ | 180/8.5 |
| 2,914,127 | A | * | 11/1959 | Ricouard ....................... | 180/8.5 |
| 3,576,225 | A | * | 4/1971 | Chambers ..................... | 180/8.5 |
| RE29,541 | E | * | 2/1978 | Russell .......................... | 175/52 |
| 4,135,340 | A | * | 1/1979 | Cox et al. ....................... | 52/115 |

(Continued)

OTHER PUBLICATIONS

Entro Industries, Inc. brochure "The Future of Rig Walkers", Jun. 2012, 4 pages.

(Continued)

*Primary Examiner* — Joseph Rocca
*Assistant Examiner* — Conan Duda
(74) *Attorney, Agent, or Firm* — Stolowitz Ford Cowger LLP

(57) ABSTRACT

A rig includes a base structure in contact with an operating surface and configured to support the rig on the operating surface. A transportation system is operatively coupled to the base structure and is configured to position the rig over an extraction point. A raised platform is connected to the base structure by a plurality of support beams. A hoisting device is connected to the raised platform. A drawworks is supported on the base structure and is operatively connected to the hoisting device.

22 Claims, 72 Drawing Sheets

(56) References Cited

U.S. PATENT DOCUMENTS

| | | | | |
|---|---|---|---|---|
| 4,290,495 | A * | 9/1981 | Elliston | 175/85 |
| 4,296,820 | A * | 10/1981 | Loftis | 175/52 |
| 4,371,041 | A * | 2/1983 | Becker et al. | 173/28 |
| 4,759,414 | A * | 7/1988 | Willis | 175/170 |
| 4,821,816 | A * | 4/1989 | Willis | 175/57 |
| 4,823,870 | A * | 4/1989 | Sorokan | 166/79.1 |
| 4,831,795 | A * | 5/1989 | Sorokan | 52/120 |
| 5,248,005 | A * | 9/1993 | Mochizuki | 175/85 |
| 5,492,436 | A * | 2/1996 | Suksumake | 405/201 |
| 5,794,723 | A * | 8/1998 | Caneer et al. | 175/85 |
| 5,921,336 | A * | 7/1999 | Reed | 180/8.1 |
| 6,581,525 | B2 | 6/2003 | Smith | |
| 7,182,163 | B1 * | 2/2007 | Gipson | 180/8.1 |
| 7,308,953 | B2 * | 12/2007 | Barnes | 175/203 |
| 8,250,816 | B2 * | 8/2012 | Donnally et al. | 52/123.1 |
| 8,468,753 | B2 * | 6/2013 | Donnally et al. | 52/117 |
| 8,556,003 | B2 * | 10/2013 | Souchek | 175/162 |
| 2004/0211598 | A1 * | 10/2004 | Palidis | 175/162 |
| 2006/0027373 | A1 * | 2/2006 | Carriere et al. | 166/379 |
| 2009/0200856 | A1 * | 8/2009 | Chehade et al. | 299/30 |
| 2009/0283324 | A1 * | 11/2009 | Konduc et al. | 175/57 |
| 2011/0114386 | A1 * | 5/2011 | Souchek | 175/52 |

OTHER PUBLICATIONS

Columbia Industries LLC brochure "Kodiak Cub Rig Walking System", 2009, 4 pages.

\* cited by examiner

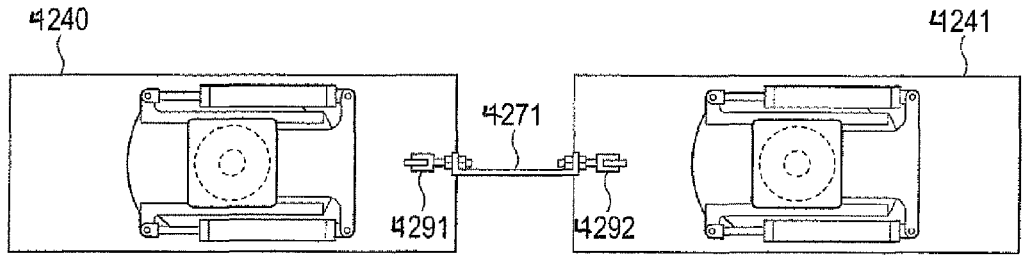
FIG. 31A
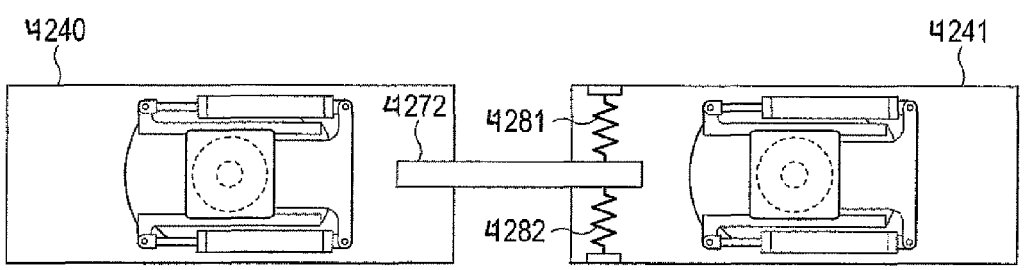
FIG. 31B
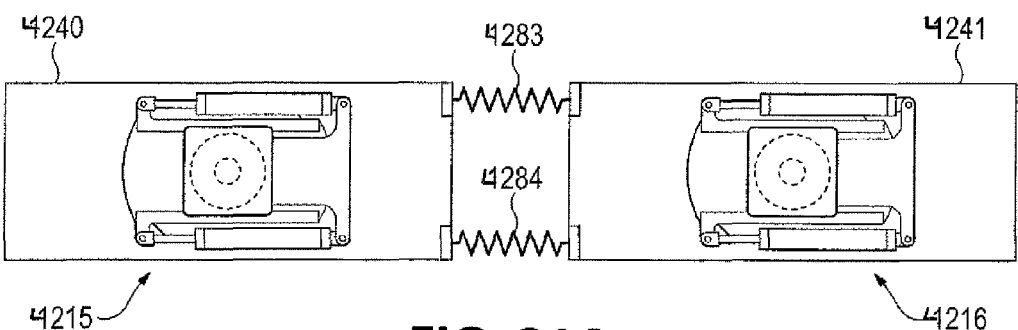
FIG. 31C
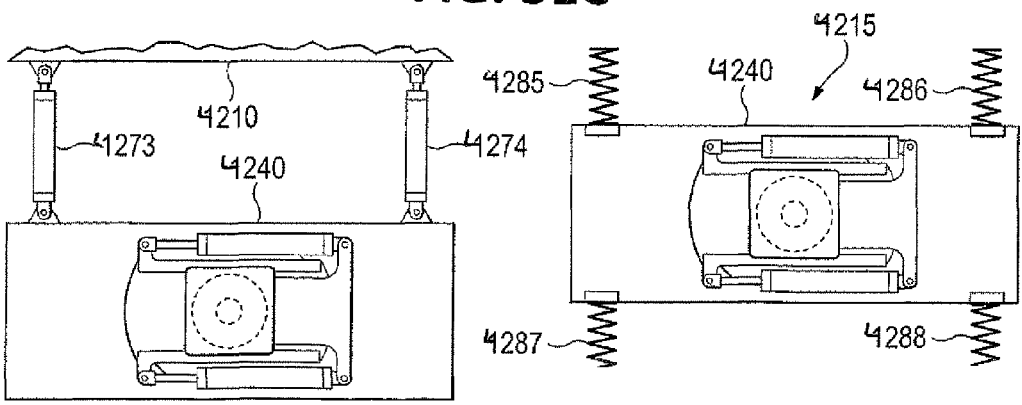
FIG. 31D
FIG. 31E

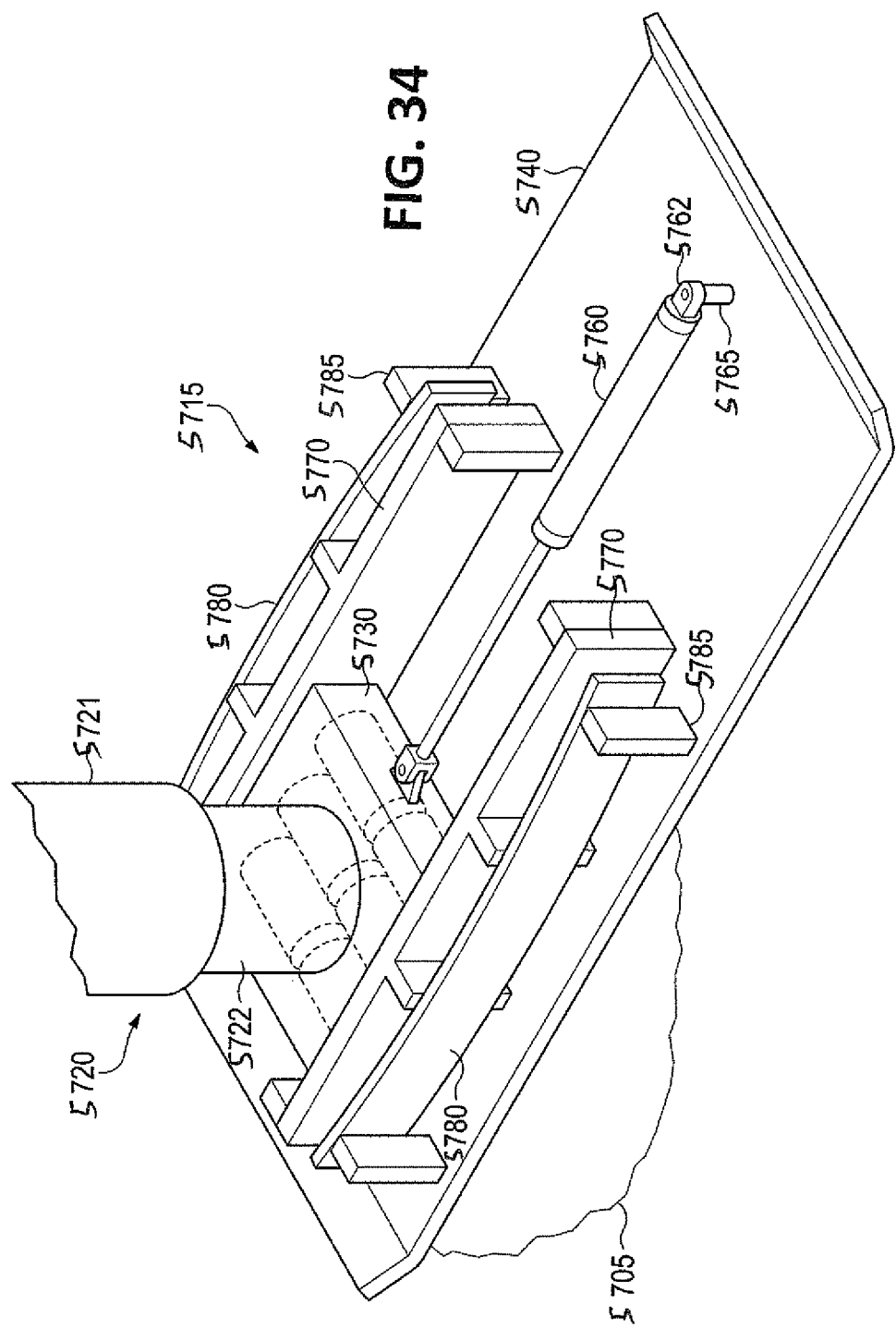

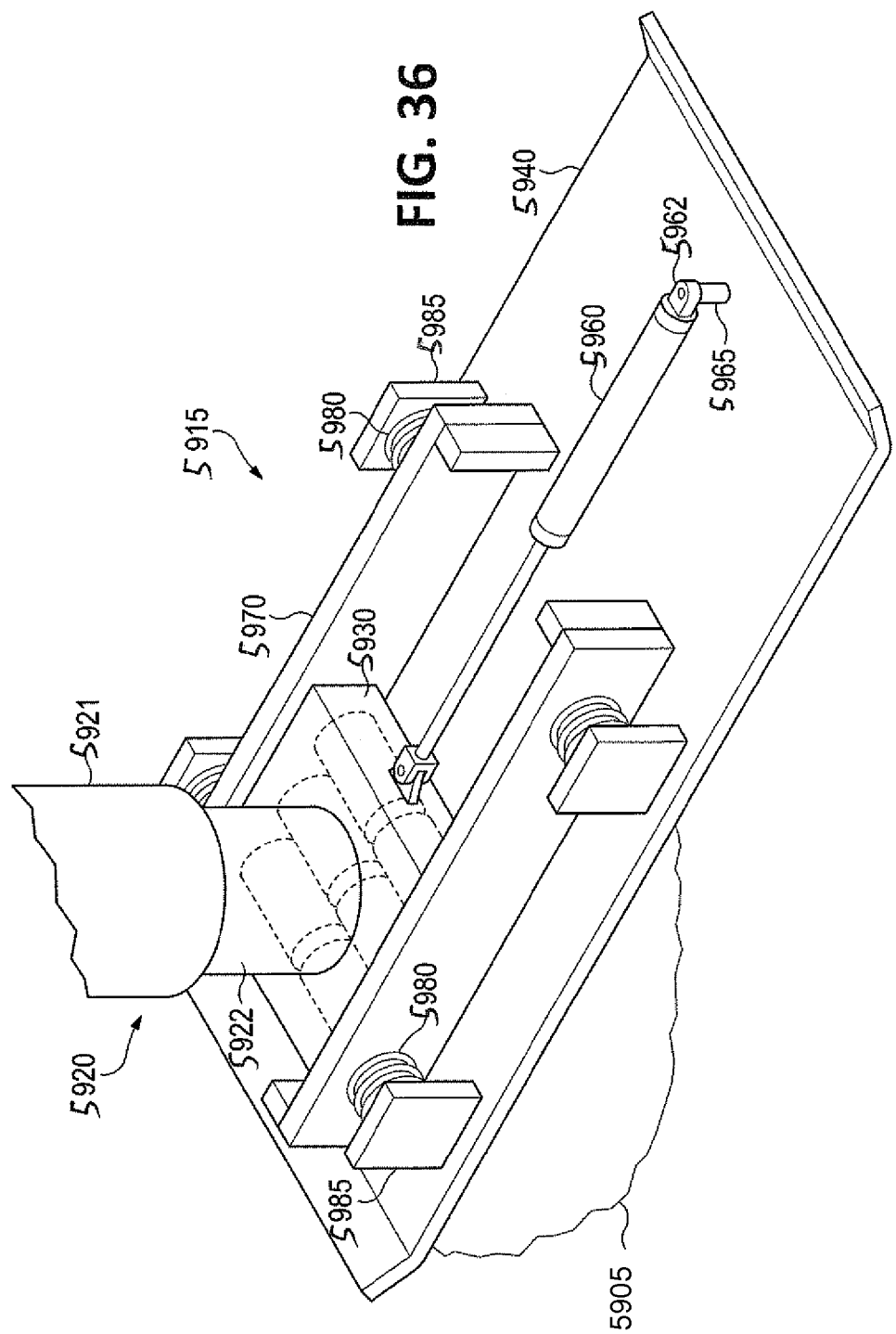

RIG WITH DRAWWORKS AND HOISTING DEVICE

RELATED APPLICATIONS

This application claims priority to U.S. Provisional Application No. 61/757,517, filed Jan. 28, 2013. This application is a continuation-in-part of U.S. patent application Ser. No. 13/711,193, filed Dec. 11, 2012, now U.S. Pat. No. 8,573,334, issued Nov. 5, 2013, which claims priority to U.S. Provisional Application No. 61/576,657, filed Dec. 16, 2011, the contents of which are hereby incorporated by reference in their entireties. This application is a continuation-in-part of U.S. patent application Ser. No. 13/711,269, filed Dec. 11, 2012, now U.S. Pat. No. 8,561,733, issued Oct. 22, 2013, which claims priority to U.S. Provisional Application No. 61/576,657, filed Dec. 16, 2011, the contents of which are hereby incorporated by reference in their entireties. This application is a continuation-in-part of U.S. patent application Ser. No. 13/711,315, filed Dec. 11, 2012, now U.S. Pat. No. 8,490,724, issued Jul. 23, 2013, which claims priority to U.S. Provisional Application No. 61/576,657, filed Dec. 16, 2011, the contents of which are hereby incorporated by reference in their entireties.

FIELD OF THE INVENTION

This disclosure relates generally to apparatuses for transporting a load, and more particularly to apparatuses for moving heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled pipes in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Reed and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, this disclosed system in the '525 patent does not allow for movement of heavy load in a direction perpendicular to the long axis of the support beams. That is, movement of the heavy load is restricted in the walking device disclosed in the '525 patent to only particular directions, which can make fine tuning of the position of the heavy load difficult.

SUMMARY

Apparatuses for transporting loads, where the apparatuses are structured to steer the loads in order to efficiently move the loads between set positions. A load transporting apparatus is capable of being steered while transporting a load across a base surface is provided. The load transporting apparatus includes a roller track configured to support movement of a roller assembly, and a support foot that is connected to the roller track with a pin connector. During load transport, the support foot can be maintained in a substantially similar position relative to a frame structure supporting the load even when the transport movement is not in a parallel direction to the orientation of the support foot.

A load transporting apparatus that automatically aligns a support foot of the apparatus with a load-bearing frame connected to the load transporting apparatus during a recovery phase of an incremental walking movement. In particular, the load transporting apparatus includes a linking device attached to a support foot of the apparatus and a biasing device connected to the linking device that is deflected during non-linear load transporting movements, where the biasing device acts to automatically return the support foot to an aligned position relative to the load-bearing frame after a non-linear movement has been completed and the support foot is raised above a ground surface.

A load transporting apparatus that automatically centers a support foot of the apparatus about a roller assembly during a recovery phase of an incremental walking movement. In particular, the load transporting apparatus includes guide devices positioned adjacent to a roller assembly that deflect a biasing device during non-linear load transporting movements, where the biasing device acts to automatically return the support foot to a centered position relative to the roller assembly after a non-linear movement has been completed and the support foot is raised above a ground surface.

BRIEF DESCRIPTION OF THE DRAWINGS

FIG. 24 is a flow diagram illustrating processes used to operate a walking apparatus according to.

FIGS. 27A, 27B, 27C, and 28D are side and top views of walking apparatuses that illustrate an example operation progression of a load transporting system.

FIGS. 31A, 31B, 31C, 31D, and 31E are diagrams of walking apparatuses with various alignment restoration devices.

FIG. 34 is a perspective view of an example walking apparatus.

FIG. 36 is a perspective view of another example walking apparatus.

DETAILED DESCRIPTION

As described above, walkers, or walking machines, are vehicles that are used for transporting very heavy loads, such as entire oil well drilling rigs. Such loads may be as great as several thousand tons and may be required to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
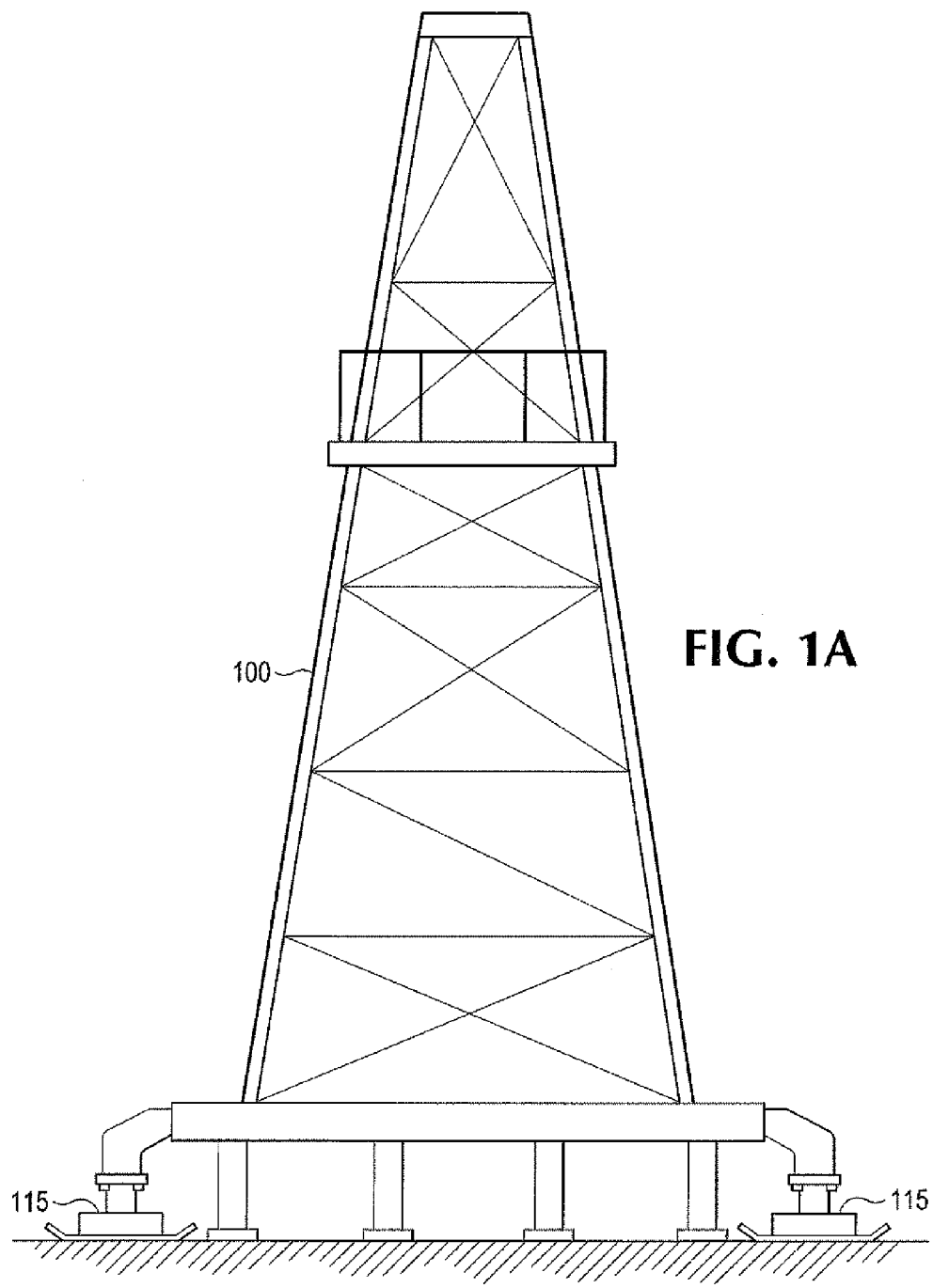
FIGS. 1A and 1B are diagrams of walking apparatuses attached to various loads.
Figure 1B:
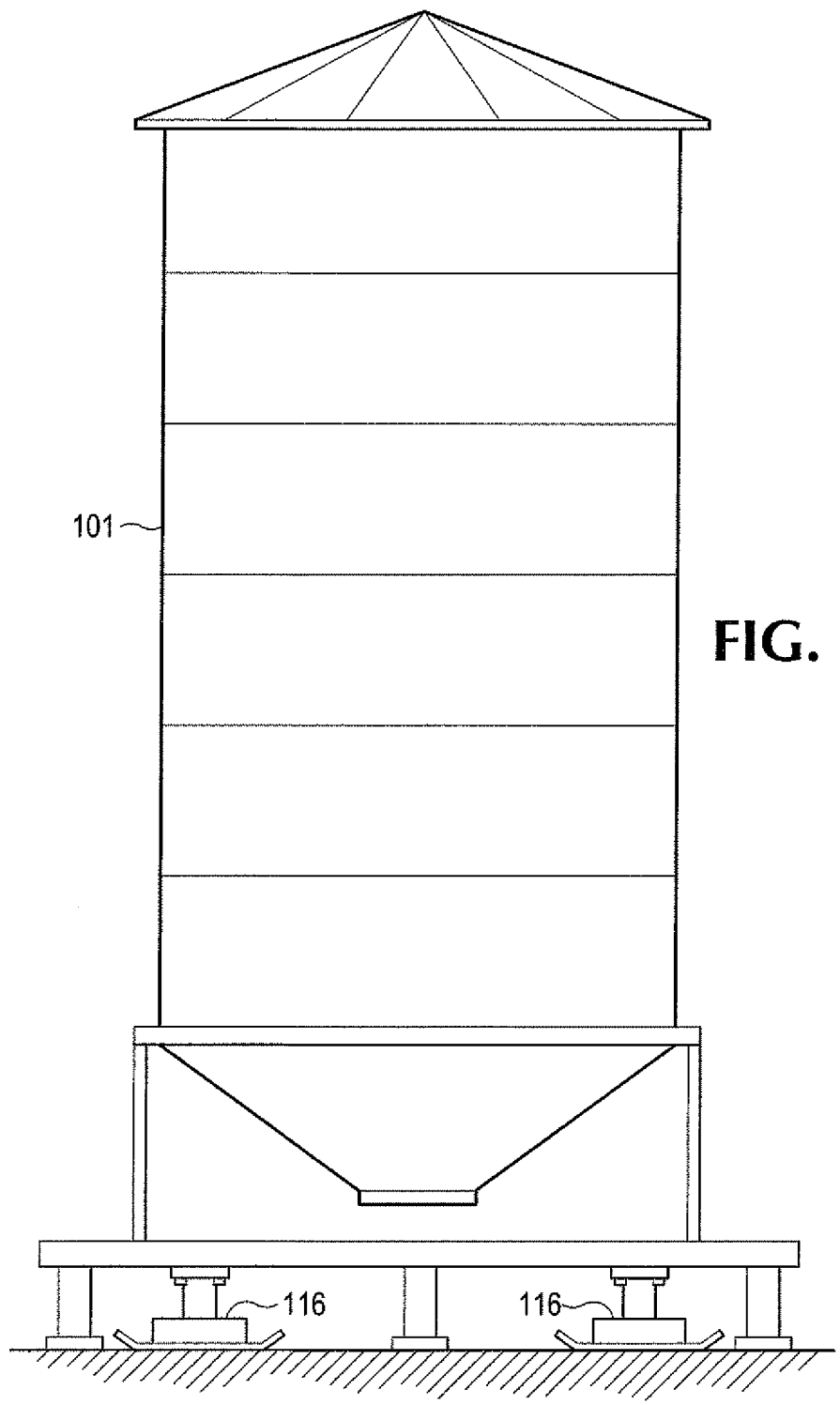

For example, with reference FIGS. 1A and 1B, a load transporting system includes multiple walking machines that support a load being carried by the load transporting system. FIGS. 1A and 1B show examples of walking apparatuses attached to various loads. Referring to FIG. 1A, multiple walking apparatuses 115 are positioned under or adjacent to an oil rig 100. Typically, walking machines 115 are positioned at least near edge portions of a load 100 to balance the weight of the load over the various walking machines. However, specific situations may dictate that walking machines 115 are positioned in various other locations relative to the load 100.

Referring to FIG. 1B, multiple walking apparatuses 116 are positioned under or adjacent to a silo 101. Although an oil rig load 100 and a silo 101 are respectively illustrated in FIGS. 1A and 1B, walking machines may be used to move any type of relatively large load, such as bridge sections, ship sections, structures, etc. Additionally, although two walking machines are shown in FIGS. 1A and 1B, more or fewer walking machines may be used to move loads 100, 101.

Figure 2A:
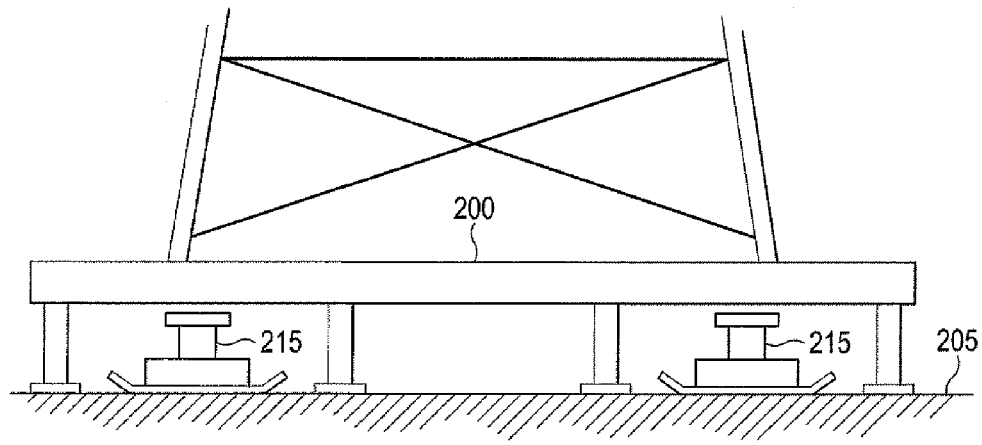
FIGS. 2A, 2B, 2C, 2D, 2E, and 2F are detail diagrams showing an example operational progression of walking apparatuses to move a load.
Figure 2B:
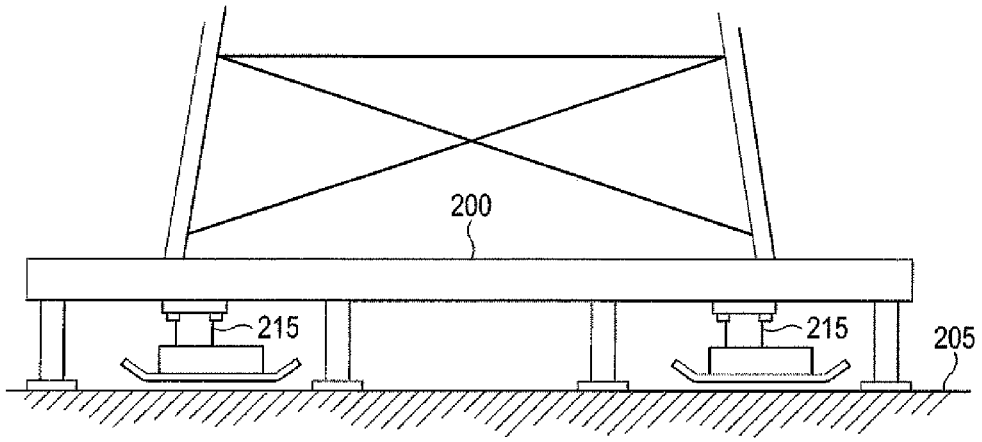
Figure 2C:
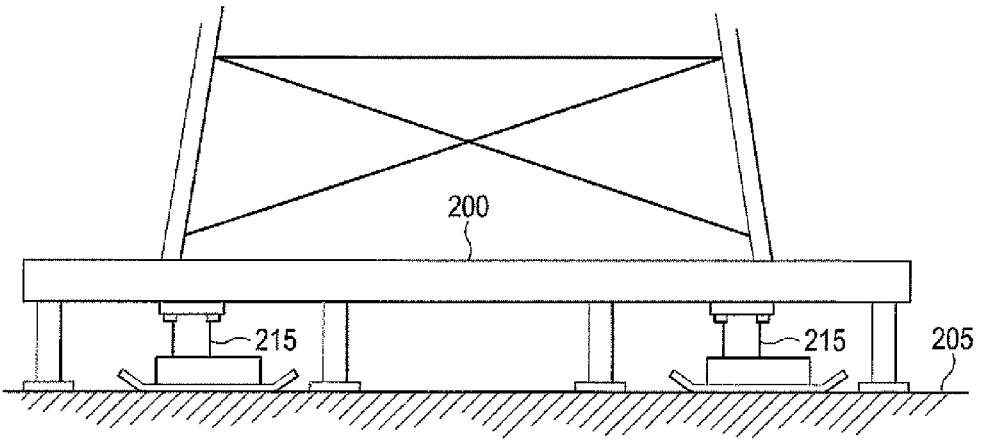

FIGS. 2A-2F provide an overview of an example operation of walking apparatuses to move a load. Referring to FIGS. 2A, walking apparatuses 215 are positioned on a base surface 205 below or adjacent to a load 200. Referring to FIG. 2B, the walking apparatuses 215 are attached to the load 200, and are positioned above a base surface 205. As described below, there are many possible connection variations that can be used to connect the walking apparatuses to a load 200. Referring to FIG. 2C, the walking apparatuses 215 are operated so that a foot portion of the walking apparatus contacts the base surface 205. The walking apparatuses 215 may be operated substantially simultaneously, or may be operated in intervals depending on the conditions of the base surface 205 and the load 200 that is to be moved.

Figure 2D:
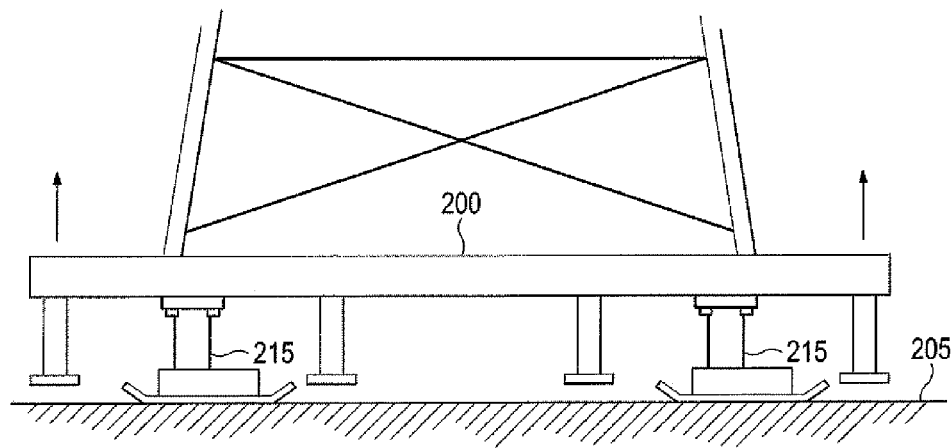

Referring to FIG. 2D, the walking apparatuses 215 are operated to lift the load 200 above the base surface 205. The walking apparatuses 215 may again be operated substantially simultaneously to lift the load 200, or may be operated in intervals depending on the conditions associated with the desired move.

Figure 2E:
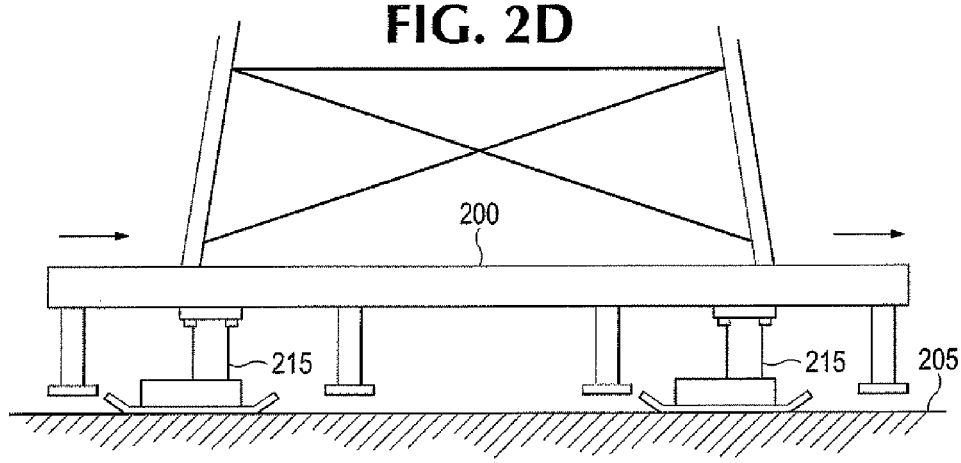
Figure 2F:
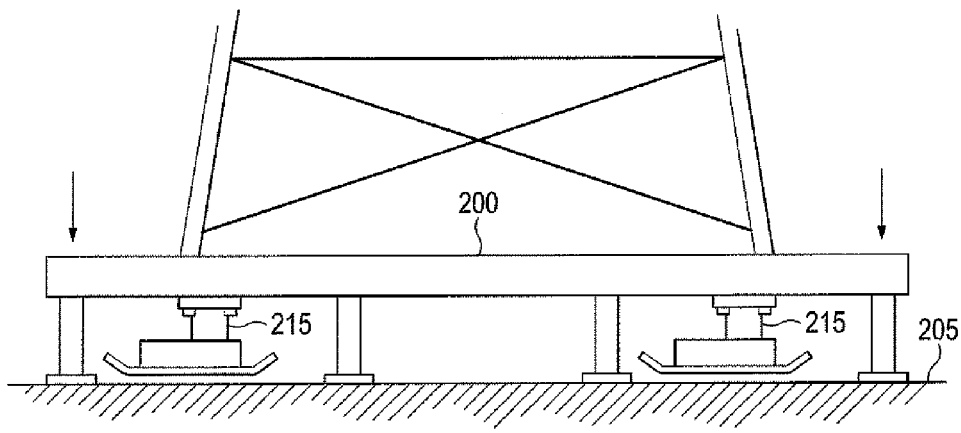

Referring to FIG. 2E, the walking apparatuses 215 are operated to move the load 200 to the right. Although FIG. 2E shows the load 200 being moved to the right, the walking apparatuses can be operated to move the load in a variety of directions depending on the desired final location of the load. Referring to FIG. 2F, the walking apparatuses 215 are operated to lower the load 200 to the base surface 205 and to raise the foot portions of the walking apparatuses above the base surface. That is, after the load 200 is positioned on the base surface 205, the walking apparatuses 215 are further operated so that they are raised above the base surface. Here, the connection between the walking apparatuses 215 and the load 200 support the walking apparatuses 215 when they are raised above the base surface 205. After the walking apparatuses 215 are raised above the base surface 205, they are further operated to be repositioned for another movement walking step, such as by moving the foot portions of the walking apparatuses to the right so that they are in a position as shown in FIG. 2B. That is, the base surface touching part of the walking apparatuses 215 (e.g., the support foot and related structures) is moved to the right while the walking apparatuses 215 are raised above the base surface 205. After the walking apparatuses 215 have been repositioned, they are operated to be lowered to the base surface 205 as shown in FIG. 2C. This completes a single walking cycle, and further walking cycles or steps can be performed by repeating the steps described above with respect to FIGS. 2B to 2F.

Figure 3A:
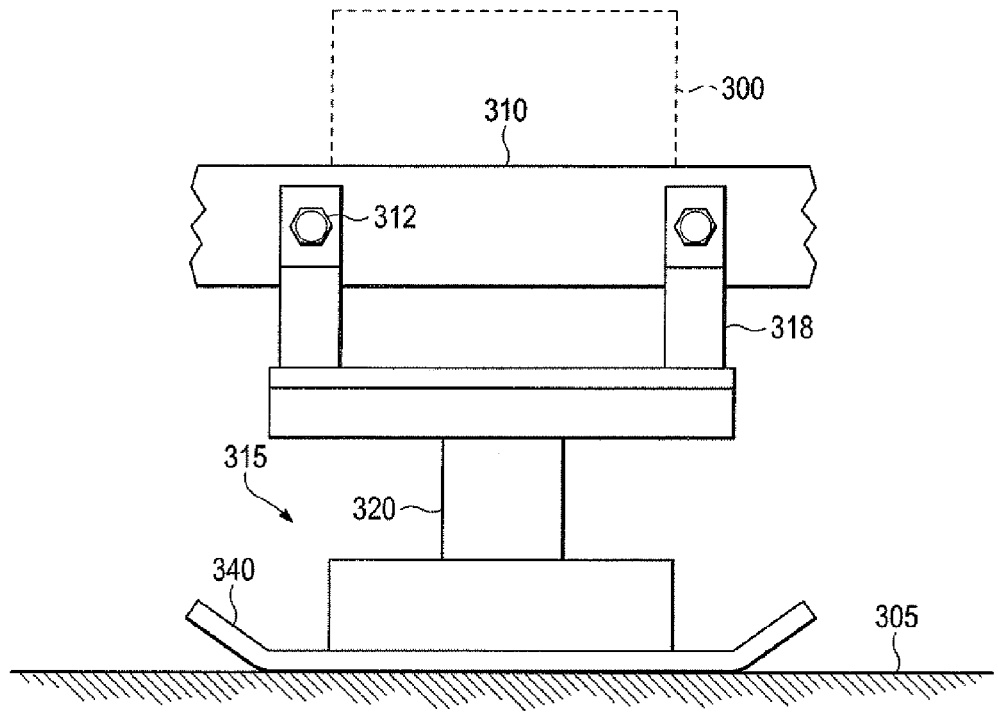
FIGS. 3A and 3B are diagrams illustrating example connection arrangements used to connect a walking apparatus to a load.
Figure 3B:
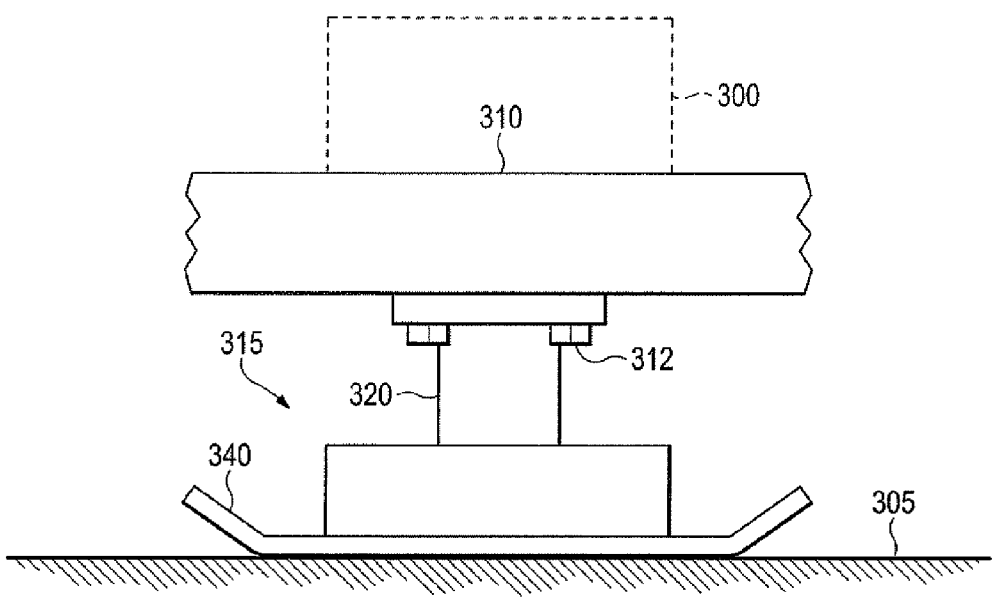

As mentioned above, walking apparatuses can be connected to loads in a variety of ways depending on the specific conditions surrounding the load. FIGS. 3A and 3B illustrate two such connection schemes. Although two connection schemes are illustrated in FIGS. 3A and 3B, the examples are not limited to such connection schemes, as many different connection variations exist and are included in the scope of this concept.

Referring to FIG. 3A, a walking apparatus 315 includes a support foot 340 to interface with a base surface 305 and a lift mechanism 320 to raise and lower a load 300. In the embodiment shown in FIG. 3A, the lift mechanism 320 of the walking apparatus 315 is attached to a connection frame 318, which in turn is bolted to framework 310 supporting the load 300 with bolts 312 or other connection mechanisms. In some embodiments, the connection frame 318 may be part of the walking apparatus 315 and in some instances, may be permanently welded, bolted, or otherwise connected to the lift mechanism 320 of the walking apparatus. In other embodiments, the connection frame 318 may be separate from the walking apparatus 315, and may only be temporarily used with the walking apparatus in certain situations. In these embodiments, for example, multiple different connection frames 318 may be built or used with specific load conditions or specifications.

FIG. 3B shows different embodiments where the portions of a lift mechanism 320 of a walking apparatus 315 are directly connected to a support frame 310 structured to support a load 300 with bolts 312 or other connection mechanisms. The support frame 310 may be considered part of the load 300 in some instances where it is a permanent part of the load structure. For example, in instances where the load is a silo, such as shown in FIG. 1B, the metal frame of the silo may be considered the support frame 310 of the load 300, while also being part of the silo, and hence part of the load. In other cases, the support framework 310 may be an ancillary structure that is only used to stabilize and support the load 300 during movement of the load.

Figure 4:
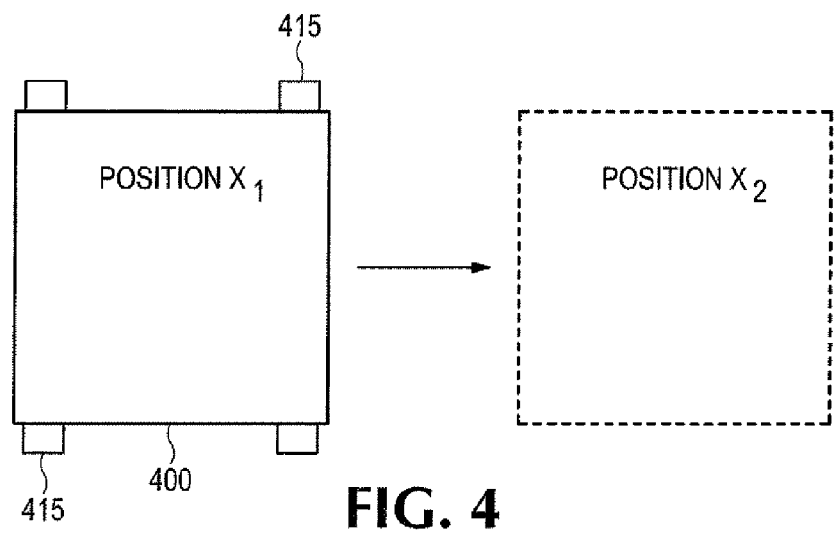
FIG. 4 is a schematic diagram illustrating movement of a load along a substantially linear path.

FIG. 4 is a schematic diagram illustrating movement of a load along a substantially linear path. Referring to FIG. 4, a load 400 is connected to multiple walking apparatuses 415, which are used to move the load from an initial position $X_1$ to a final position $X_2$ along a substantially linear path. Here, that path is a horizontal path moving from left to right. This type of basis linear movement can be accomplished by a variety of walking systems.

Figure 5:
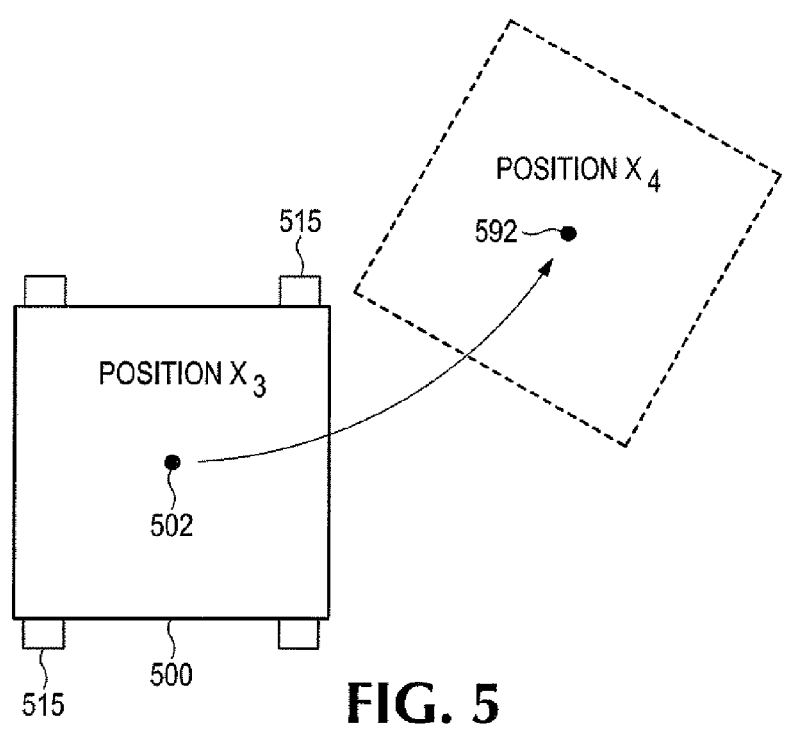
FIG. 5 is a schematic diagram illustrating movement of a load along a curved path.

FIG. 5 is a schematic diagram illustrating movement of a load along a curved path. Referring to FIG. 5, a load 500 is connected to multiple walking apparatuses 515, which are used to move the load from an initial position $X_3$ to a final position $X_4$ along a non-linear path. Here, a reference center-point 502 of the load 500 at the initial position $X_3$ is moved to a reference center-point 592 of the load 500 at the final position $X_4$. Unlike the linear movement shown in FIG. 4, this curved path of travel shown in FIG. 5 requires that the walking apparatuses be steered, which can be accomplished using embodiments of the inventive walking apparatuses described below.

Figure 6A:
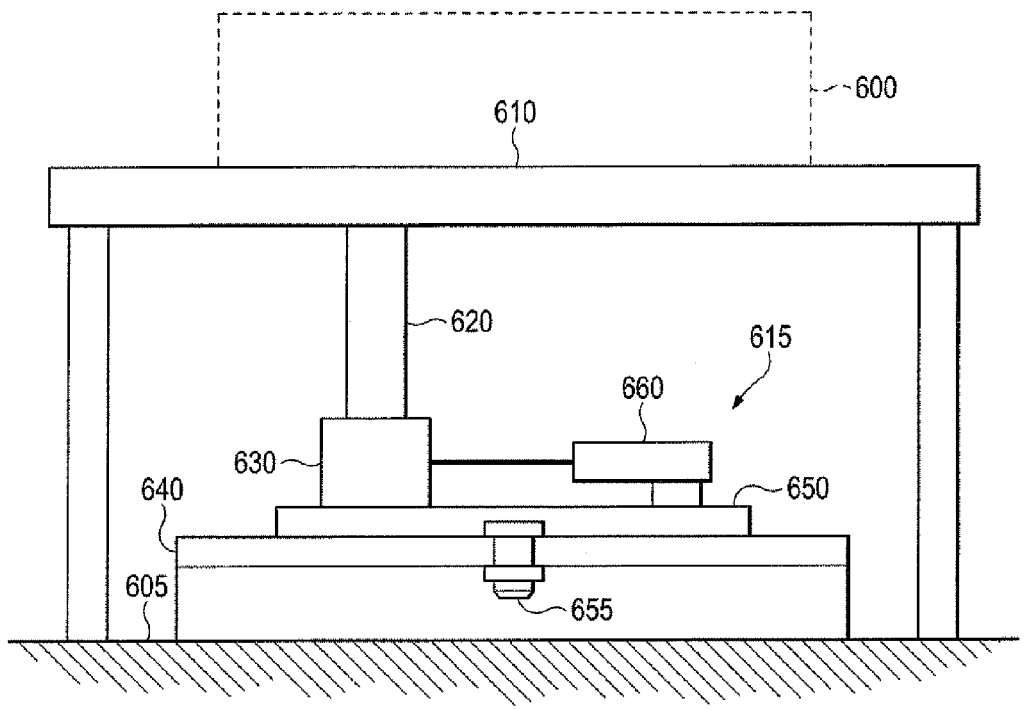
FIG. 6A is a schematic diagram of a side view of a walking apparatus.
Figure 6B:
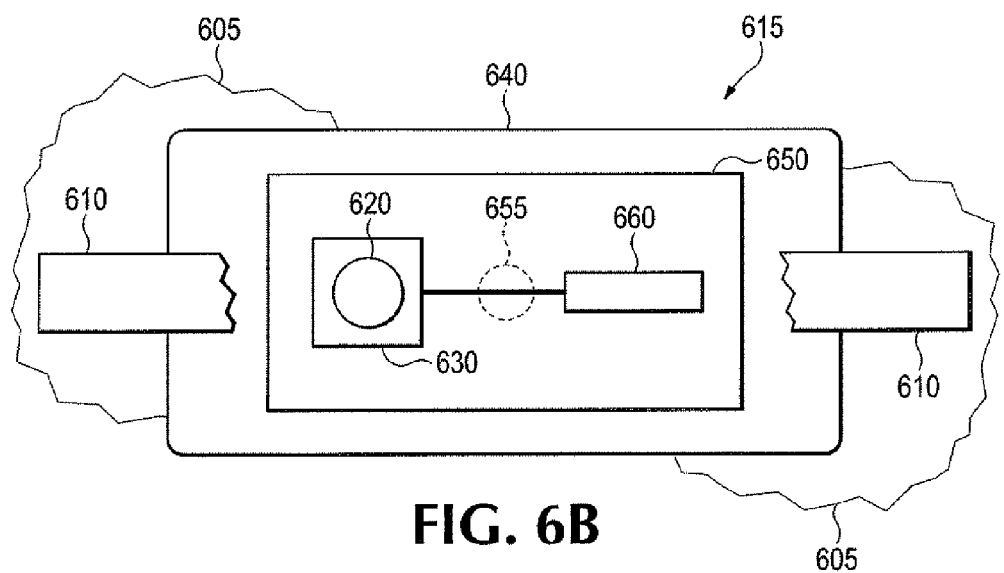
FIG. 6B is a schematic diagram of a top view of a walking apparatus.

FIGS. 6A and 6B are schematic side and top views of a walking apparatus. Referring to FIGS. 6A and 6B, a load transporting apparatus 615 is shown that is configured to move a load 600 over a base surface 605 in one or more incremental steps, each including a load-movement phase and a recovery phase. The load transporting apparatus 615 includes a lift mechanism 620 structured to lift a load-bearing frame 610 supporting the load 600, and a roller assembly 630 coupled to the lift mechanism. A roller track 650 is connected to the roller assembly 630 and configured to allow the roller assembly to move over the roller track in a first direction. The load transporting apparatus 615 also includes a travel mechanism 660 coupled to the roller track 650 and connected to the roller assembly 630, the travel mechanism structured to displace the roller assembly relative to the roller track along the first direction. A support foot 640 is also included in the load transporting apparatus 615. The support foot 640 is positioned below the roller track 650, and is structured to interface with the base surface 605. A pin connector 655 is used to connect the support foot 640 with the roller track 650, and is structured to allow the roller track to rotate relative to the support foot.

In these embodiments, the roller track 650 is separate from, but connected to the support foot 640 that contacts the base surface 605. As discussed above, the support foot 640 is connected to the roller track 650 with a pin connector 655, which allows the roller track to rotate relative to the support foot. This means that the support foot 640 can be oriented in a first direction while the roller track 650 is oriented in a second direction. As discussed in more detail below, this ability to vary the orientations of the roller track 650 and support foot 640 allows the load supporting apparatus 615 to be precisely steered, which in turn allows a load 600 to be moved more efficiently between locations.

In some embodiments, the pin connector 655 is a king pin connector that allows rotation about an axis in one degree of freedom, while limiting movement in other planes of travel. In some embodiments, the pin connector may further include a bearing (not shown) to facilitate smooth rotational movements. However, because of the heavy weight associated with the loads 600 being moved by the walking apparatus 615, other embodiments do not have a bearing to prevent damage to the internal structure of a bearing.

Figure 7A:
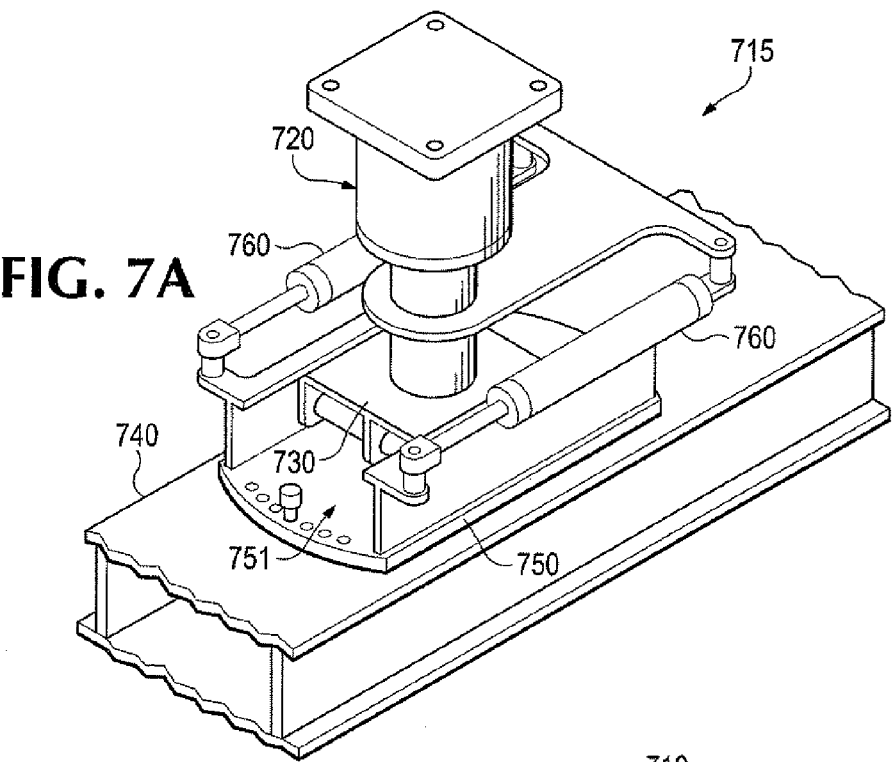
FIG. 7A is a perspective view of a walking apparatus.
Figure 7B:
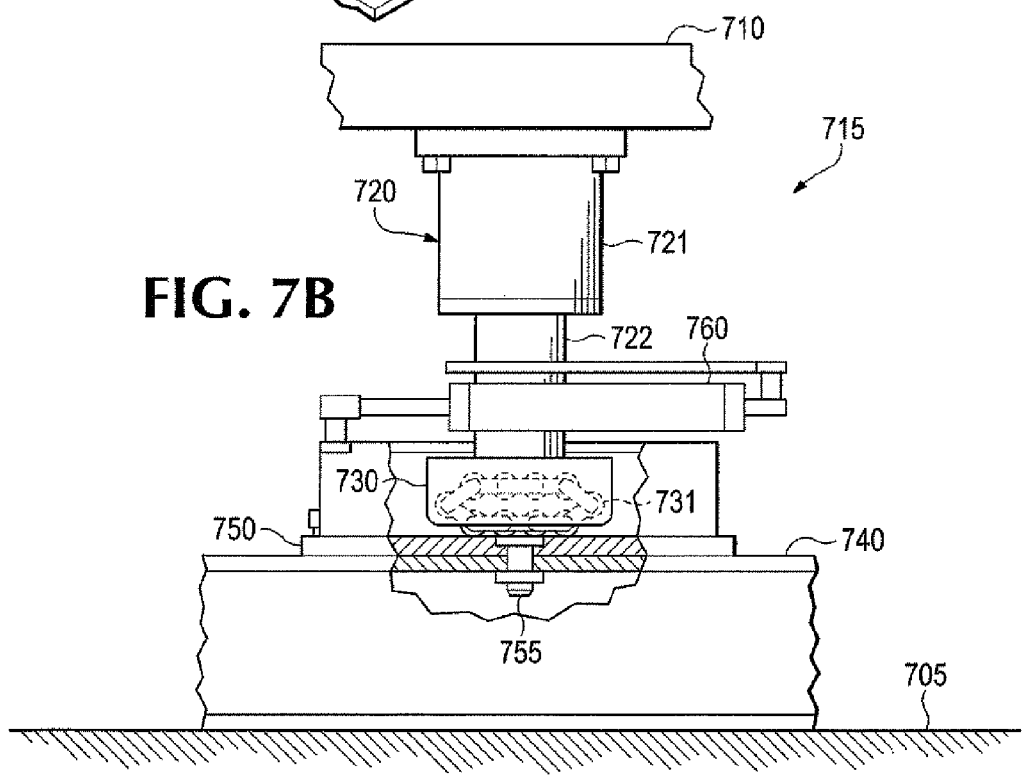
FIG. 7B is a side view of the walking apparatus shown in FIG. 7A.

FIGS. 6A and 6B are presented in a schematic style view as many possible variations in the appearance and mechanical structure of the load transporting apparatus 615 exist. FIGS. 7A and 7B provide a more detailed view of one embodiment of a load transporting apparatus. FIG. 7A is a perspective view of a walking apparatus. FIG. 7B is a side view of the walking apparatus shown in FIG. 7A. Referring to FIGS. 7A and 7B, a load transporting or walking apparatus 715 includes a lift mechanism 720, a roller assembly 730, a roller track 750, and a support foot 740. The lift mechanism 720 may include a hydraulic jack suspended from a horizontal beam of the load-bearing frame 710.

The lift mechanism 720 may include a lift cylinder 721 that is connected to a load-bearing frame 710, and a cylinder rod 722 coupled to the roller assembly 730. Here, the cylinder rod 722 may be structured to allow the roller assembly 730 to rotate about a substantially vertical axis in the center of the cylinder rod. That is, the roller assembly 730 may be free to rotate around the cylinder rod 722. The connection between the roller assembly 730 and the cylinder rod may be a bearing or one of a number of different connection variations. In one embodiment, the cylinder rod 722 may include a groove (not shown) around side edges of a lower portion of the cylinder rod, where the groove corresponds to a retainer cuff (not shown) of the roller assembly 730. In this example the retainer cuff is rotatable around the groove, but may easily be assembled or disassembled during installation, break-down, or transportation of the walking apparatus 715.

Although the embodiment shown in FIGS. 7A and 7B show the lift cylinder 721 connected to the load bearding frame 710 and the cylinder rod 722 connected to the roller apparatus 730, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 715 may also include a travel mechanism 760 that is connected to the roller track 750 and coupled to the roller assembly 730 such that when the travel mechanism is activated, the roller assembly moves relative to the roller track. In the embodiment shown in FIGS. 7A and 7B, the travel mechanism 760 includes two travel cylinders mounted on the roller track 750 on opposite sides of the roller track. Here, the travel cylinders of the travel mechanism 760 may balance the load being moved by the roller assembly 730 over the roller track 750. In other embodiments, one travel cylinder, or three or more travel cylinders may be used to move the roller assembly 730 relative to the roller track 750. In other embodiments, the travel mechanism 760 may include different movement structures, such as pulleys, levers, winches, tracks, etc.

In the embodiments shown in FIGS. 7A and 7B, the roller assembly 730 may include a plurality of rollers or roller chain 731 that rotate as well as roll on the roller track 750. That is, in some embodiments, the roller assembly 730 may include a WBOT series roller assembly from Hilman Rollers, such as shown in FIG. 7B. Due to the configuration of the roller chain 731 of the roller assembly 730 and the tolerance between the roller assembly and the roller track 750 of the walking machine 715, the rollers of the roller chain will typically be engaged with the roller track during operation and use of the walking machine.

As discussed above, the roller assembly 730 may be secured to the lower end of the cylinder rod 722, with the roller assembly being captured within a U-shaped roller track 750 as shown in FIG. 7A. The roller assembly 730 may be configured to roll along the bottom inside surface of the roller track 750 as well as along the underside of the two upper flanges of the roller track. The one or more travel cylinders 760 may be coupled between the cylinder rod 722 and the roller track 750. Accordingly, as will be understood from the more detailed discussion below, these travel cylinders 760 permit for the translation of the roller track 750 relative to the lift mechanism 720 and vice versa. The roller track 750 may be secured to an elongate ground-engaging foot 740 (support foot) via a rotational pin 755, which enables the roller track to be rotationally positioned relative to the foot for steering of the walking machine 715.

In some embodiments, the roller track 750 may include travel slots 751 structured to connect the roller assembly 730 to the roller track 750. Here, the travel slots 751 may be configured to allow substantially linear movement of the roller assembly 730 across the roller track 750.

As also shown in the co-pending applications, a walking apparatus 715 may also include one or more linking devices coupled to the support foot 740. One or more biasing devices may be coupled to the linking devices, where the biasing devices are structured to become activated during a load-movement phase when the roller assembly 730 travels in a direction that is not parallel or perpendicular to a lengthwise direction that the support foot 740 is oriented, and structured to return the support foot to an aligned position relative to the load-bearing frame 710 during a recovery phase.

In some embodiments, the one or more biasing devices may become activated when an angular displacement occurs between the support foot 740 and the load-bearing frame 710, where the activation of the one or more biasing devices includes a torquing force being applied to the one or more biasing devices. In other embodiments, the linking devices may be structured to be connected to at least one other load transporting apparatus.

As also shown in the co-pending applications, a walking apparatus 715 may also include one or more guide devices positioned adjacent to the roller assembly 730, and one or more biasing devices coupled to the guide devices. Here, the biasing devices may be structured to become deflected during a load-movement phase when the roller assembly 730 travels in a direction that is not parallel or perpendicular to a lengthwise direction that the support foot 740 is oriented, and structured to return the support foot to a centered position relative to the support foot 740 during a recovery phase.

Figure 8A:
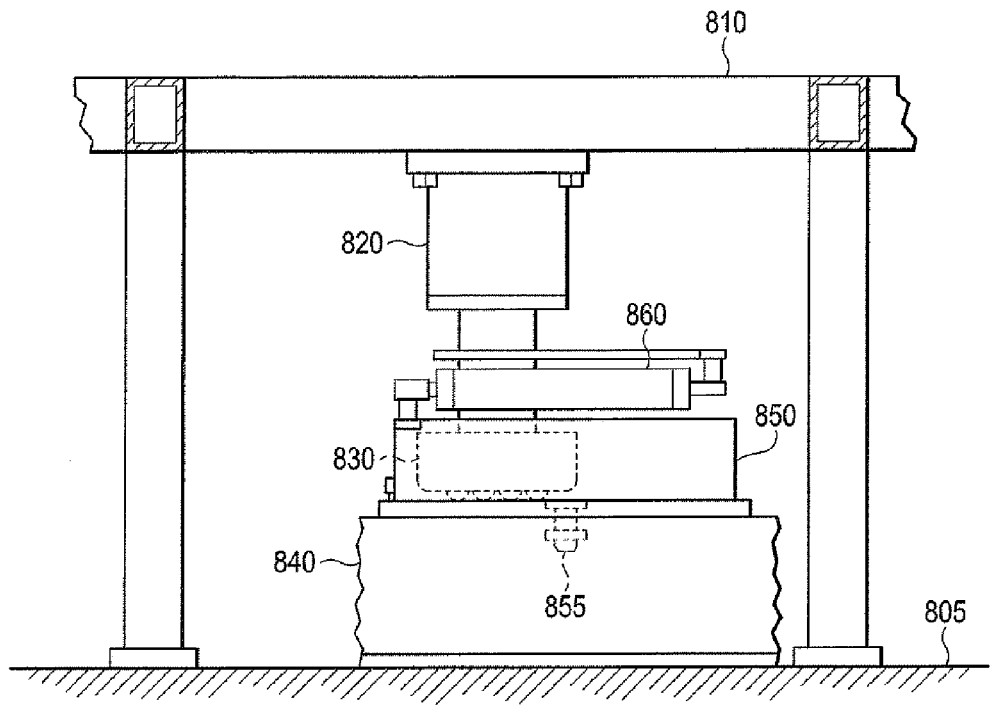
FIGS. 8A, 8B, 8C, 8D, 8E, and 8F are diagrams illustrating an example operation progression of a walking apparatus.

FIGS. 8A, 8B, 8C, 8D, 8E, and 8F are diagrams illustrating an example operation progression of a walking apparatus. Here, FIGS. 8D-8E may show a load-movement phase of a walking cycle, while FIG. 8F may show a recovery phase of a walking cycle. Referring to FIG. 8A, a walking apparatus includes a support foot 840 positioned on a base surface 805 and connected to roller track 850 via a rotation pin 855. The roller track 850 is structured to allow a roller assembly 830 to move relative to the roller track when activated by a travel mechanism 860. A lift mechanism 820, such as hydraulic jack, is connected between the roller assembly 830 and load-bearing frame 810. As shown in FIG. 8A, the walking apparatus is in an operational position where it is both connected to the load-bearing frame 810 and positioned on the base surface 805.

Figure 8B:
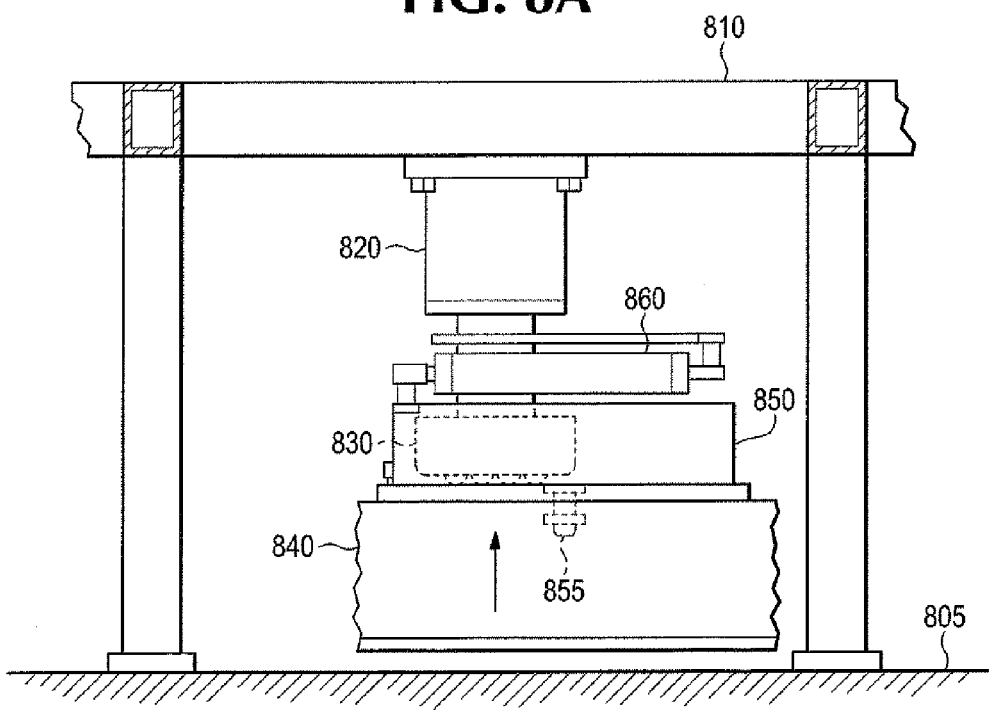

Referring to FIG. 8B, a step in a walking motion of the walking machine is illustrated. Specifically, as indicated by the vertical arrows pointing up, when the lift mechanism 820 is activated, the roller assembly 830, the roller track 850, and the foot 840 are lifted above the base surface or ground 805 as a single unit. This is due in part because the roller assembly 830, which is secured to the lower end of the travel mechanism 820, is captured by the roller track, as discussed above.

Figure 8C:
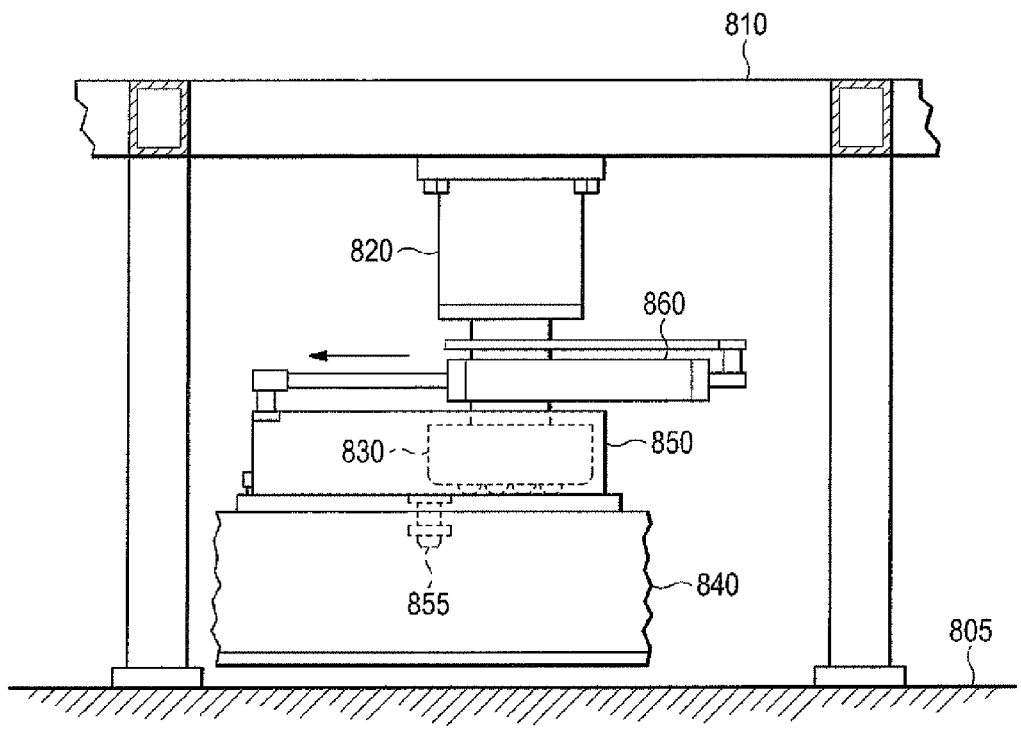

Referring to FIG. 8C, a next step in a walking motion of the walking machine is illustrated. Here, as indicated by the horizontal arrow pointing to the left, the travel cylinders 860 are extended to shift the roller track 850 to the left along the roller assembly 830. Because the roller track 850 is secured to the foot 840 via the rotation pin 855, the foot also is shifted to the left. The distance of travel of the foot 840 may be limited by the operable travel, or throw, of the travel cylinders 860. Because the lateral travel is limited, the roller tracks 850 only need to be long enough to accommodate the corresponding distance traveled by the roller assembly 830. As illustrated in FIG. 8C, this step occurs while the foot is lifted completely off of the base or ground surface 805, and with the full weight of the load being supported by the load-bearing or main frame 810 and its ground-engaging portions.

Figure 8D:
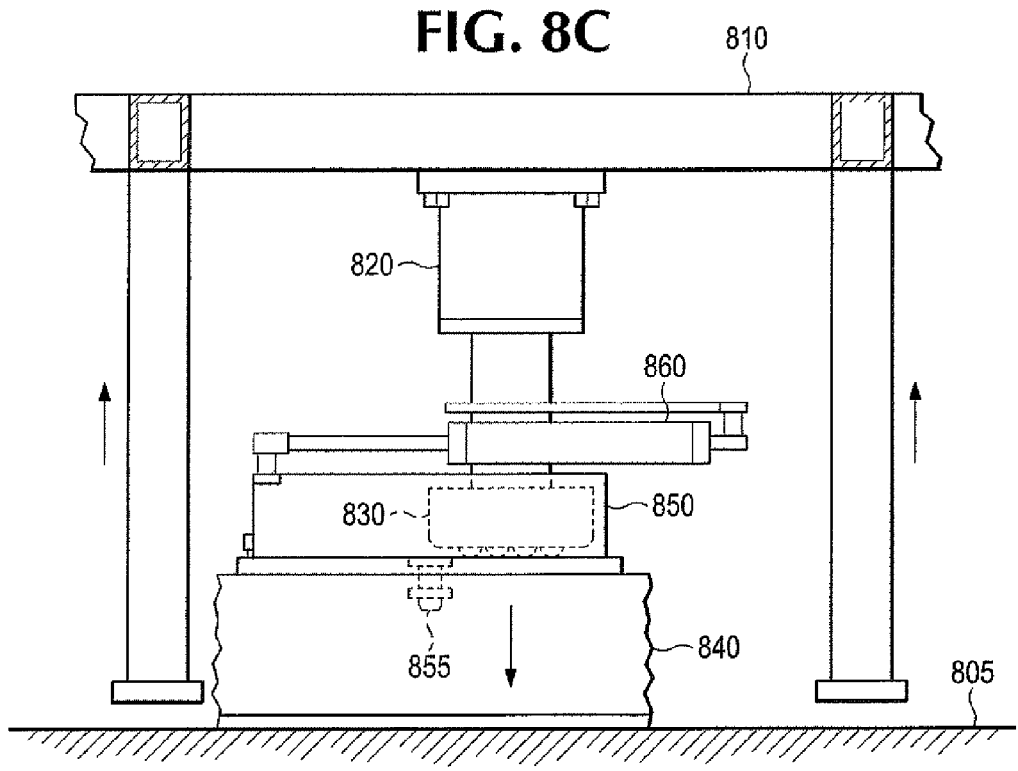

Referring to FIG. 8D, the next step of the walking process is shown. Here, the lift mechanism 820 is activated (i.e., the cylinder rod of the hydraulic jack is forced out of the lift cylinder) causing the foot 840 to engage the base surface 805. As the lift mechanism 820 continues to operate, the ground-engaging portions of the load-bearing frame 810 are lifted off of the base surface 805, so that the entire weight of the load is then supported by the support foot 840.

Figure 8E:
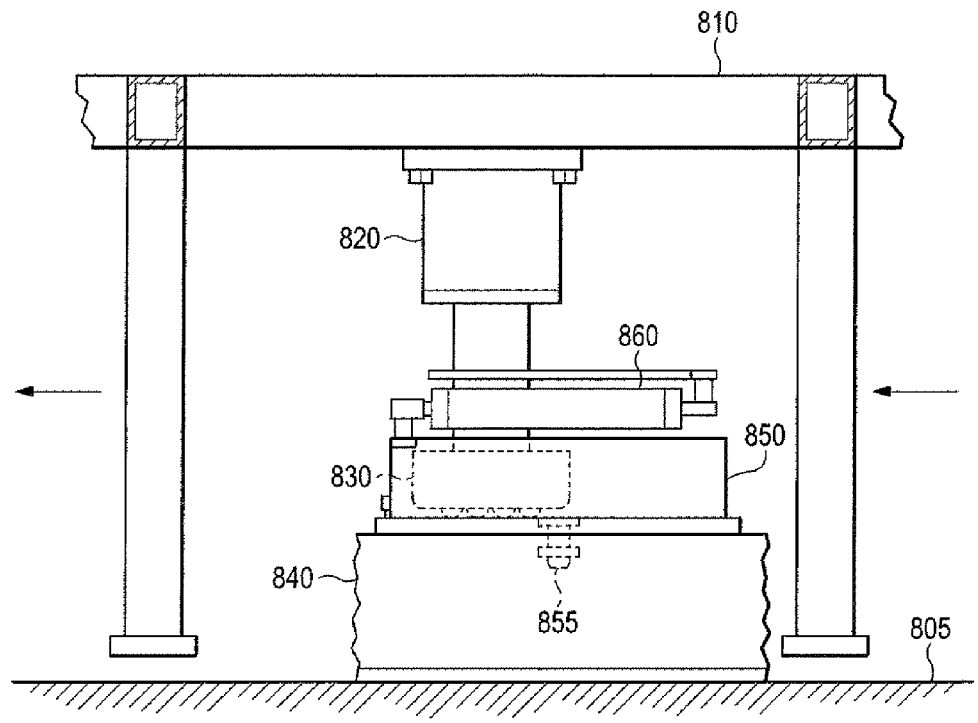

Referring to FIG. 8E, while the load-bearing frame 810 is lifted off of the base surface 805, and the foot 840 is supporting the load, the travel cylinders 860 are retracted, causing the entire load-bearing frame 810, including the supported load, to translate to the left, as indicated by the horizontal arrows pointing to the left in the view shown in FIG. 8E. As shown in this figure, the load-bearing frame 810 has shifted to the left away from its starting position, a distance corresponding to the operable throw of the travel cylinders 860. During this translation to the left, the roller assembly 830 rolls along the bottom inside surface of the roller track 850.

Figure 8F:
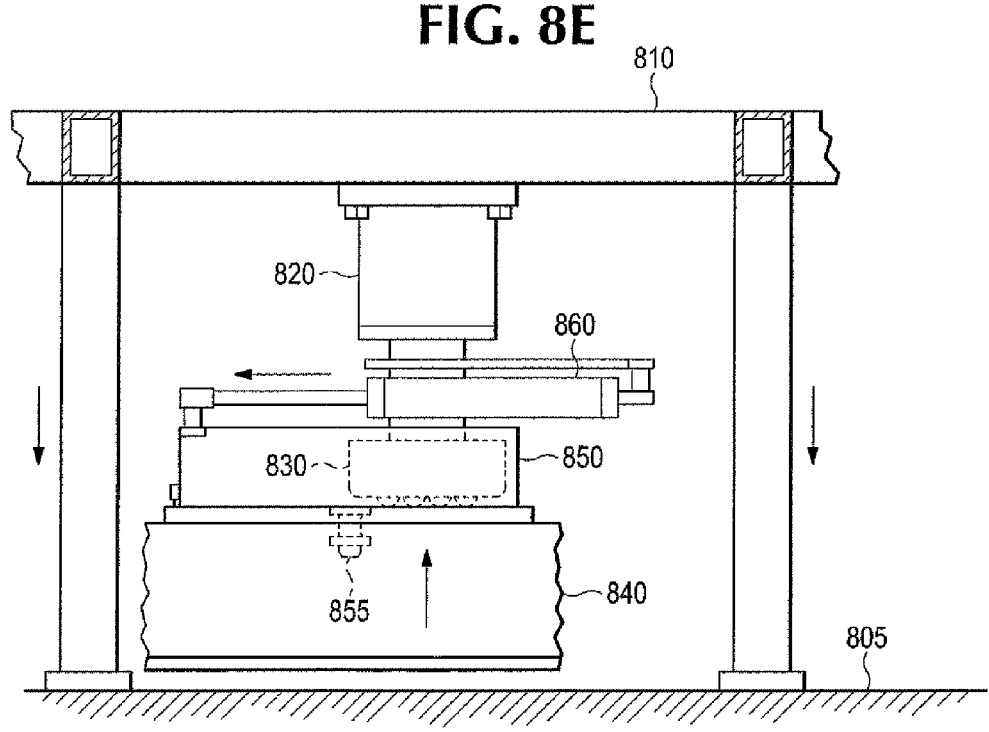

Referring to FIG. 8F, the rod of the lift mechanism 820 is retracted, which causes the load-bearing frame 810 to be lowered and to engage the base surface 805 and support the load. As the lift mechanism 820 continues to be activated, the foot 840 is lifted off of the base surface 805. Thus, the walking machine returns to a similar orientation as shown in FIG. 8B and FIG. 8C. To continue moving, the steps shown in FIGS. 8C-8F may be repeated. Accordingly, cycling through the above illustrated sequential steps will cause the walking apparatus to walk across the base surface 805.

Figure 9A:
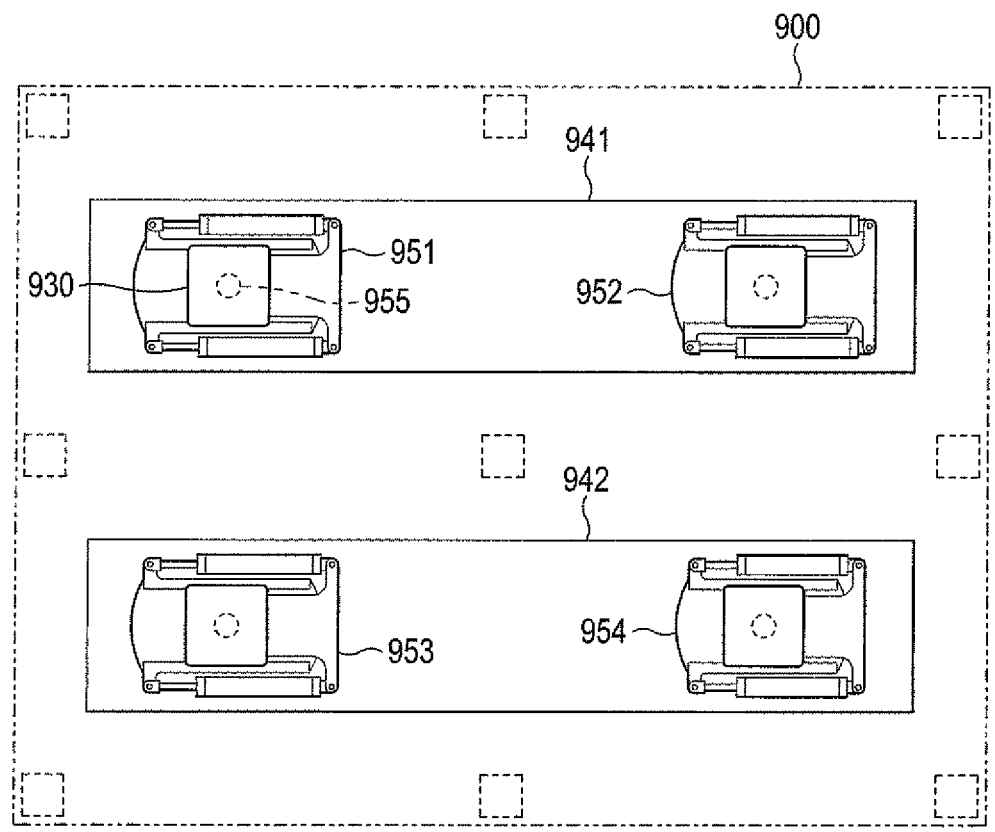
FIG. 9A is a plan view of walking apparatuses positioned below a load.
Figure 9B:
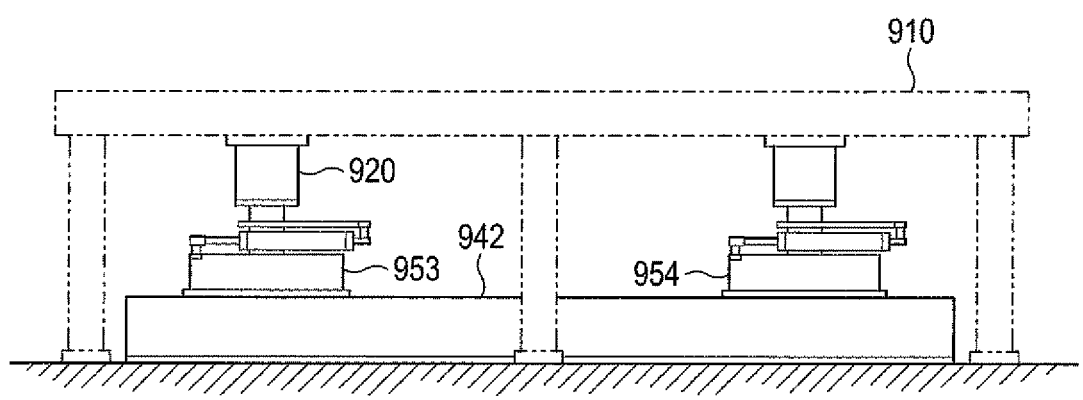
FIG. 9B is a side view of the walking apparatuses shown in FIG. 9A.

FIG. 9A is a plan view of walking apparatuses positioned below a load. FIG. 9B is a side view of the walking apparatuses shown in FIG. 9A. Referring to FIGS. 9A and 9B, a load 900 is supported by four walking apparatuses 951, 952, 953, 954. Here, a first walking apparatus 951 and third walking apparatus 952 are connected to a first support foot 941 and a second walking apparatus 953 and fourth walking apparatus 954 are connected to a second support foot 942. Each of the walking apparatuses 951, 952, 953, 954 include a roller assembly 930 and a rotation pin 955.

That is, a load transporting system that is configured to move a load 900 over a base surface in one or more incremental steps each including a load-movement phase and a recovery phase includes a load-bearing frame 910 structured to support the load 900 on the base surface. The load transporting system includes a first load transporting apparatus 951 including a first lift mechanism 920 coupled to the load-bearing frame 910 and structured to lift the load-bearing frame supporting the load 900. The first load transporting apparatus 951 also includes a first roller assembly 930 coupled to the first lift mechanism 920, a first roller track connected to the first roller assembly and configured to allow the first roller assembly to move over the first roller track in a first direction, and a first travel mechanism coupled to the first roller track and connected to the first roller assembly, the first travel mechanism structured to displace the first roller assembly relative to the first roller track along the first direction. The first load transporting apparatus is connected to a first support foot 941 positioned below the first roller track, the first support foot structured to interface with the base surface. The first support foot 941 is connected to the first roller track with a first pin connector 955. The first pin connector 955 is structured to allow the first roller track 930 to rotate relative to the first support foot.

The load transporting system also includes a second load transporting apparatus 953 that includes a second lift mechanism 920 coupled to the load-bearing frame 910 and structured to lift the load-bearing frame supporting the load 900. The second load transporting apparatus 953 includes a second roller assembly 930 coupled to the second lift mechanism 920, a second roller track connected to the second roller assembly and configured to allow the second roller assembly to move over the second roller track in a second direction, and a second travel mechanism coupled to the second roller track and connected to the second roller assembly, the second travel mechanism structured to displace the second roller assembly relative to the second roller track along the second direction. The second load transporting apparatus is connected to a second support foot 942 positioned below the second roller track, the second support foot structured to interface with the base surface. The second support foot 942 is connected to the second roller track with a second pin connector 955. The second pin connector 955 is structured to allow the second roller track 930 to rotate relative to the second support foot.

As shown in FIGS. 9A and 9B, however, additional walking apparatuses are connected to each of support foot. In other embodiments, more than two walking apparatuses may be coupled to the same support foot. In other embodiments, more than two support feet with multiple walking machines are needed to safely and/or efficiently lift and transport a load. For example, a third load transporting apparatus 952 may be connected to the same first support foot 941 as the first load transporting apparatus 951, and a fourth load transporting apparatus 954 may be connected to the same second support foot 942 as the second load transporting apparatus 953.

Here, the third load transporting apparatus 952 may include a third lift mechanism 920 coupled to the load-bearing frame 910 and structured to lift the load-bearing frame supporting the load 900. The third load transporting apparatus 952 may also include a third roller assembly 930 coupled to the third lift mechanism 920, a third roller track connected to the third roller assembly and configured to allow the third roller assembly to move over the third roller track in a first direction, and a third travel mechanism coupled to the third roller track and connected to the third roller assembly, the third travel mechanism structured to displace the third roller assembly relative to the third roller track along the first direction. A third pin connector 955 may connect the first support foot 941 with the third roller track, the third pin connector structured to allow the third roller track to rotate relative to the first support foot.

Additionally, the fourth load transporting apparatus 954 may include a fourth lift mechanism 920 coupled to the load-bearing frame 910 and structured to lift the load-bearing frame supporting the load 900. The fourth load transporting apparatus 954 may include a fourth roller assembly 930 coupled to the fourth lift mechanism 920, a fourth roller track connected to the fourth roller assembly and configured to allow the fourth roller assembly to move over the fourth roller track in a second direction, and a fourth travel mechanism coupled to the fourth roller track and connected to the fourth roller assembly, the fourth travel mechanism structured to displace the fourth roller assembly relative to the fourth roller track along the second direction. A fourth pin connector 955 may connect the second support foot 942 with the fourth roller track, the fourth pin connector structured to allow the fourth roller track to rotate relative to the second support foot.

As described above, embodiments of the disclosed walking machine are capable of being steered while transporting a load across a base or ground surface. Since each roller track is rotationally secured to a foot with a rotation or king pin, the roller track is able to be selectively rotated relative to the foot. FIGS. 10A-10E illustrate exemplary steering modes that may be made possible by utilizing a rotational pin to connect the support foot to the roller track.

Figure 10A:
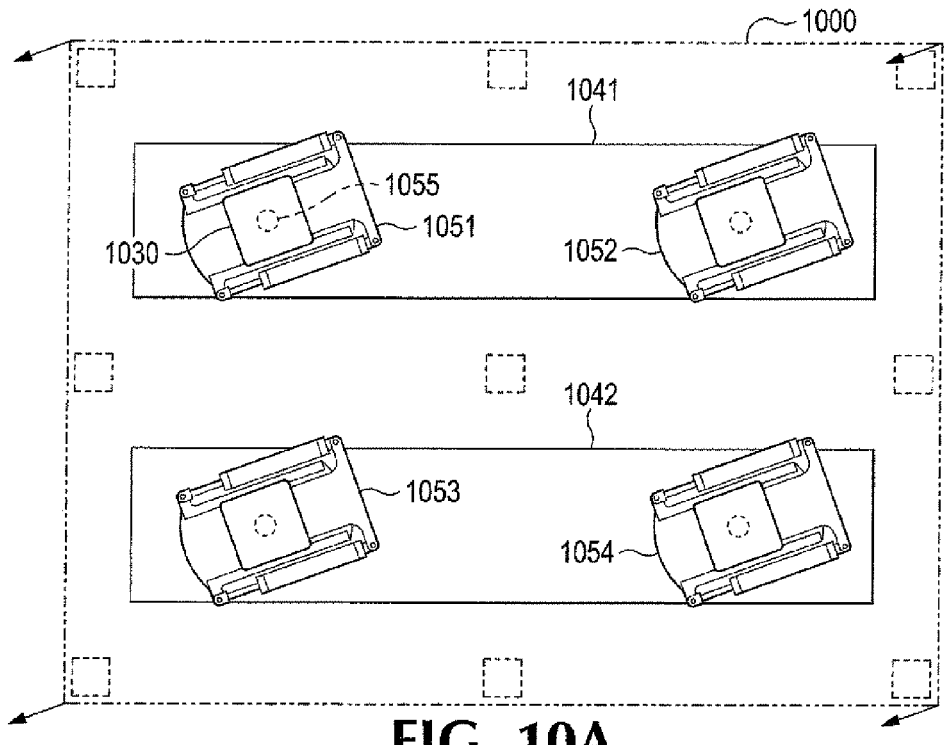
FIG. 10A is a plan view of the walking apparatuses shown in FIG. 9A in a crab-steering orientation.
Figure 10B:
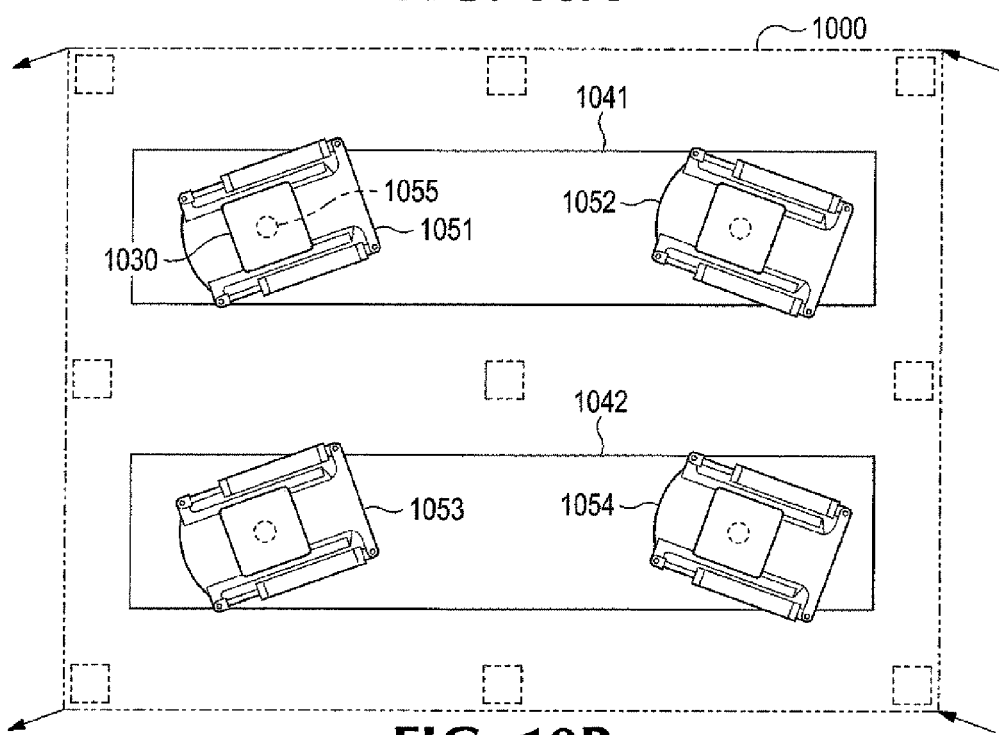
FIG. 10B is a plan view of the walking apparatuses shown in FIG. 9A in a complimentary-steering orientation.
Figure 10C:
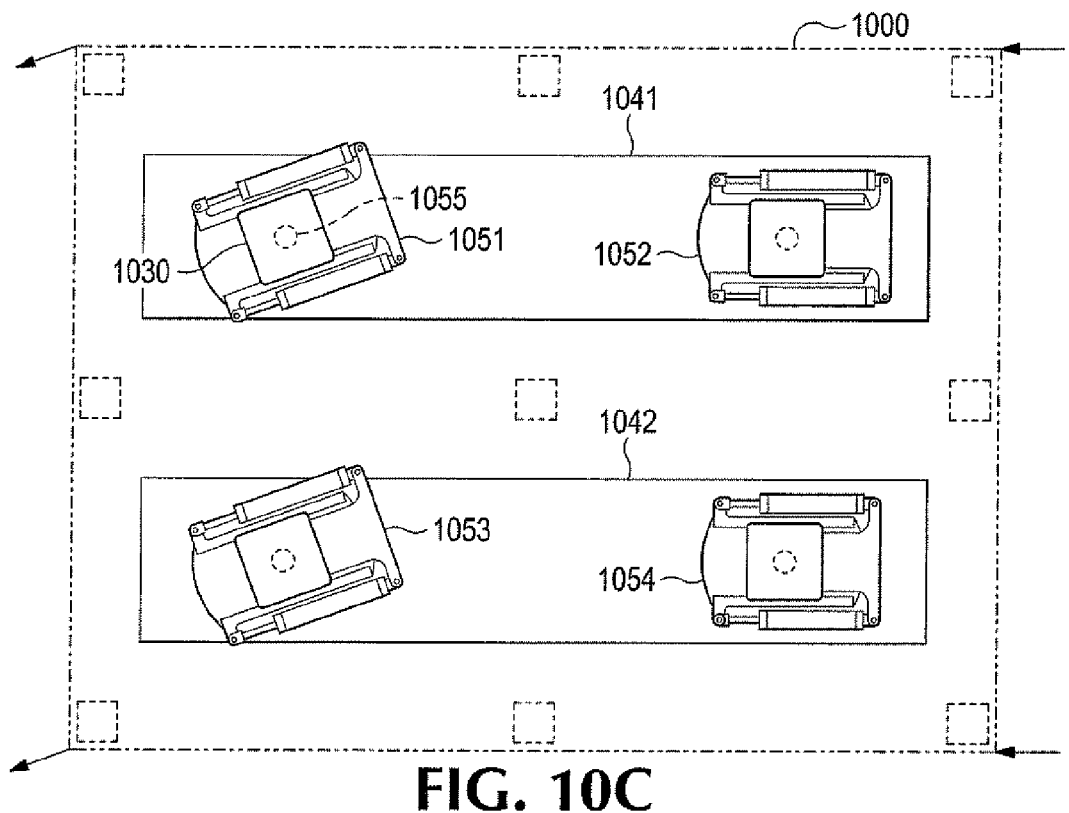
FIG. 10C is a plan view of the walking apparatuses shown in FIG. 9A in a simple-steering orientation.
Figure 10D:
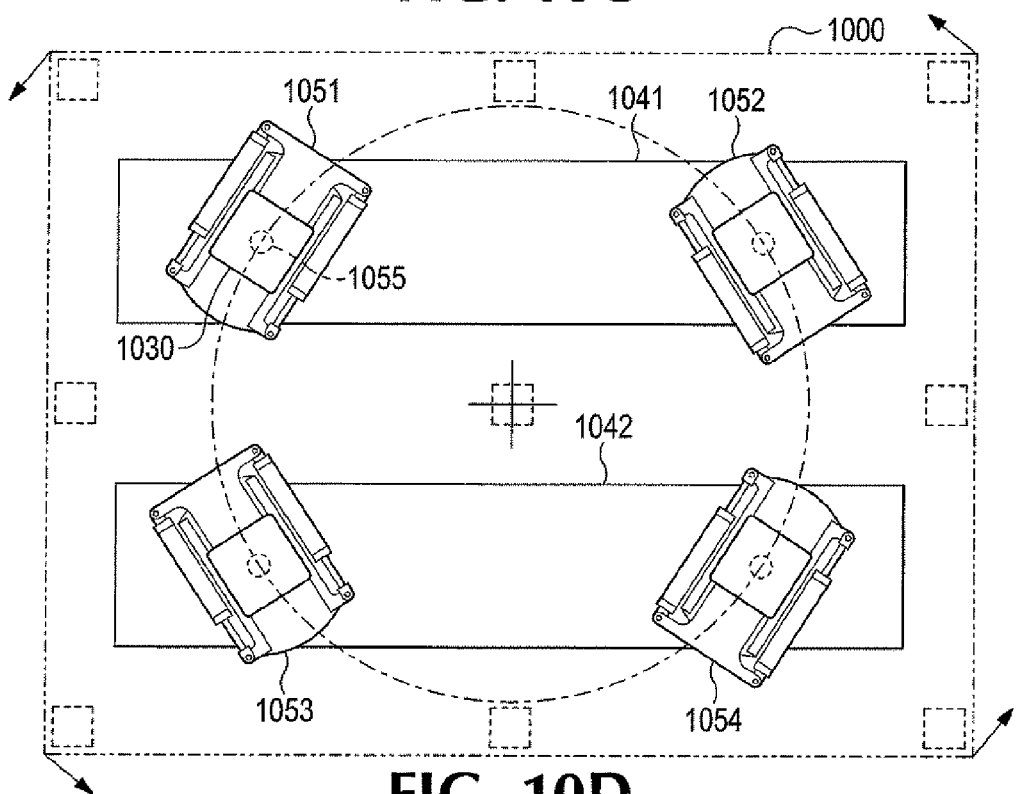
FIG. 10D is a plan view of the walking apparatuses shown in FIG. 9A in a spin-steering orientation.
Figure 10E:
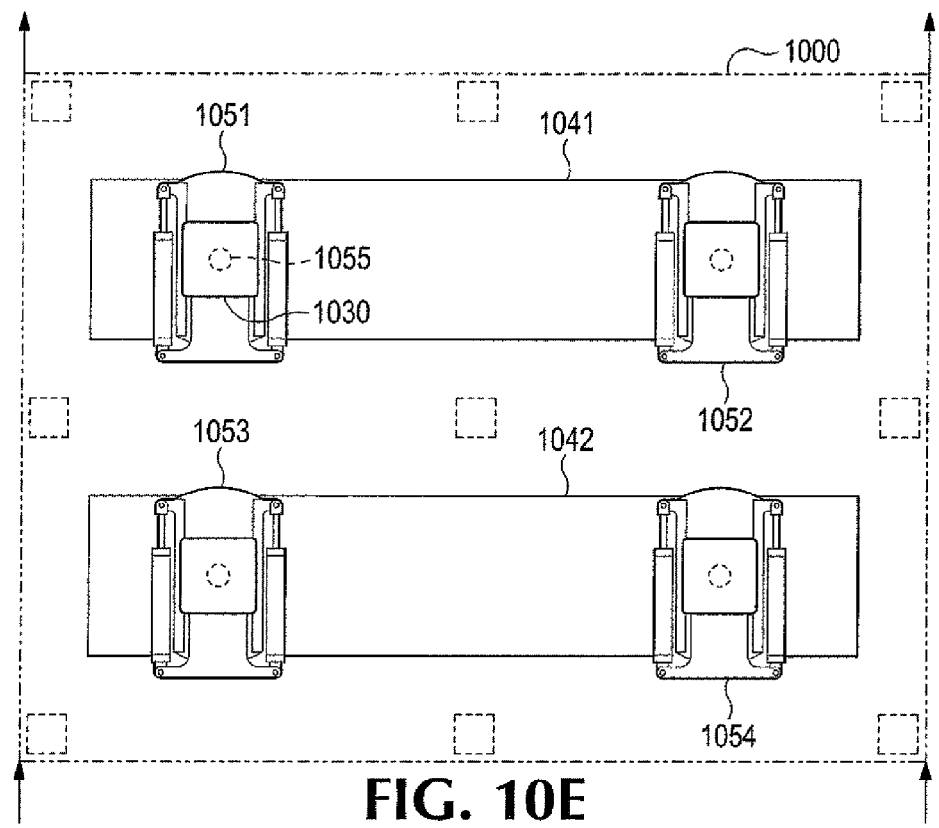
FIG. 10E is a plan view of the walking apparatuses shown in FIG. 9A in a perpendicular-steering orientation.

FIG. 10A is a plan view of the walking apparatuses shown in FIG. 9A in a crab-steering orientation. FIG. 10B is a plan view of the walking apparatuses shown in FIG. 9A in a complimentary-steering orientation. FIG. 10C is a plan view of the walking apparatuses shown in FIG. 9A in a simple-steering orientation. FIG. 10D is a plan view of the walking apparatuses shown in FIG. 9A in a spin-steering orientation. FIG. 10E is a plan view of the walking apparatuses shown in FIG. 9A in a perpendicular-steering orientation.

Referring to FIG. 10A, a load 1000 connected to lift mechanisms 920 (FIG. 9B) of multiple load transporting apparatuses 1051, 1052, 1053, 1054 can be steered by rotating roller tracks and roller assemblies 1030 to a direction of travel even though support feet 1041, 1042 are not moved so as to be oriented in the same direction of travel. As shown in FIG. 10A, orienting the walking machines 1051, 1052, 1053, 1054 in diagonal directions relative to the orientation of the support feet 1041, 1042 allows for the load 1000 to be moved at a diagonal.

Referring to FIG. 10B, orienting the left two (or more) walking machines 1051, 1053 in a first direction and orienting the right two (or more) walking machines 1052, 1054 in a second complementary direction, allows the load 1000 to be moved and steered in a complimentary-steering mode.

Referring to FIG. 10C, orienting the left two (or more) walking machines 1051, 1053 in a first direction and orienting the right two (or more) walking machines 1052, 1054 in a second orthogonal direction, allows the load 1000 to be moved and steered in a simple-steering mode.

Referring to FIG. 10D, orienting first diagonally opposite walking machines 1051, 1054 in a first direction and orienting second diagonally opposite walking machines 1052, 1053 in a second direction, allows the load 1000 to be moved and steered in a spin-steering mode.

Referring to FIG. 10E, orienting the walking machines 1051, 1052, 1053, and 1054 in a direction perpendicular to the orientation of the support feet 1041, 1042 allows the load 1000 to be moved in a vertical or perpendicular direction relative to the orientation of the support feet.

These and other steering modes may be possible in part because each of the walking machines 1051, 1052, 1053, 1054 include rotation pins 1055 that allows them to be oriented in different directions from the orientation of the support feet 1041, 1042. This can be useful, for example where the support feet 1041, 1042 have a length dimension greater than the distance between support beam elements of the load-bearing frame. That is, the support feet themselves could not be rotated to a desired direction of travel because they would contact the support frame beams when trying to rotate them to a direction of travel.

Figure 11:
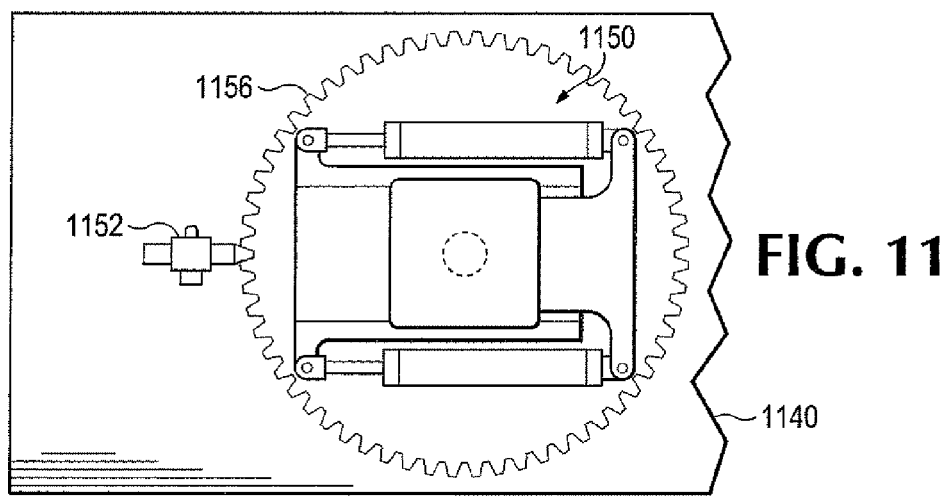
FIG. 11 is a detail diagram of a roller track configuration in a walking apparatus.

FIG. 11 is a detail diagram of a roller track configuration in a walking apparatus. Referring to FIG. 11, a roller track 1150 is positioned over a support foot 1140 and connected to the support foot with a rotation pin (655 FIG. 6). As shown in this embodiment, the roller track 1150 has a substantially circular footprint over the support foot 1140. This substantially circular footprint may allow uniform rotation of the roller track 1150 relative to the support foot 1140. Further, in some embodiments, the roller track 1150 may include a plurality of gear teeth 1156 along a bottom edge of the roller track. In these embodiments, the walking device may also include a locking device (or steering dog) 1152 that is structured to fix the position of the roller track 1150 relative to the support foot 1140. Fixing the position of the roller track 1150 relative to the support foot 1140 can be beneficial so that the alignment of the roller track relative to the support foot does not become skewed during multiple steps made by the walking device. Additionally, being able to fix the roller track 1150 relative to the support foot 1140 allows for precise directional-positioning of multiple walking devices to make more complicated steering movements.

Figure 12:
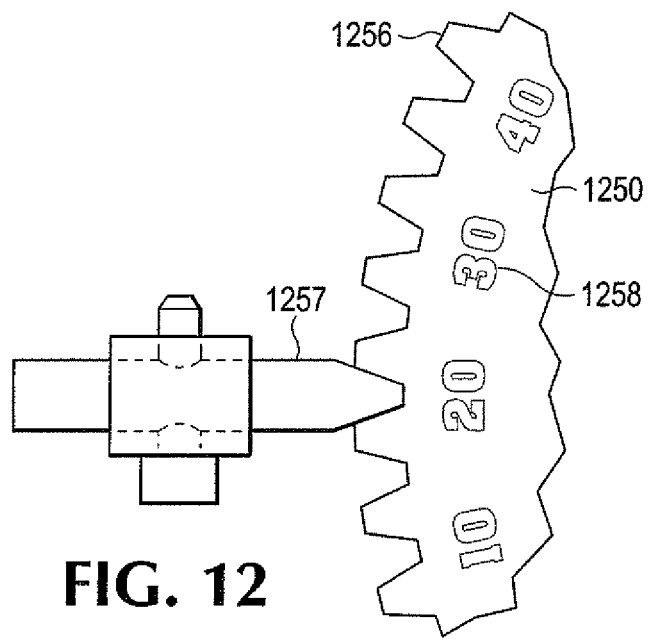
FIG. 12 is a detail diagram of an example roller track portion in a walking apparatus.

FIG. 12 is a detail diagram of an example roller track portion in a walking apparatus. Referring to FIG. 12, at least a portion of the plurality of gear teeth 1256 of the roller track 1250 are associated with indicator marks 1258. Here, the indictor marks 1258 are configured to identify the position of the roller track 1250 relative to the support foot 1150 (FIG. 11). In some embodiments, the indicator marks may include numbers, letters, or any other identifiable alpha-numeric symbols. In other embodiments, the indicator marks 1258 may include a dot, pit, bump, or other mark that can be counted. In some embodiments, the indicator marks 1258 may be associated with each position between gear teeth 1256, while in other embodiments, the indicator marks may appear only by every fifth gear tooth, or some other interval between gear teeth. As shown in FIG. 12, and steering dog or position lock 1257 may be used to fix the position of the roller track 1250 relative to the support foot. In some embodiments, all roller tracks 1250 of all walking machines used on job may be oriented in common manner at setup so that any steering movements needed during transport of the load can utilize common indicator values so that the roller tracks can be correctly positioned quickly.

Figure 13:
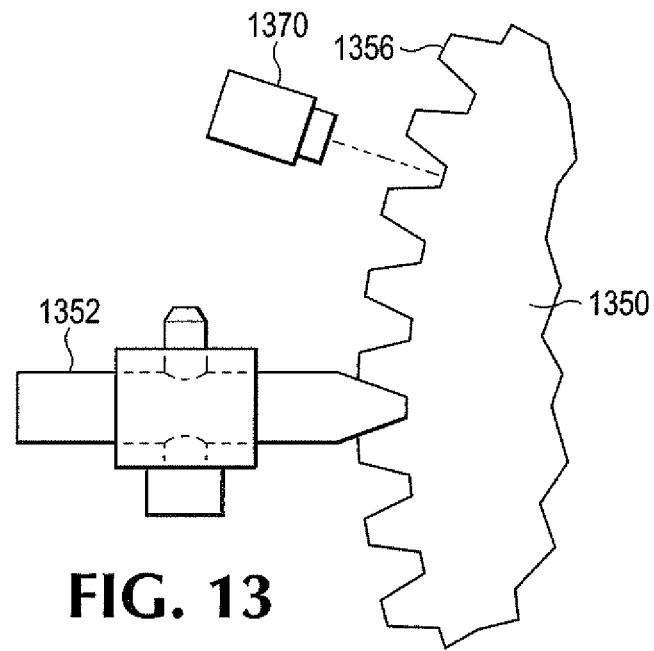
FIG. 13 is a detail diagram of another example roller track portion in a walking apparatus.

FIG. 13 is a detail diagram of another example roller track portion in a walking apparatus. Referring to FIG. 13, a walking apparatus may also include a position feedback sensor 1370 that is configured to detect the position of the roller track 1350 relative to the support foot. Here, the position feedback sensor 1370 may detect an actual position of the roller track 1350 or gears 1356, or may be used to detect relative movement between two positions (i.e., count the gears 1356 between a rotational movement of the roller track 1350). Again a locking mechanism 1352 may be used to lock the roller 1350 in place relative to the support foot.

The walking apparatuses can use a variety of ways to have the roller track moved relative to the support foot in order to steer the movement of a load. In some embodiments, an operator can manually move the roller track relative to the support foot to perform a steering movement. However, because of the size and weights involved with a typical application, some embodiments of the walking apparatus utilize a propulsion device that is configured to move the roller track relative to the support foot.

Figure 14:
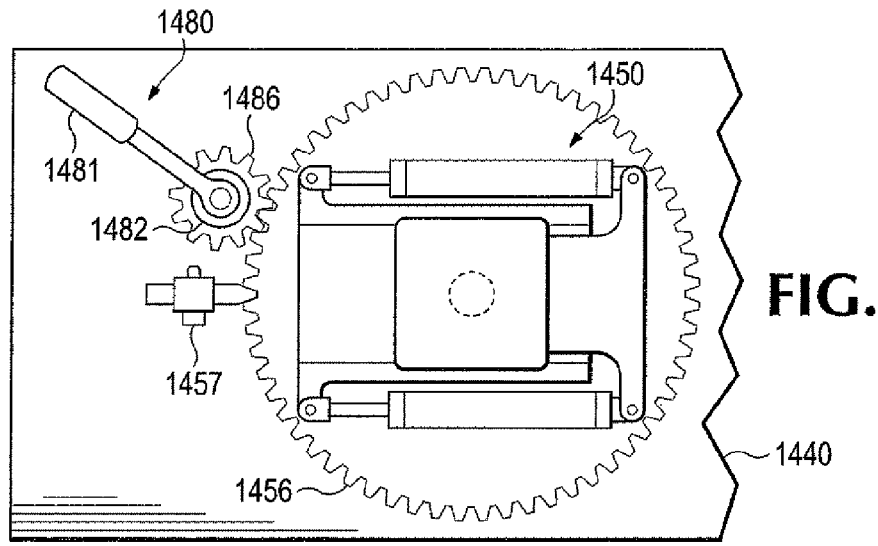
FIG. 14 is a detail diagram of a rotation device for use with a roller track in a walking apparatus.

FIG. 14 is a detail diagram of a rotation device for use with a roller track in a walking apparatus. Referring to FIG. 14, a walking apparatus includes a steering mechanism 1480 to rotate a roller track 1450 relative to a support foot 1440. The steering mechanism 1480 may include a rotatable gear 1486 configured to interface with the gear teeth 1456 along the bottom edge of the roller track 1450. The steering mechanism 1480 may also include an elongated handle 1481 so that an operator can turn the rotatable gear 1486 with relative ease. Additionally, in some embodiments, the steering mechanism 1480 may include a ratcheting mechanism 1482 so that a user only need operate the elongated handle 1481 over a limited distance. A locking mechanism 1457 may be used to lock the roller track 1450 in place once the desired orientation is reached.

Figure 15:
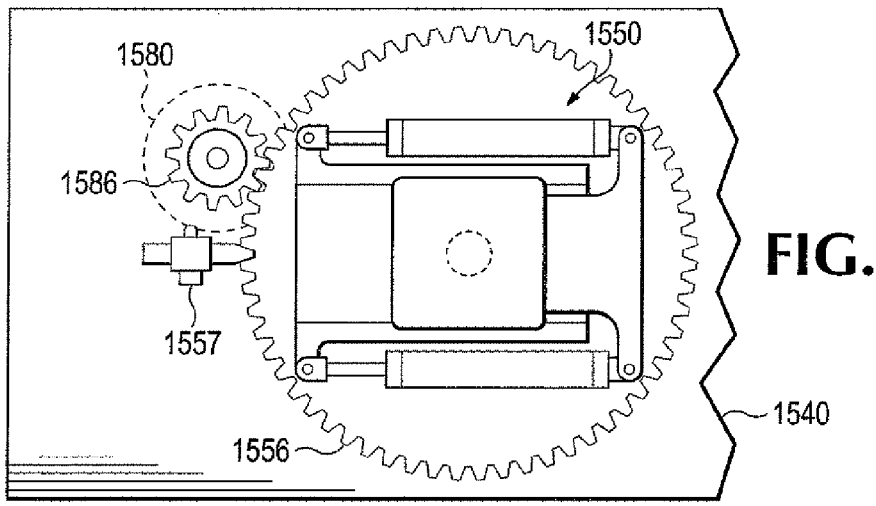
FIG. 15 is a detail diagram of another rotation device for use with a roller track in a walking apparatus.

FIG. 15 is a detail diagram of another rotation device for use with a roller track in a walking apparatus. Referring to FIG. 15, a walking apparatus includes a propulsion device 1580, such as a motor to rotate a roller track 1550 relative to a support foot 1540. The propulsion device 1580 may include a rotatable gear 1586 configured to interface with the gear teeth 1556 along the bottom edge of the roller track 1550. In some embodiments, the propulsion device 1580 may include a DC motor operated on batteries, or other direct current power supplies, while in other embodiments the propulsion device may include an AC motor operated from a generator or other types of alternating current power supplies. In other embodiments, a hydraulic motor or other types of electro/mechanical assistance devices may be used as the propulsion device 1580. An operator may be able to set a specific distance of travel for the motor (e.g., such as in embodiments where the motor is a stepper motor). Alternatively, the propulsion device 1580 may include a forward and backward cycles so that an operator can fine tune a position of the roller track 1550. In yet other embodiments, a position feedback sensor 1370 (FIG. 13) may be used to identify a position of the roller track 1550. Here, the operator may only have to type in an angular displacement between the roller track 1550 and the support foot 1540 and allow the motor 1580 and/or feedback sensor 1370 determine a correct position and move the roller track to that determined position. A locking mechanism 1557 may be used to lock the roller track 1550 in place once the desired orientation is reached.

Figure 16:
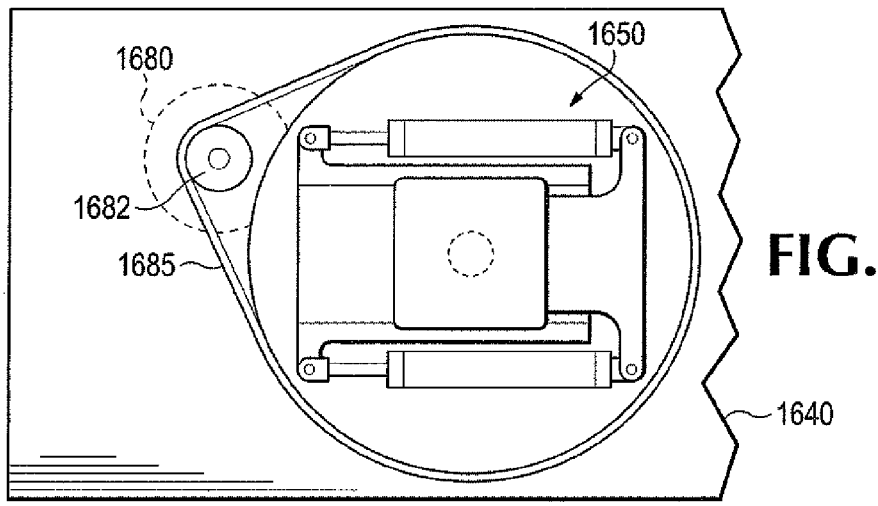
FIG. 16 is a detail diagram of another rotation device for use with a roller track in a walking apparatus.

FIG. 16 is a detail diagram of another rotation device for use with a roller track in a walking apparatus. Referring to FIG. 16, a roller track 1650 positioned on a support foot 1640 may not have gears associated with an edge portion. Here, the roller track is engaged to a drive pulley 1682 via a drive belt or chain 1685. The drive pulley 1682 may be connected to a motor 1680 or other propulsion device capable of rotating the drive pulley 1682.

In other embodiments, the roller track may not be substantially circular, and may be rotated or moved in other ways. The above embodiments merely provide exemplary variations in constructing a walking device.

Figure 17:
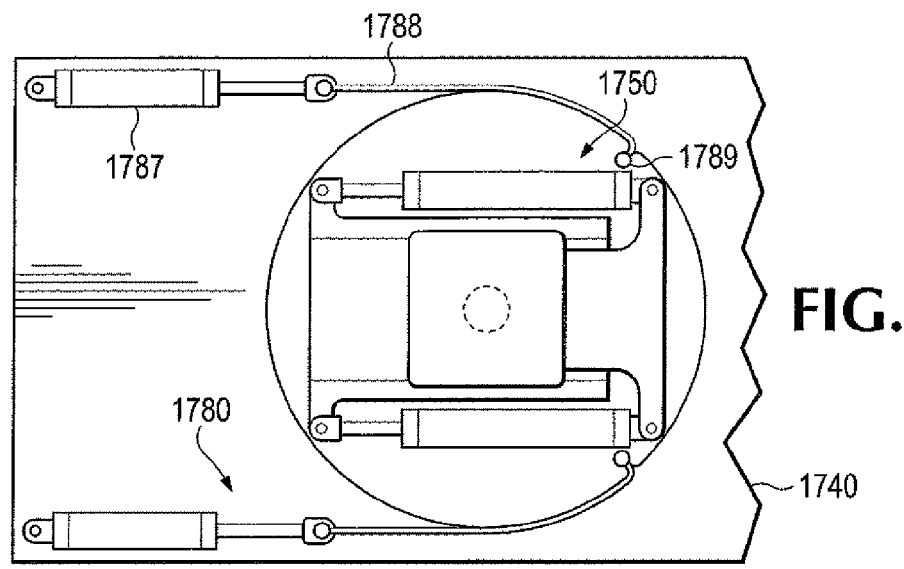
FIG. 17 is a detail diagram of another rotation device for use with a roller track in a walking apparatus.

FIG. 17 is a detail diagram of another rotation device for use with a roller track in a walking apparatus. Referring to FIG. 17, a roller track 1750 positioned on a support foot 1740 may use a cylinder propulsion system 1780 to rotate it relative to the support foot. Here, hydraulic or other cylinders 1787 are connected to attachment points 1789 on the edges of the roller track 1750 via cables 1788 or other connection devices. Depending on which cylinder 1787 is activated, the roller track 1750 will be rotated relative to the support foot 1740.

Figure 18:
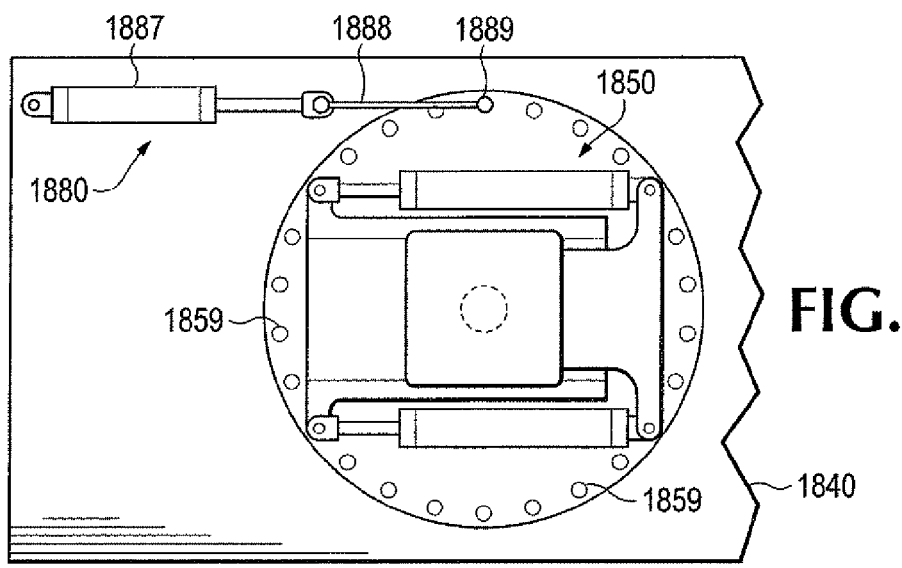
FIG. 18 is a detail diagram of another rotation device for use with a roller track in a walking apparatus.

FIG. 18 is a detail diagram of another rotation device for use with a roller track in a walking apparatus. Referring to FIG. 18, a roller track 1850 positioned on a support foot 1840 may use another type of cylinder propulsion system 1880 to rotate it relative to the support foot. Here, hydraulic or other cylinder 1887 is connected to one of multiple attachment points 1859 on the edges of the roller track 1850 via a cable or other type of link 1888 and pin connector 1889. In other embodiments, the cylinder 1887 may be directly connected to the pin connector 1889 to facilitate rotation of the roller track 1850 with respect to the support foot 1840. Here, the pin 1889 can be moved to a different attachment location 1859 and the cylinder activated to rotate the roller track 1850 in a desired direction relative to the support foot 1840.

In addition to being able to steer a load using the walking devices, use of pin connector can allow the orientation of a support foot to be maintained at a desired orientation during a movement cycle. Below are a few of the many example ways that the foot can be maintained in a desired orientation.

Figure 19:
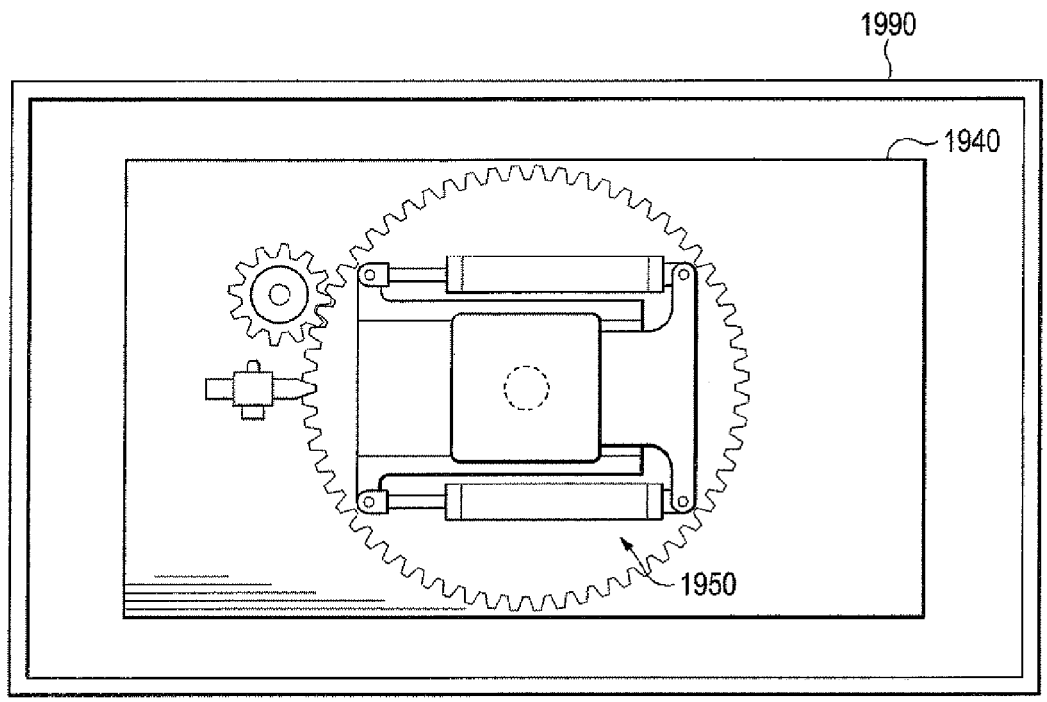
FIG. 19 is a detail diagram of an orientation device for use with a roller track in a walking apparatus.

FIG. 19 is a detail diagram of an orientation device for use with a roller track in a walking apparatus. Referring to FIG. 19, during movement of the walking device about the roller track 1950, a load can become offset from an orientation of the support foot 1940. In FIG. 19, a correction box frame 1990 is used to realign the support foot 1940 after a non-linear movement of the walking device. Here, as the edge of the support foot 1940 contacts the box frame 1990 it is pushed into orthogonal alignment with the box based on its offset edge creating a torsional moment about the rotation pin 655 (FIG. 6) and rotating the support foot 1940 back into alignment.

Figure 20:
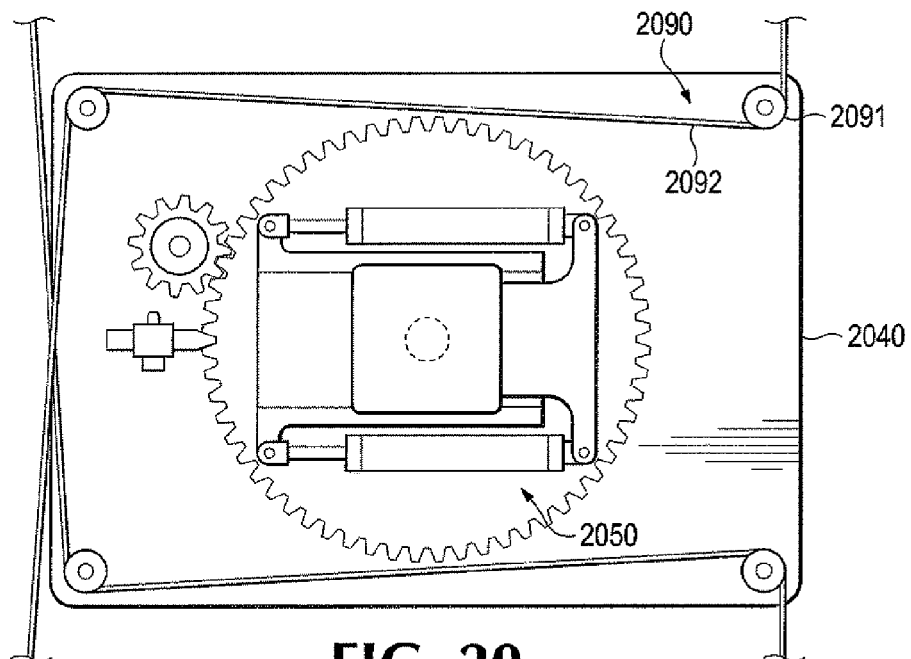
FIG. 20 is a detail diagram of another orientation device for use with a roller track in a walking apparatus.

FIG. 20 is a detail diagram of another orientation device for use with a roller track in a walking apparatus. Referring to FIG. 20, a support foot 2040 is brought back into alignment after a movement cycle by a cable tensioning system 2090 that uses cables 2092 and pulleys 2091 attached to a frame (not shown) that creates the tension needed during a move that when the support foot 2040 is raised above the ground, the support foot will be pulled back into alignment with the load. As the support foot 2040 is connected to the roller track 2050 via a rotational pin 655, it does not need to rotate with the roller track.

Figure 21:
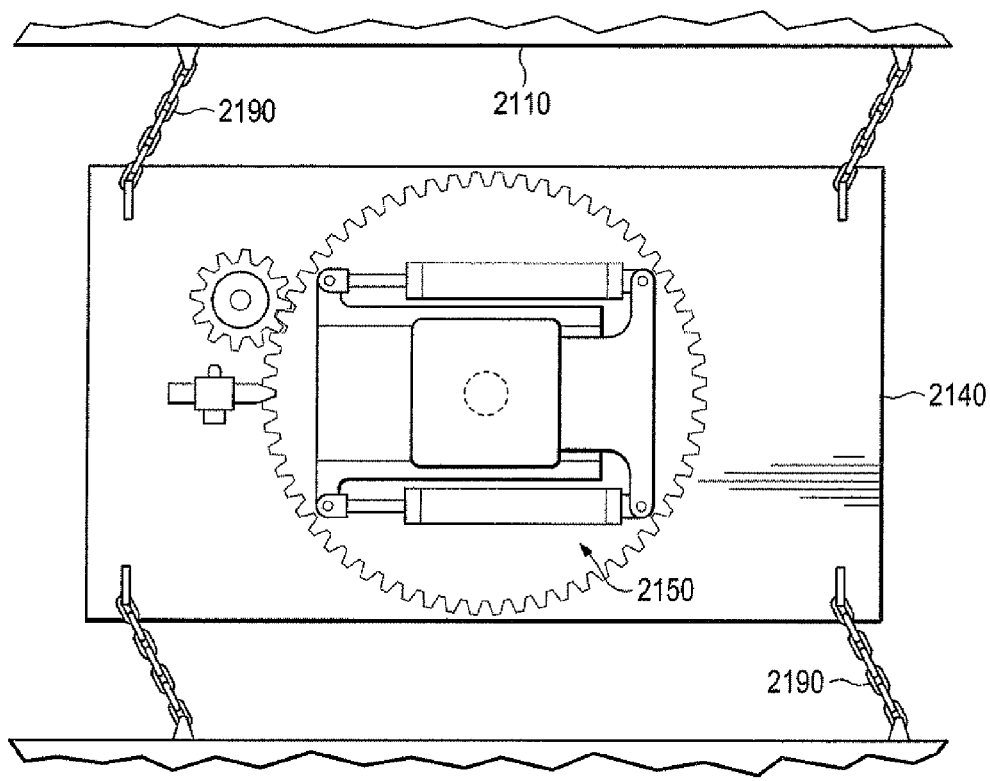
FIG. 21 is a detail diagram of another orientation device for use with a roller track in a walking apparatus.

FIG. 21 is a detail diagram of another orientation device for use with a roller track in a walking apparatus. Referring to FIG. 21, another embodiment of reorienting the support foot 2140 is shown. In this embodiment chains or other restricting mechanisms 2190 are used to create unbalanced forces when the support foot is misaligned with the frame 2110 of a load. Again, as the support foot 2140 is connected to the roller track 2150 via a rotational pin 655, it does not need to rotate with the roller track.

Figure 22:
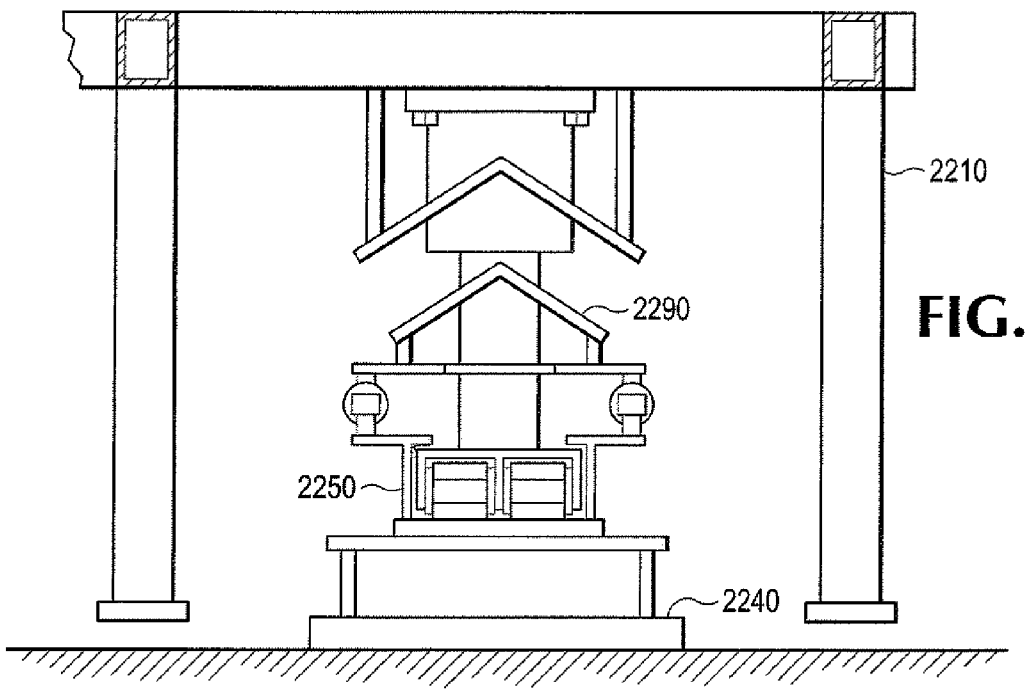
FIG. 22 is a detail diagram of another orientation device for use with a roller track in a walking apparatus.

FIG. 22 is a detail diagram of another orientation device for use with a roller track in a walking apparatus. Referring to FIG. 22, another alignment embodiment is shown. Here, the support foot 2240 can be realigned with a frame 2210 using an angle guide 2290 attached above a roller track 2250. When the support foot 2240 becomes misaligned during a movement cycle, and the support foot is lifted above the ground, the angle guide 2290 will push the support foot back into alignment.

Figure 23:
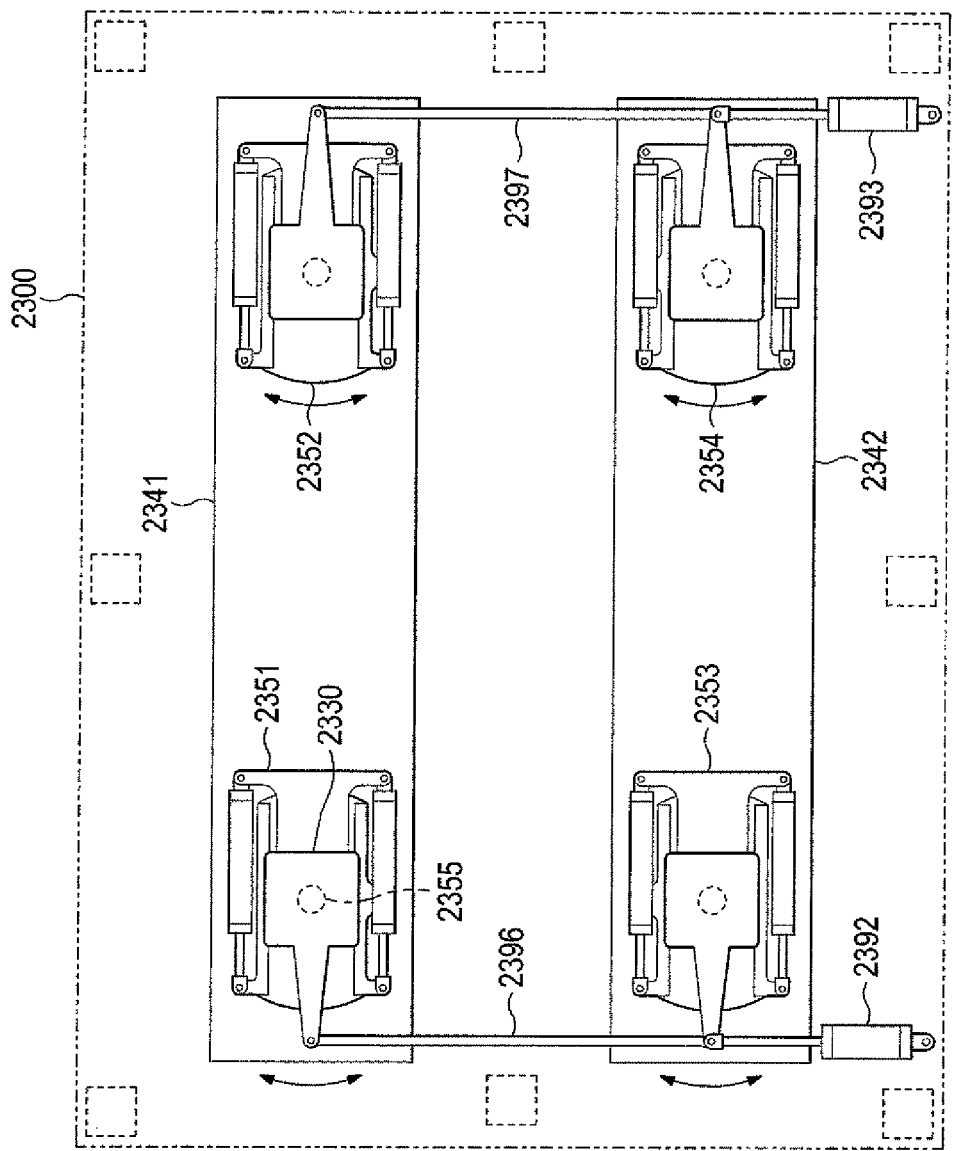
FIG. 23 is a detail diagram of a linking system used to steer roller tracks of multiple walking apparatus.

FIG. 23 is a detail diagram of a linking system used to steer roller tracks of multiple walking apparatus. Referring to FIG. 23, a linking system is used to steer multiple walking devices together in transporting a load 2300. Here, the linking system includes a cylinder (hydraulic or otherwise) 2392 and 2393 connected to two or more walking machines 2351, 2353 and 2352, 2354, respectively, via connecting rods 2396 and 2397, respectively. Here, the cylinders 2392, 2393 can be activated to rotate the connected ones of the walking machines in a desired direction. Although multiple walking devices are positioned on common support feet 2341, 2342 in this embodiment, the walking devices on each common support foot do not necessarily have to be connected to the same connecting rod 2396, 2397. This is so more steering modes can be utilized such as spin-steering etc. where walking device connected to the same support foot can be oriented in different directions.

Figure 24:
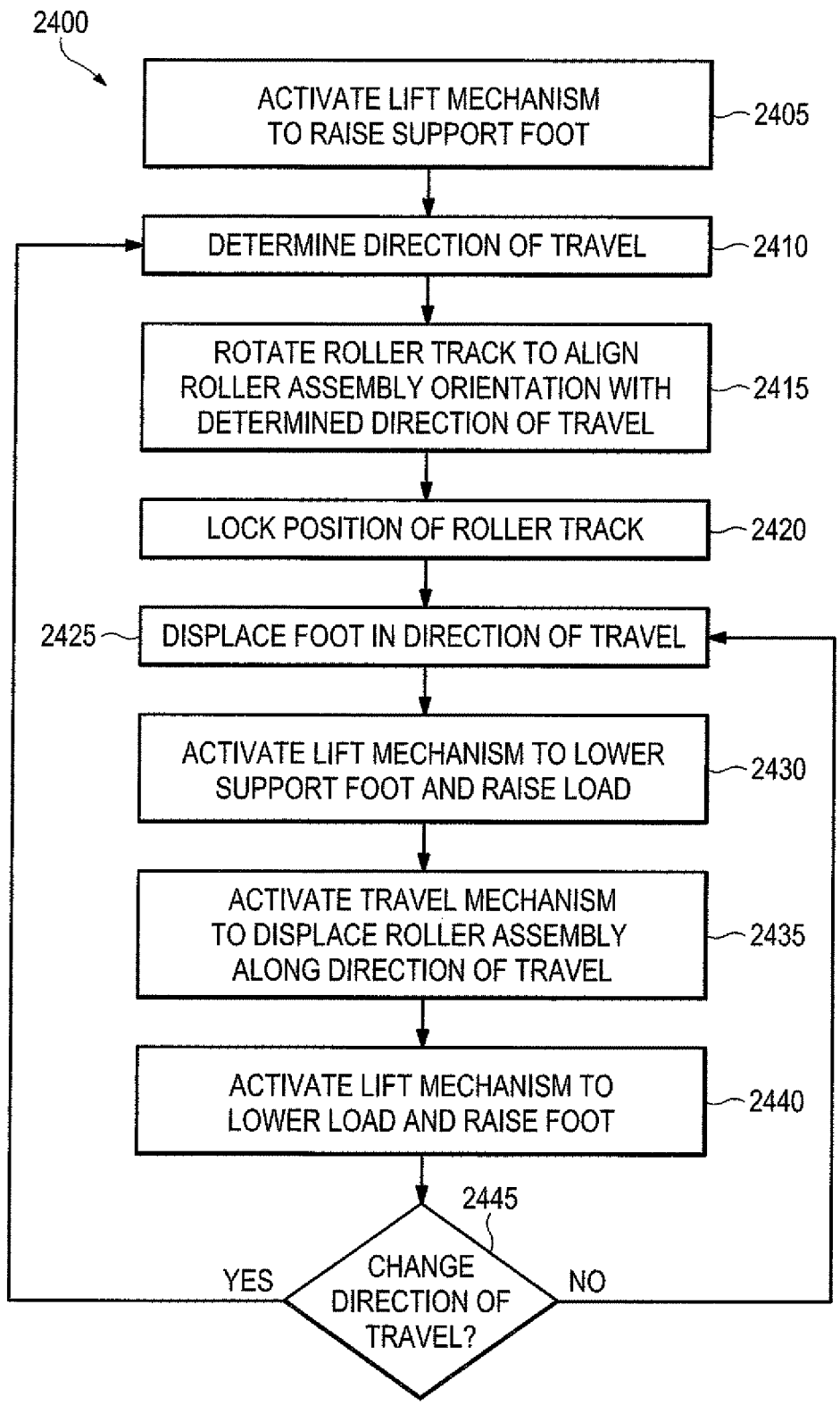

FIG. 24 is a flow diagram illustrating processes used to operate a walking apparatus. Referring to FIG. 24, a flow 2400 begins with a first process 2405 where a lift mechanism is activated to raise the support foot. Flow 2400 then proceeds to process 2410 where a direction of travel is determined. The roller track is then rotated in process 2415 to align the roller assembly orientation with the determined direction of travel. The position of the roller track is locked in process 2420 and the foot is displaced in the direction of travel in process 2425. The lift mechanism is activated to lower the support foot and raise the load in process 2430. In process 2435 the travel mechanism is activated to displace the roller assembly along the direction of travel. The lift mechanism is activated in process 2440 to lower the load and raise the foot. It is then determined if the direction of travel needs to be changed for the next movement in process 2445. If it does not need to be changed, flow 2400 returns to process 2425 where the foot is again displaced in the direction in travel. Alternatively, when it is determined that the direction of travel does need to be changed in process 2445, flow 2400 returns to process 2410 where the new direction of travel is determined.

In another example embodiment, a method of steering a load transporting device connected to a load-bearing frame supporting a load is provided. Here, the load transporting device includes a lift mechanism structured to lift the load-bearing frame, a roller assembly coupled to the lift mechanism and configured to move over a roller track in a first direction by being manipulated by a travel mechanism, and a support foot connected to the roller track with a pin connector. The method includes activating the lift mechanism to raise the support foot off of the ground surface, determining a direction of travel of the load, and rotating the roller track relative to the support foot, where the roller track rotated to align the first direction with the direction of travel. Afterwards, the method includes locking the position of the roller track relative to the support foot, activating the lift mechanism to lower the support foot to the ground surface and raising the load supported by the frame, and activating the travel mechanism to displace the roller assembly in the first direction.

Figure 25:
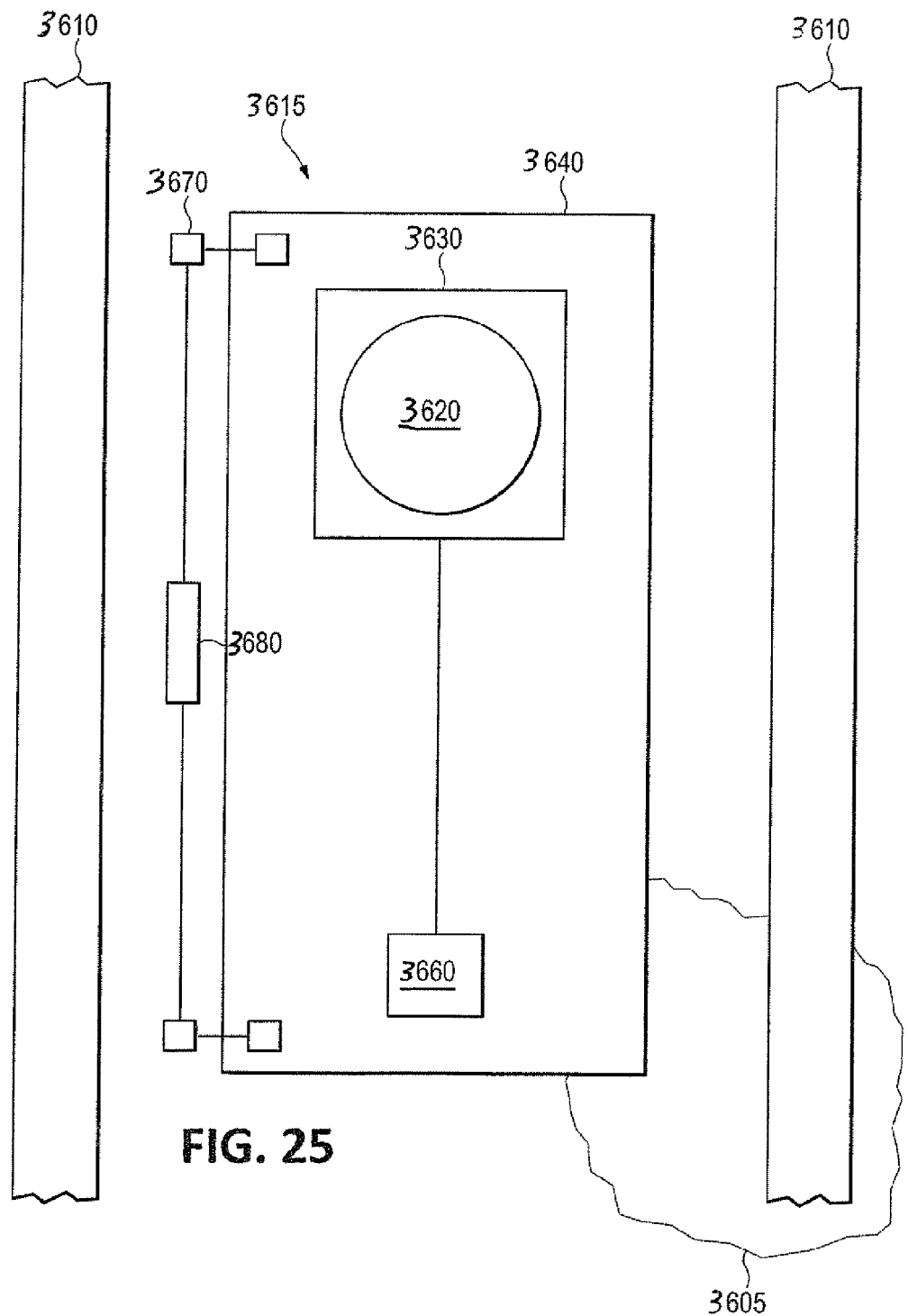
FIG. 25 is a schematic diagram of a top view of a walking apparatus.

FIG. 25 is a schematic diagram of a top view of a walking apparatus. Referring to FIG. 25, a load transporting apparatus 3615 is configured to move a load (e.g., element 100 FIG. 1) over a base surface 3605 in one or more incremental steps each including a load-movement phase and a recovery phase. The load transporting apparatus 3615 includes a lift mechanism 3620 structured to lift a load-bearing frame 3610 supporting the load and a support foot 3640 connected to the lift mechanism, the support foot structured to interface with the base surface 3605. A roller assembly 3630 is also coupled to the lift mechanism 3620. A travel mechanism 3660 is coupled to the roller assembly 3620, and is structured to displace the roller assembly relative to the support foot 3640. The load transporting apparatus also includes one or more linking devices 3670 coupled to the support foot 3640, and one or more biasing devices 3680 coupled to the linking devices. The biasing devices 3680 are structured to become activated during a load-movement phase when the roller assembly 3630 is non-linearly displaced by the travel mechanism 3660 relative to the support foot 3640, and structured to return the support foot to an aligned position relative to the load-bearing frame 3610 during a recovery phase. Here, the support foot 3640 may be aligned with the load-bearing frame 3610 when a longitudinal centerline of the support foot is parallel with a main beam of the load-bearing frame.

In these embodiments, the linking devices 3670 are coupled to the biasing device 3680 so that when the roller assembly 3630 moves the load in a direction different than the orientation of the support foot 3640, a deflection force is generated and/or stored as potential energy in the biasing device 3680. This deflection force may be stored by deforming the biasing device 3680 within the elastic region of a stress-strain curve associated with a material of the biasing device. For example, in embodiments where the biasing device 3680 is a torsional bar, the deflection force transmitted to the biasing device during the non-linear displacement or movement may cause the torsional bar to twist.

The contact between the support foot 3640 and the base or ground surface 3605 creates substantial frictional forces that prevent the support foot from rotating or moving during the non-linear displacement. During the recovery phase of the walking cycle, the support foot 3640 is raised above the base surface 3605, which eliminates the frictional forces between the foot and the base surface. Once the support foot 3640 begins to lose contact with the base surface 3605, the potential energy stored in the biasing device 3680 is used to return the support foot to an aligned position relative to the load-bearing frame 3610. The alignment of the load-bearing frame 3610 is dictated by the movement of the roller assembly 3630 by the travel mechanism 3660. Hence, when the roller assembly 3630 is non-linearly displaced (e.g., moved such as shown in FIG. 5), the orientation of the load-bearing frame 3610 becomes skewed from the orientation of the support foot 3640. In the above example, where the biasing device 3680 is a torsional bar, the support foot 3640 is returned to a position aligned relative to the load-bearing frame 3610 when the support foot loses contact with the base surface 3605 and the torsion bar is allowed to "untwist," thereby re-orienting the support foot. In other words, the torsion bar is activated when an angular displacement occurs between the support foot 3640 and the load-bearing frame 3610, where the activation of the torsion bar including a torquing force being applied to the torsion bar.

Although a torsion bar is discussed as the biasing device 3680, may different types of biasing devices may be used in other embodiments, such as leaf springs, coil springs, chains, hydraulic cylinders, motors, or any other type of device that can be deflected and/or store potential energy to apply a realignment force to the support foot 3640.

Figure 26A:
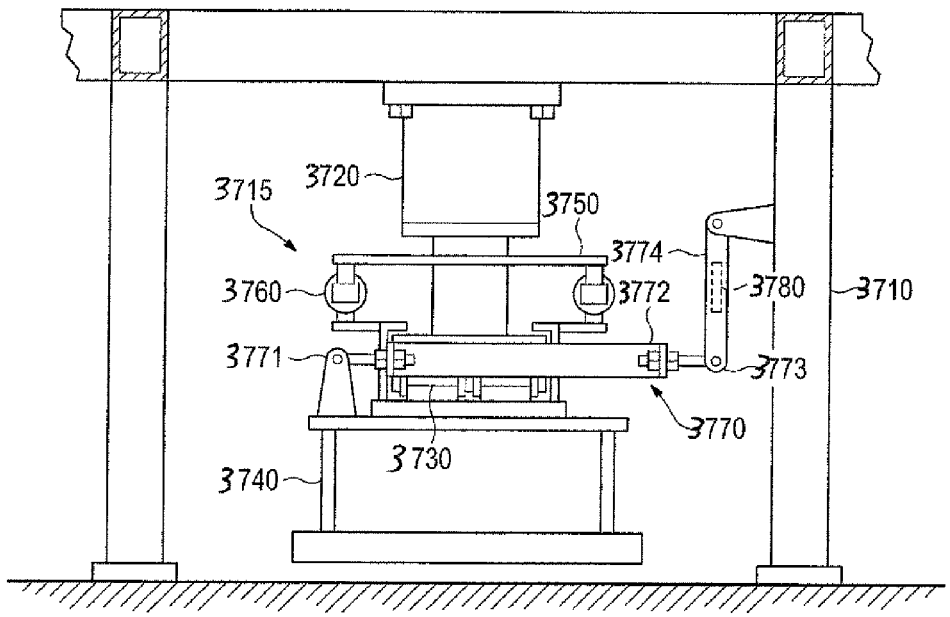
FIG. 26A is a side view of an example walking apparatus in a recovery position.
Figure 26B:
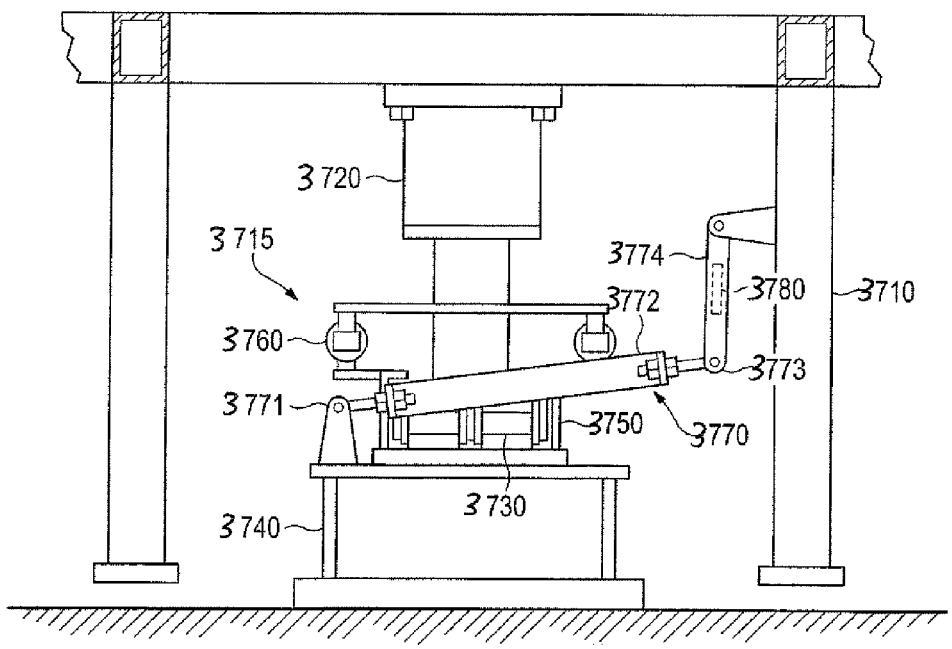
FIG. 26B is a side view of the example walking apparatus shown in FIG. 26A in a load-movement position.

FIG. 25 is presented in a schematic style view as many possible variations in the appearance and mechanical structure of the load transporting apparatus 3615 exist. FIGS. 26A and 26B provide a more detailed view of one embodiment of a load transporting apparatus. FIG. 26A is a side view of an example walking apparatus in a recovery position. FIG. 26B is a side view of the example walking apparatus shown in FIG. 26A in a load-movement position. Referring to FIGS. 26A and 26B, a load transporting or walking apparatus 3715 includes a lift mechanism 3720, a roller assembly 3730, a roller track 3750, and a support foot 3740. The lift mechanism 3720 may include a hydraulic jack suspended from a horizontal beam of the load-bearing frame 3710. Additional details regarding the structure of the load transporting apparatus 3715 can be found in the co-pending applications.

The roller track 3750 of the walking apparatus 3715 may be coupled to the support foot 3740 with a connection mechanism that allows the support foot to rotate relative to the roller track. Various connection mechanisms may be used to facilitate this relative rotation, such as a rotation pin described below in FIG. 28B and in the co-pending applications. In addition, the lift mechanism 3720 may be structured to allow the roller assembly 3730 to rotate about a substantially vertical axis in the center of a cylinder rod of the lift mechanism. That is, the roller assembly 3730 may also be free to rotate around the cylinder rod of the lift mechanism 3720.

The walking apparatus 3715 may also include a travel mechanism 3760 that is connected to the roller track 3750 and coupled to the roller assembly 3730 such that when the travel mechanism is activated, the roller assembly moves relative to the roller track. In the embodiment shown in FIGS. 7A and 7B, the travel mechanism 3760 includes two travel cylinders mounted on the roller track 3750 on opposite sides of the roller track. Here, the travel cylinders of the travel mechanism 3760 may balance the load being moved by the roller assembly 3730 over the roller track 3750. In other embodiments, one travel cylinder, or three or more travel cylinders may be used to move the roller assembly 3730 relative to the roller track 3750. In other embodiments, the travel mechanism 3760 may include different movement structures, such as pulleys, levers, winches, tracks, etc.

In the embodiments shown in FIGS. 26A and 26B, the roller assembly 3730 may include a plurality of rollers or roller chain that rotate as well as roll on the roller track 3750. That is, in some embodiments, the roller assembly 3730 may include a WBOT series roller assembly from Hilman Rollers. Due to the configuration of the roller chain 3730 of the roller assembly 3730 and the tolerance between the roller assembly and the roller track 3750 of the walking machine 3715, the rollers of the roller chain will typically be engaged with the roller track during operation and use of the walking machine.

The roller assembly 3730 may be secured to the lower end of the lift mechanism 3720, with the roller assembly being captured within a U-shaped roller track 3750. The roller assembly 3730 may be configured to roll along the bottom inside surface of the roller track 3750 as well as along the underside of the two upper flanges of the roller track. The one or more travel cylinders 3760 may be coupled between the lift mechanism 3720 and the roller track 3750. Accordingly, as will be understood from the more detailed discussion below, these travel cylinders 3760 permit for the translation of the roller track 3750 relative to the lift mechanism 3720 and vice versa. As discussed above, the roller track 3750 may be secured to the elongated ground-engaging foot 3740 (support foot) via a rotational pin (not shown in FIG. 7, but similar to element 3955 of FIG. 28B), which enables the roller track to be rotationally positioned relative to the foot for steering of the walking machine 3715.

Figure 27A:
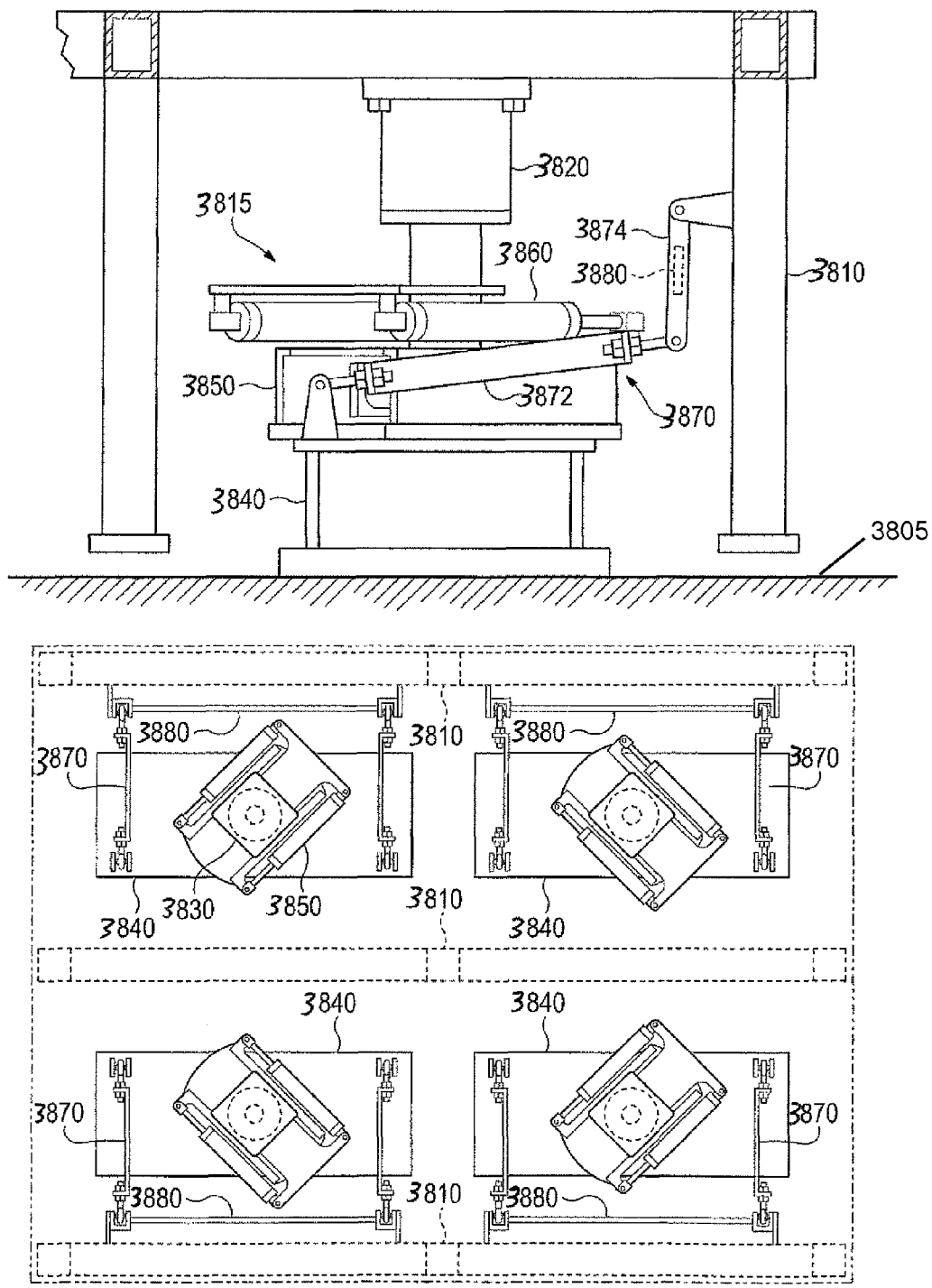

As shown in FIGS. 26A and 26B, a linking mechanism 3770 is coupled to the support foot 3740 and a biasing device 3780 (shown more clearly as element 880 in FIG. 27A). In some embodiments, the linking mechanism 3770 may include a first linking device attached at a first end of the support foot 3740, where a second linking device connected to a second end of the support foot opposite of the first end of the first support foot (such as shown in FIGS. 6 and 27A). The biasing device 3780 may be coupled between the first and second linking devices of the linking mechanism 3770.

In the embodiments shown in FIGS. 26A and 26B, the linking mechanism 3770 includes a first linking rod 3772 connected to the support foot 3740 with a first pivot joint 3771. In some embodiments, the first pivot joint 3771 may be a spherical rod end bearing configured to allow movement in three degrees of freedom. In other embodiments, the first pivot joint 3771 may be another type of joint, such as a hinge joint, that restricts movement to one or two degrees of freedom.

The linking mechanism 3770 may also include a second linking rod 3774 connected to the first linking rod 3772 with a second pivot joint 3773. As with the first pivot joint 3771, the second pivot joint 3773 may be a spherical rod end bearing, or any other type of joint. The second linking rod 3774 may further be connected to the load-bearing frame 3710. In other embodiments, the one or more biasing devices 3780 are also coupled to the load-bearing frame 3710.

As shown in FIGS. 26A and 26B, the first and second pivot joints 3771, 3773 allow linking mechanism 3770 to move vertically with the support foot 3740 without deflecting or otherwise activating the biasing device 3780.

As also shown in the co-pending applications, a walking apparatus 3715 may also include one or more guide devices positioned adjacent to the roller assembly 3730, and one or more biasing devices coupled to the guide devices. Here, the biasing devices may be structured to become deflected during a load-movement phase when the movement of the roller assembly 3730 deviates from a set direction of travel, and structured to return the support foot to a centered position relative to the support foot 3740 during a recovery phase.

FIGS. 27A, 27B, 27C, and 27D are side and top views of walking apparatuses that illustrate an example operation progression of a load transporting system. Here, FIGS. 27A-27C may show a load-movement phase of a walking cycle, while FIG. 27D may show a recovery phase of a walking cycle, where the walking apparatus is in a spin steering mode.

Referring to FIG. 27A, a walking apparatus includes a support foot 3840 positioned on a base surface 3805 and connected to roller track 3850. The roller track 3850 is structured to allow a roller assembly 3830 to move relative to the roller track when activated by a travel mechanism 3860. A lift mechanism 3820, such as hydraulic jack, is connected between the roller assembly 3830 and load-bearing frame 3810. A linking device 3870 includes a first linking member 3872 that is connected to the support foot, and a second linking member 3874 that connects the first linking member to the load-bearing frame 3810. A biasing device 3880 is also connected to the linking device 3870, and structured to become deflected or activated during a non-linear movement of the roller assembly 3830 relative to the support foot 3840. As shown in FIG. 27A, the walking apparatus 3815 is in an initial position of a walking cycle in a spin steering mode. The roller tracks 3850 of each walking apparatus 3815 are oriented in a desired direction of travel. Here, in this first step of making a spin movement, the lift mechanisms 3820 are activated to lift the load-bearing frame 3810 (and load) above the base surface.

Figure 27B:
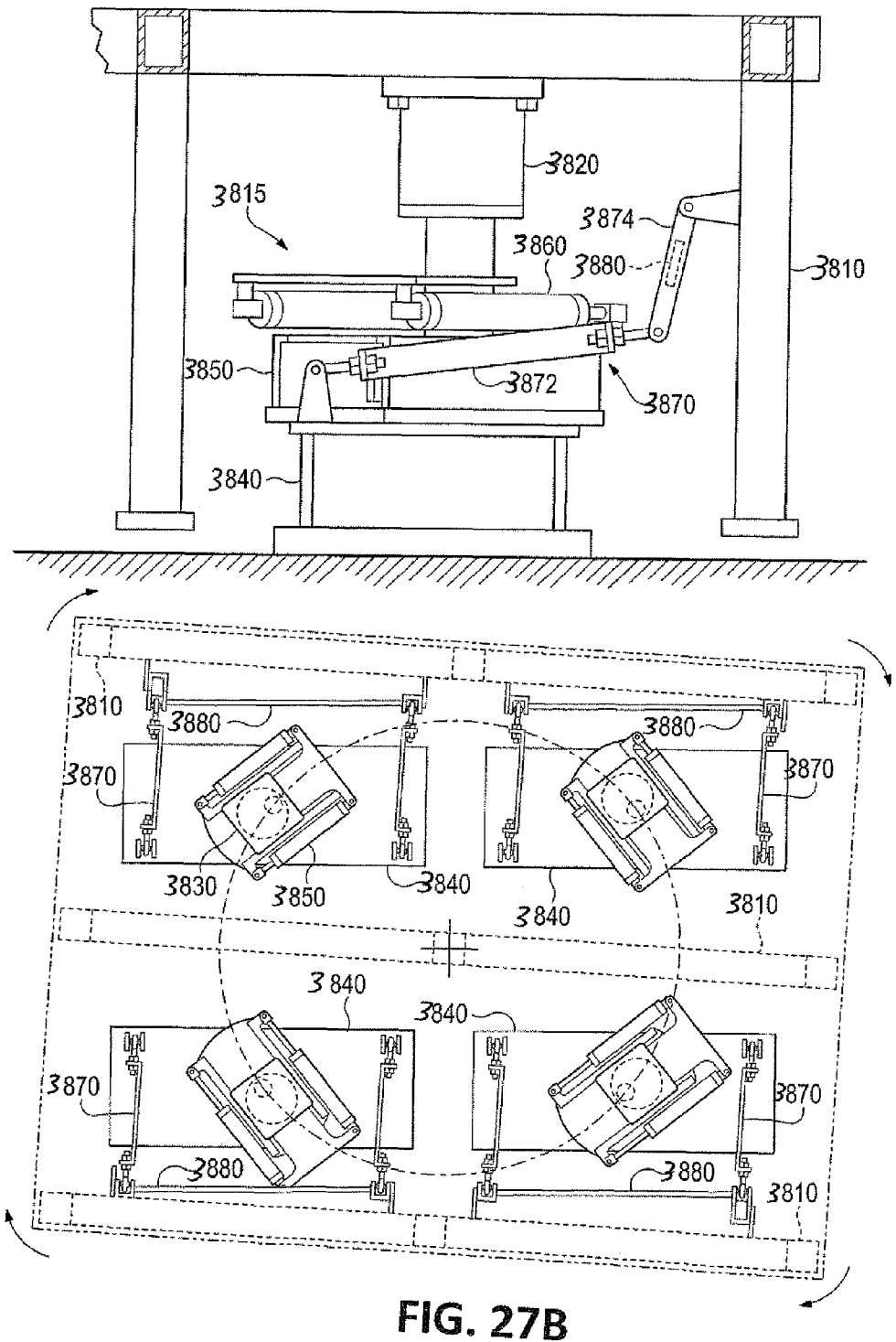

Referring to FIG. 27B, a step in a walking motion of the walking machine is illustrated. Specifically, as indicated by the arrows showing rotation of the load-bearing frame 3810, the travel mechanism 3860 is activated to displace the roller assembly 3830 relative to the roller track 3850 as shown. In this second step the walking system is moved in a circular or spin direction. Here, the travel cylinders of the travel mechanism 3860 are actuated and the load-bearing frame 3810 moves to a new angle. The support feet 3840 are on the support surface and an angle of displacement occurs between the load-bearing frame 3810 and the support feet. This non-linear movement or angular displacement causes an angular change in the biasing device 3880. In embodiments where the biasing device 3880 is a torsion bar, the resulting torque on the torsion bar causes the part of the linking device 3870 to be in compression and causes another part of the linking device to be in tension.

Figure 27C:
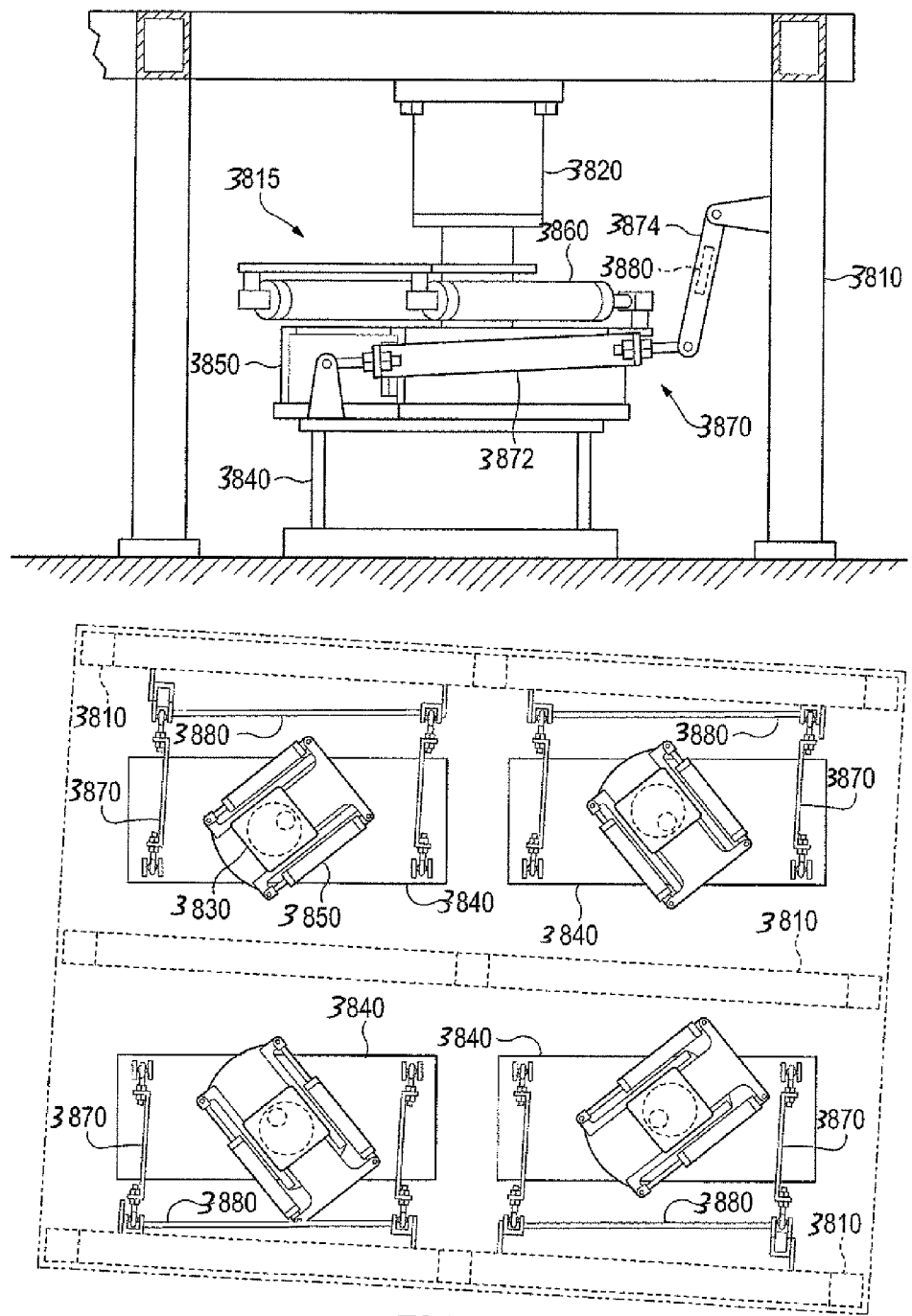

Referring to FIG. 27C, the travel mechanism 3860 has finished moving the roller assembly 3830 and load-bearing frame 3810. Additionally, the lift mechanism 3820 has been activated to lower the load and load-bearing frame 3810. Here, the load-bearing frame 3810 has just contacted the ground surface. However, the support foot 3840 is still positioned on the ground surface as well. Hence, the biasing devices 3880 are still in a deflected, activated, or biased state.

Figure 27D:
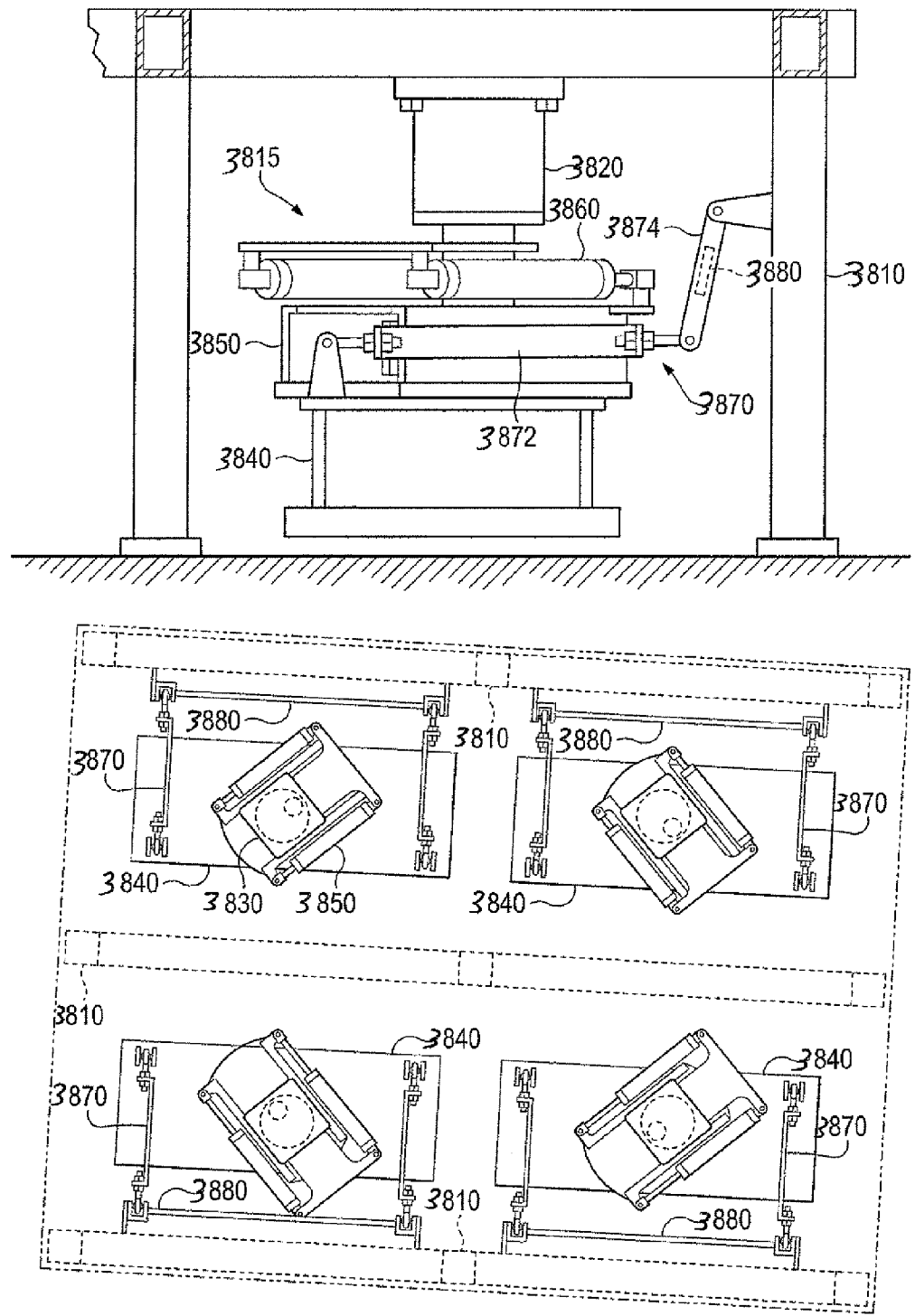

Referring to FIG. 27D, the lift mechanism 3820 is continued to be operated such that the support foot 3840 loses contact with the ground surface. As soon as this connection between the support foot 3840 and the ground surface disappears, the biasing device 3880 causes the support foot to "snap" back into alignment with the load-bearing frame 3810 as shown.

Figure 28A:
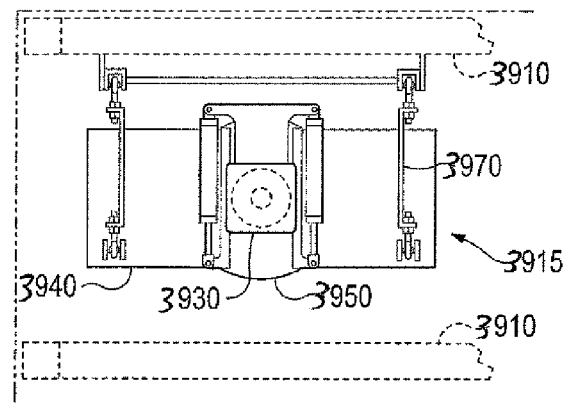
FIG. 28A is a top view of a walking apparatus in a perpendicular orientation.
Figure 28B:
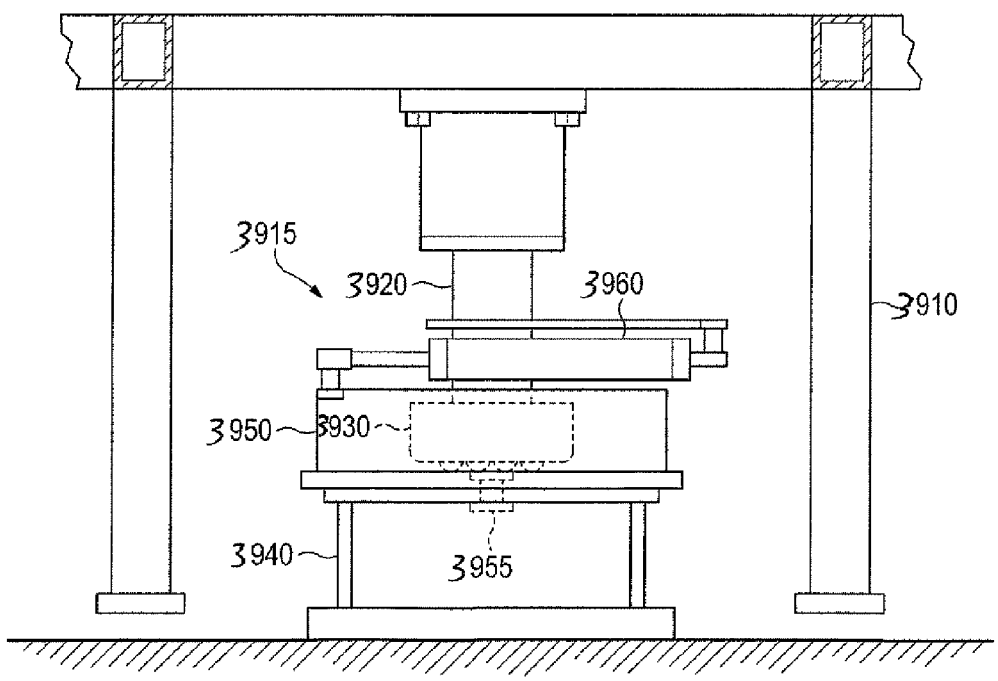
FIG. 28B is a side view of the walking apparatus shown in FIG. 28A in a load-movement position.
Figure 28C:
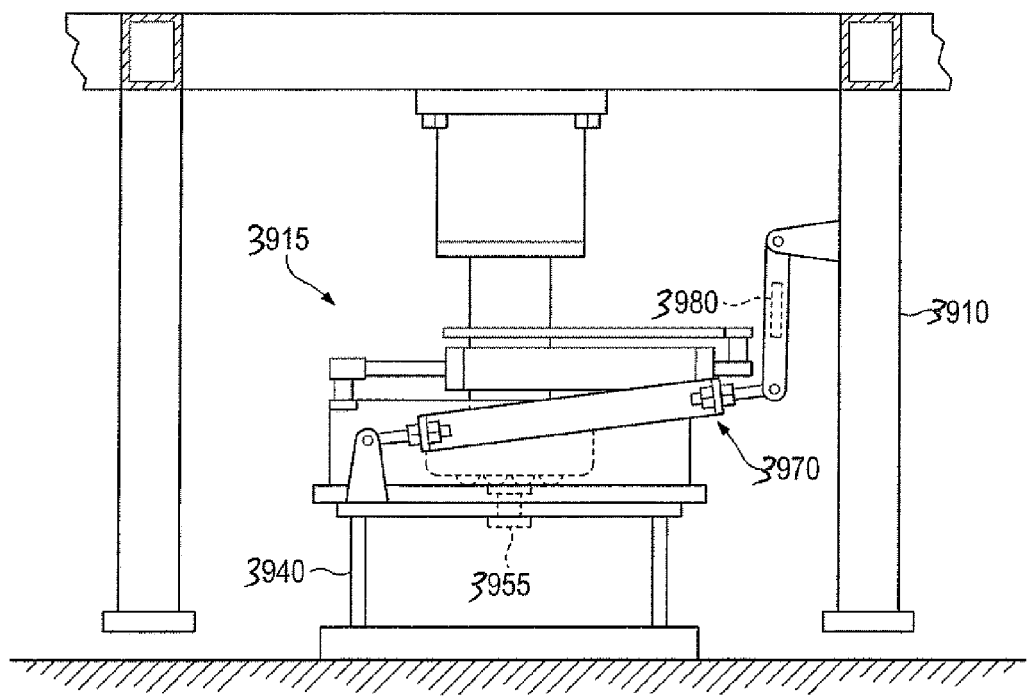
FIG. 28C is a side view of the walking apparatus shown in FIG. 28A in a recovery position.

FIGS. 28A-28C illustrate another embodiment of a walking apparatus. Here, FIG. 28A is a top view of a walking apparatus in a perpendicular orientation. FIG. 28B is a side view of the walking apparatus shown in FIG. 28A in a load-movement position where the linking devices have been removed for clarity sake. FIG. 28C is a side view of the walking apparatus shown in FIG. 28A in a recovery position with the linking devices added back in for reference purposes.

Referring to FIGS. 28A-28C, a walking apparatus 3915 includes a lift mechanism 3920 coupled to a load-bearing frame 3910 that supports a load to be moved. The lift mechanism 3920 is connected to a roller assembly 3930 that is positioned on a roller track 3950. The roller assembly 3930 is moved relative to the roller track 3950 with one or more travel mechanisms 3960. The roller track 3950 is coupled to a support foot 3940 with a rotation pin 3955, such as a king pin or other connection means that allows rotation of the roller track relative to the support foot as also described in the co-pending applications. A linking device 3970 is coupled between the support foot 3940 and the load-bearing frame 3910. A biasing device 3980 is connected to the linking device 3970. As described above, the biasing device 3980 becomes deflected or activated when the roller assembly 3930 moves in a non-linear direction relative to the support foot 3940. For example, the roller track 3950 is oriented perpendicular to the orientation of the support foot 3940 in FIG. 28A. As the roller assembly 3930 moves in the direction of the orientation of the roller track 3950, the roller assembly and the load-bearing frame will also move substantially perpendicularly to the orientation of the support foot 3940.

Here, the movement of the roller assembly 3930 in this orientation does not activate or deflect the biasing device 3980 because the linking devices 3970 include joints that allow for the free movement of the roller assembly. The linking devices 3970 may be structured in this manner because the orientation of the support foot 3940 relative to the load-bearing frame 3910 does not change.

Figure 29:
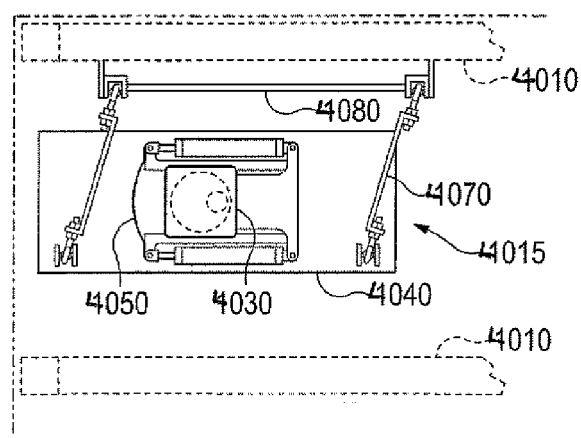
FIG. 29 is a top view of a walking apparatus after a load-movement phase of a walking cycle completed in a parallel direction.

This can also be seen when the roller assembly is moved parallel to the orientation direction of the support foot, as shown in FIG. 29. Referring to FIG. 29, a walking apparatus 4015 has just completed a load-movement phase of a walking cycle where a roller track 4050 is oriented in the same direction as a support foot 4040. Here, the roller assembly 4030 was moved to the right, along with the load-bearing frame 4010, as shown. The joints of the linking device 4070, however, allow the linking device to be angled from the linear movement without deflecting or otherwise activating the biasing device 4080. During a recovery phase, the load-bearing frame 4010 is lowered and the support foot 4040 is raised above a base surface. The support foot 4040 can then be repositioned relative to the roller assembly 4030 by activation of the transport mechanism 3960 (FIG. 28B).

Some of the embodiments discussed above rely on the load-bearing frame as a reference point to realign the support feet during non-linear movements of the load. However, in other embodiments, other linking and biasing devices can be utilized to maintain alignment of the support feet. Some of these techniques are discussed below with respect to FIG. 30 and FIGS. 31A-31E.

Figure 30:
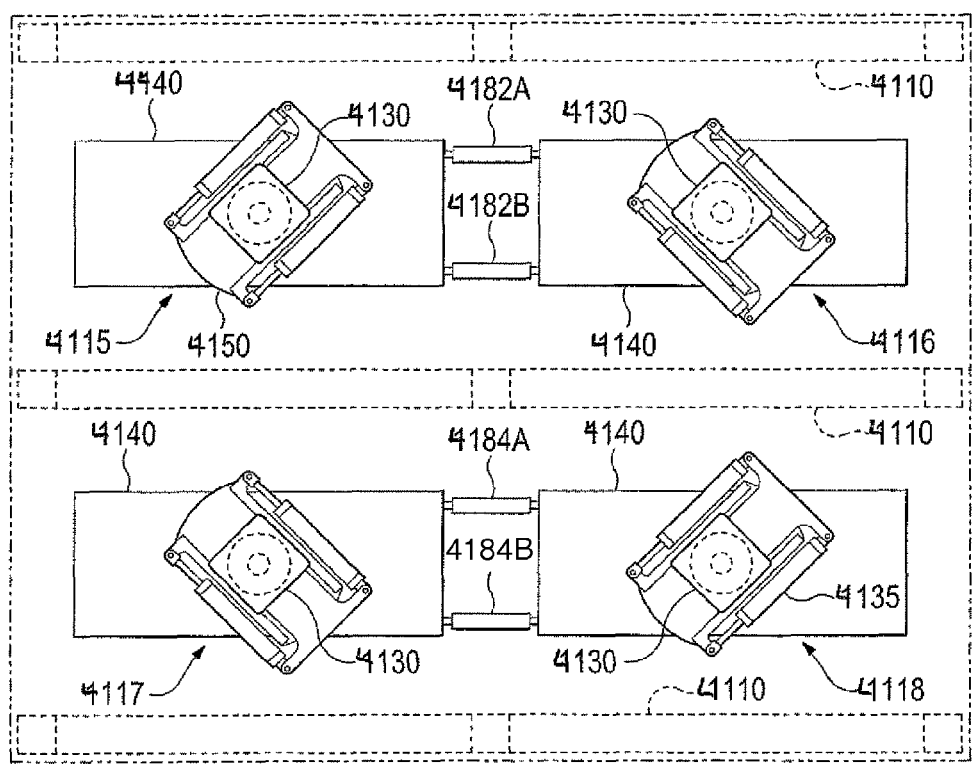
FIG. 30 is a top view of a load movement system.

FIG. 30 is a top view of a load movement system. Referring to FIG. 30, multiple load transporting apparatuses 4115, 4116, 4117, 4118 are used to move a load supported by a load-bearing frame 4110. Each of these load transporting apparatuses 4115, 4116, 4117, 4118 include a roller track 4150, a roller assembly 4130 that moves relative to the roller track, and a support foot 4140. Here, load transporting apparatuses that are in orientation-rows are connected with one or more biasing devices 4182, 4184. In particular, the support foot 4140 of a first load transporting apparatus 4115 is connected to the support foot of a second load transporting apparatus 4116 with two biasing devices 4182A and 4182B. These biasing devices 4182A, 4182B ensure that the first and second load transporting apparatuses 4115, 4116 are maintained in alignment with one another and the load-bearing frame 4110.

Here, the linking devices include a first linking device 4182A coupled between a first side of a first end of the first support foot 4140 and a first side of a first end of the second support foot 4140, and a second linking device 4182B coupled between a second side of the first end of the first support foot and a second side of the first end of the second support foot. The placement of the first and second linking devices 4182A, 4182B may ensure that the support feet 4140 are aligned together during a non-linear movement.

Similarly, the support foot 4140 of a third load transporting apparatus 4117 is connected to the support foot of a fourth load transporting apparatus 4118 with two biasing devices 4184A and 4184B. These biasing devices 4184A, 4184B ensure that the third and fourth load transporting apparatuses 4117, 4118 are maintained in alignment with one another and the load-bearing frame 4110.

Although FIG. 30 illustrates one example embodiment of biasing device connections that can maintain alignment of a support foot relative to a load-bearing frame, many different configuration variations exist. FIGS. 31A, 31B, 31C, 31D, and 31E are diagrams of walking apparatuses with various alignment restoration devices that illustrate some of these variations.

Referring to FIG. 31A, a linking device 4271 is connected between a first support foot 4240 of a first load transporting apparatus 4215 and a second support foot 4241 of a second load transporting apparatus 4216. The linking device 4271 may be attached to the first support foot 4240 with a first joint 4291, and may be attached to the second support foot 4241 with a second joint 4292. In some embodiments, the first and second joints 4291, 4292 may be ball joints that allow rotational movement. The linking device 4271 may be rigid rod, or may include a section of chain.

Referring to FIG. 31B, a linking device 4272 is connected between a first support foot 4240 of a first load transporting apparatus 4215 and a second support foot 4241 of a second load transporting apparatus 4216. The linking device 4272 may be rigidly attached to the first support foot 4240, but may be attached to the second support foot 4241 with a first biasing device 4281 and a second biasing device 4282. The first and second biasing devices 4281, 4282 may be placed on opposite sides of the linking device 4272 to provide a balanced system to return the support feet 4240, 4241 to uniform alignment after a non-linear movement.

Referring to FIG. 31C, a first biasing device 4283 and a second biasing device 4284 are connected between a first support foot 4240 of a first load transporting apparatus 4215 and a second support foot 4241 of a second load transporting apparatus 4216. This embodiment may be similar to the shown in FIG. 30, except that the first and second biasing devices 4283, 4284 are specified as spring devices.

Referring to FIG. 31 D, the support foot 4240 of a load transporting apparatus 4215 is connected to a load-bearing frame 4210 via a first linking cylinder 4273 and a second linking cylinder 4274. The first and second linking cylinders 4273, 4274 may be hydraulic cylinders that are activated during a recovery phase of a walking cycle to return the support foot 4240 to alignment with the load-bearing frame 4210. Alternatively, the first and second linking cylinders 4273, 4274 may be spring cylinders that automatically return the support foot 4240 to alignment with the load-bearing frame 4210 during a recovery phase of a walking cycle without additional operator input.

Referring to FIG. 31E, a support foot 4240 of a load transporting apparatus 4215 is connected at each corner to a biasing device 4285, 4286, 4287, 4288. These biasing devices 4285, 4286, 4287, 4288 may ensure that the support foot 4240 is maintained in alignment with a load-bearing frame during the recovery phase of a walking cycle by releasing potential energy stored during compression and/or elongation during non-linear movements.

Figure 32:
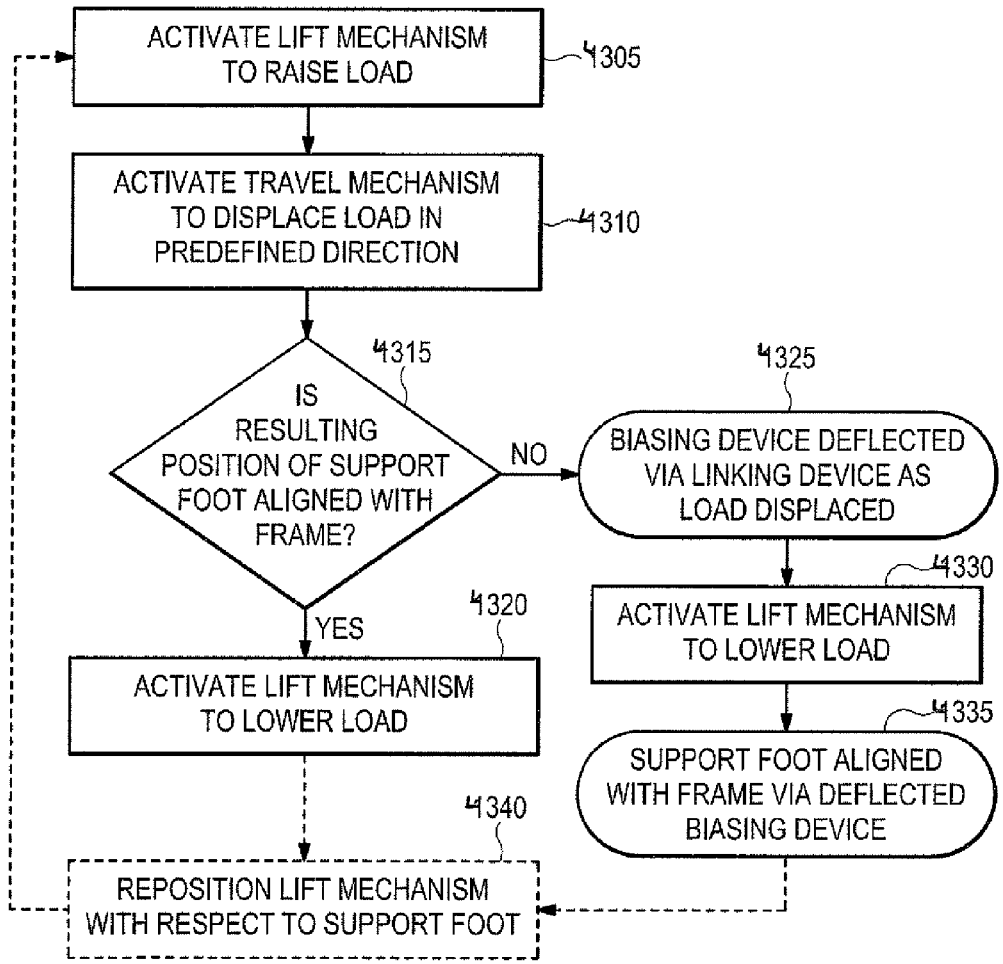
FIG. 32 is a flow diagram illustrating method of operating a load transporting apparatus.

FIG. 32 is a flow diagram illustrating method of operating a load transporting apparatus. In particular, the flow diagram of FIG. 32 illustrates a method of aligning a support foot of a load transporting device relative to a load-bearing frame during a load-transporting movement. The load transporting device includes a roller assembly coupled to a lift mechanism, a travel mechanism structured to displace the roller assembly relative to the support foot, one or more linking devices coupled to the support foot, and one or more biasing devices coupled to the linking devices.

Referring to FIG. 32, a flow begins at process 4305 where the lift mechanism is activated to lower the support foot to a ground surface and raising a load supported by the load-bearing frame. In process 4310, the travel mechanism is activated to displace the roller assembly connected to the lift mechanism relative to the support foot and ground surface, thereby moving a position of the load. Depending on the movement of the travel mechanism relative to the support foot, the position of the support foot may be aligned with the load-bearing frame or may not be aligned with the load-bearing frame. As discussed above, when the load is moved in a direction perpendicular to the orientation of the support foot, or moved parallel to the orientation of the support foot, the support foot typically remains aligned with the load-bearing-frame. If the load is moved in a different direction relative to the support foot, such as when the load is being steered in a non-linear path, the support foot can become misaligned with the load-bearing frame. In process 4315, it is observed whether the resulting position of the support foot is aligned with the load-bearing frame.

When the support foot remains aligned with the load-bearing frame, the flow proceeds to process 4320 where the lift mechanism is activated to lower the load and raise the support foot. However, when the support foot is not aligned with load-bearing frame, the biasing device is deflected via the linking device as the load is displaced as shown in step 4325. That is, the biasing devices are deflected when movement of the roller assembly results in an angular displacement between a centerline of the support foot and an orientation of the load-bearing frame. In process 4330, the lift mechanism is activated to lower the load and raise the support foot from the ground surface. As the support foot loses contact with the ground surface, the deflected biasing device acts on the support foot to align the support foot with the load-bearing frame, as shown in step 4335. That is, the centerline of the support foot is automatically aligned relative to the orientation of the load-bearing frame. After step 4335 or process 4320, the flow may include optional process 4340 where the lift mechanism is repositioned with respect to the support foot. If further walking steps are needed to move the load to a final position, the flow may return to process 4305 to initiate another walking cycle.

As described above, some examples are directed to a load transporting apparatus configured to move a load over a ground surface in one or more incremental steps each including a load-movement phase and a recovery phase. To move the load, the load transporting apparatus is coupled to a load-bearing frame configured to support the load. The load transporting apparatus includes a first support foot structured to interface with the ground surface, the first support foot having a length, width, and longitudinal centerline bisecting the width of the first support foot. The load transporting apparatus also includes a second support foot structured to interface with the ground surface, the second support foot also having a length, width, and longitudinal centerline bisecting the width of the second support foot.

First and second roller tracks are respectively coupled to the first support foot and second support foot via a first king pin connector and a second king pin connector. Additionally, first and second roller assemblies are respectively positioned on the first and second roller tracks. Each roller assembly includes a roller frame and one or more rollers set in the roller frame. First and second lift mechanisms are respectively coupled to the first and second roller assemblies. Each of the first and second lift mechanisms includes a lift cylinder connected to the load-bearing frame, and a cylinder rod, where each of the first and second lift mechanisms are structured to lift the load-bearing frame at the start of the load-movement phase.

The load transporting apparatus also includes first and second travel mechanisms respectively coupled to the first and second roller assemblies. Each of the travel mechanisms are structured to move the respective roller assembly relative to the respective support foot during the load-movement phase. A first linking device coupled to the first support foot, and a second linking device coupled to the second foot. A first biasing device is connected to the first linking device, where the first biasing device is structured to become activated during a load-movement phase when the first roller assembly is non-linearly displaced by the first travel mechanism relative to the first support foot, and structured to return the first support foot to an aligned position relative to the load-bearing frame during a recovery phase. A second biasing device is connected to the second linking device, where the second biasing device is structured to become activated during a load-movement phase when the second roller assembly is non-linearly displaced by the second travel mechanism relative to the second support foot, and structured to return the second support foot to an aligned position relative to the load-bearing frame during a recovery phase.

In some embodiments, the first linking device is coupled between the first support foot and the second support foot. In these embodiments, the second linking device is also coupled between the first support foot and the second support foot, as shown in FIG. 30, for example. In other embodiments, the first and second biasing devices are respectively coupled to the load-bearing frame, such as in FIG. 26A, for example.

Figure 33:
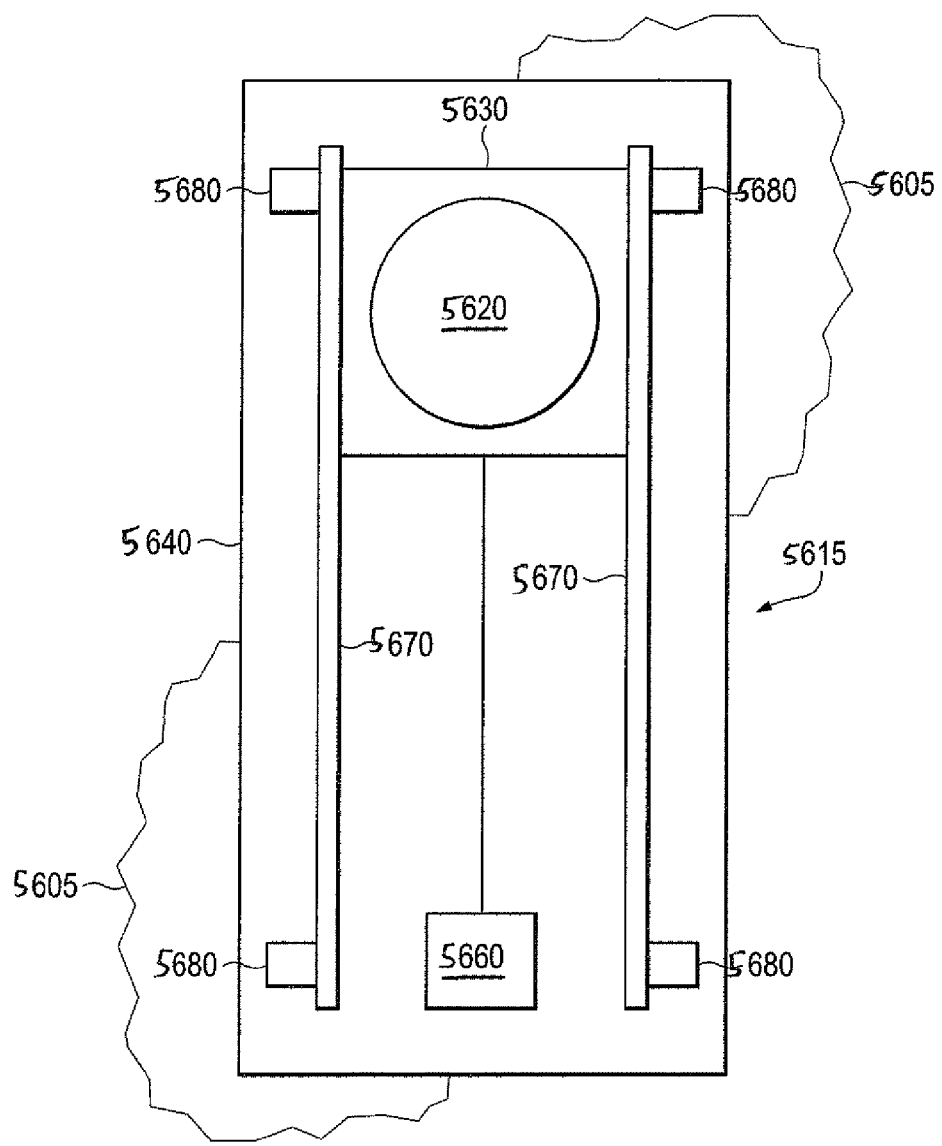
FIG. 33 is a schematic diagram of a top view of a walking apparatus.

FIG. 33 is a schematic diagram of a top view of a walking apparatus. Referring to FIG. 33, a load transporting apparatus 5615 is configured to move a load (e.g., element 100 FIG. 1) over a base surface 5605 in one or more incremental steps each including a load-movement phase and a recovery phase. The load transporting apparatus 5615 includes a lift mechanism 5620 structured to lift a load-bearing frame 5610 supporting the load and a support foot 5640 connected to the lift mechanism, the support foot structured to interface with the base surface 5605. A roller assembly 5630 is also coupled to the lift mechanism 5620. A travel mechanism 5660 is coupled to the roller assembly 5620, and is structured to displace the roller assembly relative to the support foot 5640. The load transporting apparatus also includes one or more guide devices 5670 positioned adjacent to the roller assembly 5630 and configured to guide the roller assembly during movement caused by the travel mechanism 5660. One or more biasing devices 5680 are coupled to the guide devices 5670, where the biasing devices are structured to become activated during a load-movement phase when the roller assembly 5630 is non-linearly displaced by the travel mechanism 5660 relative to a set direction of travel. The biasing devices 5680 are further structured to return the support foot 5640 to a centered position relative to the roller assembly 5630 about the longitudinal center line of the support foot during a recovery phase.

In some embodiments, the biasing devices 5680 are temporarily or permanently fixed to the support foot 5640. The orientation of the support foot 5640 in these embodiments may determine the set direction of travel. That is, the support foot 5640 may be positioned or set in a desired direction of travel prior to the start of a walking cycle. Here, the guide devices 5670 may be coupled to the biasing devices 5680, and be moveable with respect to the support foot 5640. Hence, as the roller assembly 5630 is displaced by the travel mechanism 5660, one or more of the guide devices may be displaced relative to the support foot 5640 by pressing or pulling against one or more of the biasing devices 5680. In other embodiments, the guide devices 5670 are temporarily or permanently fixed to the support foot 5640. Here, the biasing devices may be coupled to the roller assembly 5630 and move with roller assembly as it is displaced by the travel mechanism 5660. Hence, if the roller assembly 5630 is moved in a non-linear direction with respect to a centerline of the support foot 5640 or the guide devices 5670, the biasing devices 5680 may become compressed or extended to allow this displacement. In some embodiments, the one or more guide devices 5670 include guide bars positioned on opposite sides of the roller assembly 5630. The guide bars of the guide devices 5670 may be structured to be substantially parallel with the longitudinal center line of the support foot 5640. Here, the roller assembly 5630 deflects at least one of the guide bars 5670 when movement of the roller assembly by the travel mechanism 5660 deviates from the longitudinal centerline of the support foot 5640. That is, the roller assembly 5630 deflects at least one of the guide bars 5670 when the load is displaced in a non-linear movement, such as a spin motion. When the load transporting apparatus 5615 is placed in a spin motion, the lift cylinder 5620 must move in a circular path as the roller assembly 5630 is aligned in a straight path between guide bars 5670. Hence, there is a relative motion between the lift cylinder 5620 and the centerline of the support foot 5640.

As also shown in the co-pending applications, the load transporting apparatus 5615 may further include a roller track, where the support foot 5640 is directly coupled to the roller track. Here, the roller track 5650 may be coupled to the support foot with a rotation pin, such as a king pin connection device. In embodiments having these features, the rotation pin 5655 may allow the roller track 5650 to rotate with respect to the support foot 5640. Hence, the roller track 5650 may be oriented or set in a desired direction of travel even when the support foot 5640 is oriented in a different direction. The roller assembly 5630 may be positioned on the roller track 5650 and displaced relative to the roller track.

Here, the biasing devices 5680 may be connected to the roller track 5650 rather than the support foot 5640. In some embodiments, the guide device 5670 includes two guide bars positioned on opposite sides of the roller assembly 5630 and oriented substantially parallel to the longitudinal center line of the roller track 5650, which determines the set direction of travel. In these embodiments, the roller assembly 5630 deflects at least one of the guide bars 5670 when movement of the roller assembly by the travel mechanism 5660 deviates from the longitudinal centerline of the roller track 5650 (i.e., deviates from the set direction of travel).

In these and other embodiments, the biasing devices 5680 may include spring devices respectively coupling the guide devices 5670 to the support foot 5640. These spring devices may include one or more of leaf springs, coil springs, torsion springs, air springs, or any other type of device that includes an elastic property. In other embodiments, the biasing devices 5680 may include hydraulic cylinders with accumulators.

FIG. 33 is presented in a schematic style view as many possible variations in the appearance and mechanical structure of the load transporting apparatus 5615 exist. FIG. 34 provides a more detailed view of one embodiment of a load transporting apparatus. FIG. 34 is a perspective view of an example walking apparatus. Referring to FIG. 34, a load transporting or walking apparatus 5715 includes a lift mechanism 5720, a roller assembly 5730, and a support foot 5740. The lift mechanism 5720 may include a hydraulic jack suspended from a horizontal beam of the load-bearing frame 310 (FIGS. 3A and 3B).

The lift mechanism 5720 may include a lift cylinder 5721 that is connected to a load-bearing frame 310 (FIGS. 3A and 3B), and a cylinder rod 5722 coupled to the roller assembly 5730. Here, the cylinder rod 5722 may be structured to allow the roller assembly 5730 to rotate about a substantially vertical axis in the center of the cylinder rod. That is, the roller assembly 5730 may be free to rotate around the cylinder rod 5722. The connection between the roller assembly 5730 and the cylinder rod may be a bearing or one of a number of different connection variations. In one embodiment, the cylinder rod 5722 may include a groove (not shown) around side edges of a lower portion of the cylinder rod, where the groove corresponds to a retainer cuff (not shown) of the roller assembly 5730. In this example the retainer cuff is rotatable around the groove, but may easily be assembled or disassembled during installation, break-down, or transportation of the walking apparatus 5715.

Although the embodiment shown in FIG. 34 shows the lift cylinder 5721 connected to the load-bearing frame 310 (FIGS. 3A and 3B) and the cylinder rod 5722 connected to the roller apparatus 5730, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 5715 may also include a travel mechanism 5760 that is connected to the support foot 5740 and coupled to the roller assembly 5730 such that when the travel mechanism is activated, the roller assembly moves relative to the support foot. In some embodiments, the travel mechanism 5760 is attached to the support foot with a pin connection 5762 and pivot rod 5765 to allow the travel mechanism 5760 to rotate relative to the support foot. The travel mechanism 5760 may also be coupled to the roller assembly 5730 with a pin connection to allow the roller assembly to pivot relative to the travel mechanism.

Although the travel mechanism 5760 is shown as a single cylinder in FIG. 34, the travel mechanism may include two or more travel cylinders in other embodiments. In other embodiments, the travel mechanism 5760 may include different movement structures, such as pulleys, levers, winches, tracks, etc.

In the embodiments shown in FIG. 34, the roller assembly 5730 may include a plurality of rollers or roller chain that rotate as well as roll on the roller track 5750. That is, in some embodiments, the roller assembly 5730 may include a WBOT series roller assembly from Hilman Rollers. Due to the configuration of the roller chain of the roller assembly 5730 and the tolerance between the roller assembly and the support foot 5740 of the walking machine 5715, the rollers of the roller chain will typically be engaged with the support foot 5740 during operation and use of the walking machine.

The roller assembly 5730 may be secured to the lower end of the lift mechanism 5720, with the roller assembly being captured within a U-shaped track created in part by the guide devices 5770. The roller assembly 5730 may be configured to roll along the bottom inside surface of the support foot 5740 as well as along the underside of two upper flanges (not shown for clarity purposes) that hold the roller assembly and support foot 5740 when the walking apparatus 5715 is raised above the ground surface 5705 by the lift mechanism 5720 during the recovery phase of a walking cycle. As will be understood from the more detailed discussion below, the travel mechanism 5760 permits for the translation of the support foot 5740 relative to the lift mechanism 5720 and vice versa.

As shown in FIG. 34, guide devices 5770 are positioned on either side of the roller apparatus and extend along a travel path of the roller assembly in a direction substantially parallel to the direction of travel. The guide devices 5770 may include stops on either end to help restrict the movement of the roller assembly 5730. In addition, the guide devices 5770 may include outward-facing tabs to interface with biasing devices 5780. In this illustrated embodiment, the biasing devices 5780 are leaf springs that are attached to spring stops 5785 at either end of the leaf springs. The spring stops 5785 are further fixed to the support foot 5740 to provide fixed points of reference for the leaf springs 5780. In operation, which is discussed in additional detail below with reference to FIGS. 35A-35D, the leaf springs 5780 are deflected outward when the roller assembly 5730 pushes against and shifts the guide devices 5770. The leaf springs 5780 may include steel, plastic, or any other type of material that can deflect without permanently damaging the material (i.e., without reaching a plastic region of the material's stress-strain curve).

As discussed above, in other embodiments a roller track 5650 may be included in the walking apparatus 5815 and positioned between the roller assembly 5830 and the support foot 5840. For ease of understanding in FIG. 34 (and FIGS. 35A-35D below) this other embodiment can be easily visualized by replacing the references to support foot for element 5840 with references to a roller track. Hence, this embodiment would simply use element 5840 as the roller track and an additional element in a support foot under the roller track as also shown in the co-pending applications. Here, as discussed above, the roller track may be secured to the elongate ground-engaging foot 5740 (support foot) via a rotational pin (5755), which enables the roller track to be rotationally positioned relative to the foot for steering of the walking machine 5715.

FIGS. 35A, 35B, 35C, and 35D are diagrams illustrating an example operation progression of the walking apparatus shown in FIG. 34.

Figure 35A:
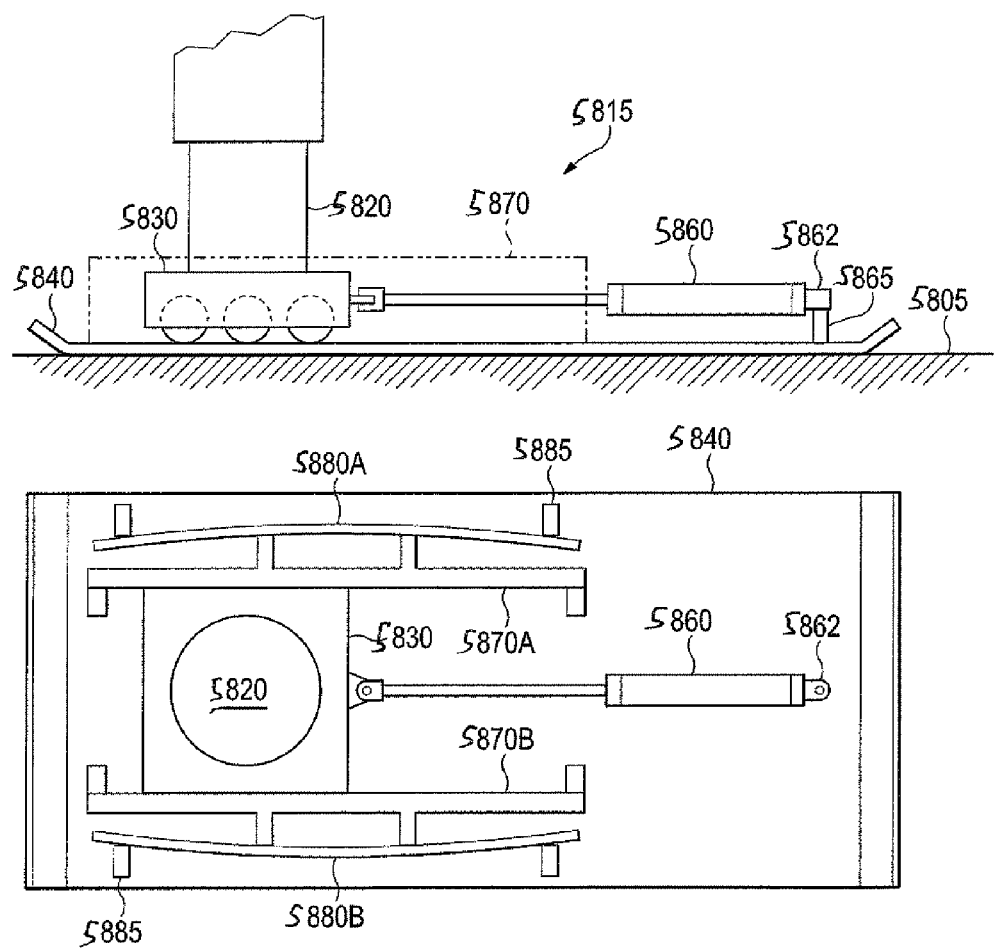
FIGS. 35A, 35B, 35C, and 35D are diagrams illustrating an example operation progression of the walking apparatus shown in FIG. 34.

Referring to FIG. 35A, a walking apparatus 5815 includes a lift cylinder 5820, roller assembly 5830, travel mechanism 5860, and support foot 5840 as described above with reference to FIG. 34. Briefly, the travel mechanism, which is fixed to the support foot 5840 with a pin connection 5862 and pivot rod 5865, is configured to displace the roller assembly 5830 relative to the support foot 5840 during the load-movement phase of a walking cycle when the walking apparatus is engaged with a ground surface 5805 and a load is lifted above the ground surface by the lift mechanism 5820.

As discussed above with respect to FIG. 34, the walking apparatus 5815 also includes guide devices 5870A, 5870B positioned on either side of the roller assembly 5830, and biasing devices 5880A, 5880B, such as leaf springs, engaged with the respective guide devices. The leaf springs 5880A, 5880B are further fixed at end portions to spring stops 5885, which are attached to the support foot 5840. In FIG. 35A, the walking apparatus 5815 is shown at a point in the load-movement phase of a walking cycle prior to movement of the load.

Figure 35B:
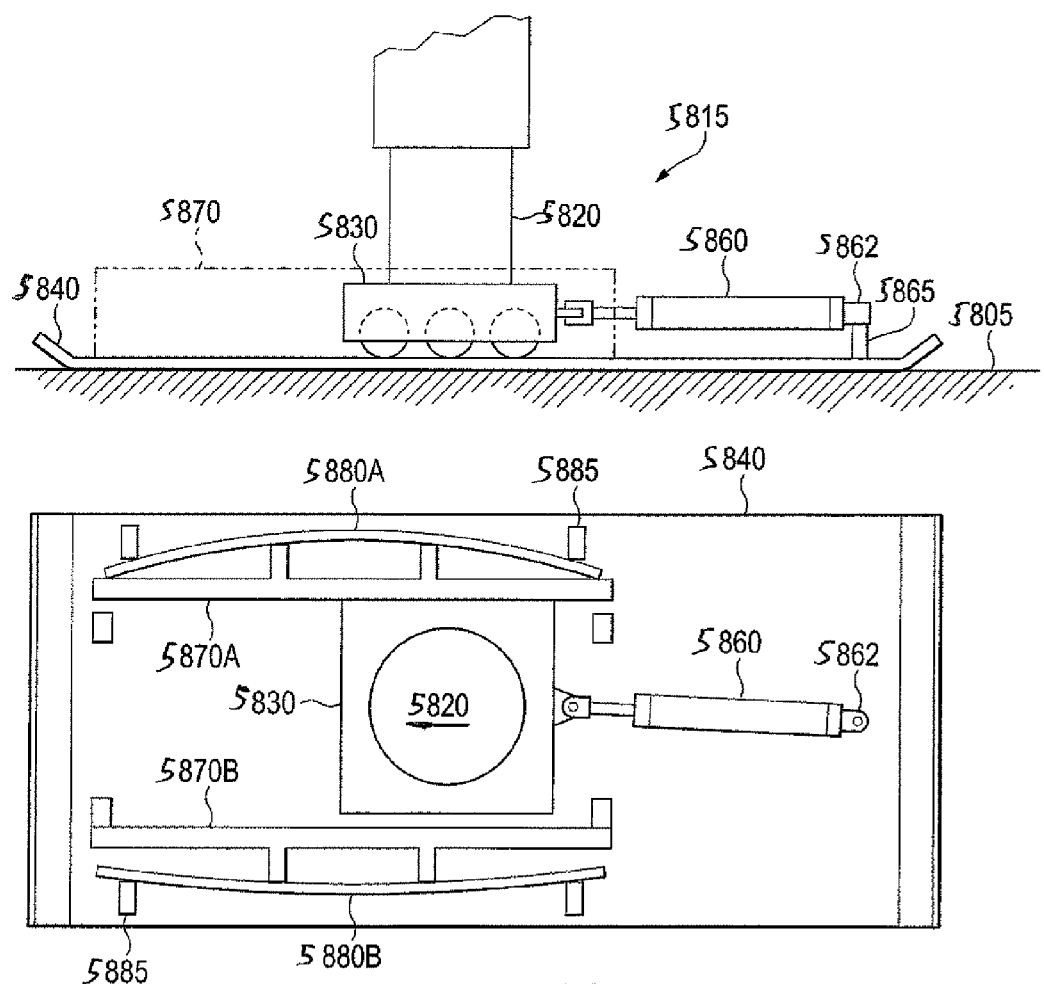

Referring to FIG. 35B, a spin movement or other non-linear movement is made by the walking apparatus 5815 as part of the load-movement phase of a walking cycle. Here, the travel mechanism 5860 is activated to pull the roller assembly 5830 toward the travel mechanism. In this instance, because the movement was non-linear, the roller assembly deviates from a set direction of travel (i.e., the orientation of the lengthwise direction of the support foot 5840) and presses against the upper guide device 5870A. By pressing against the upper guide device 5870A, the roller assembly 5830 shifts the guide device upward into the upper biasing leaf spring 5880A. This upward shift of the guide device 5870A deflects the upper leaf spring 5880A. Note that the roller assembly may become separated from the other guide device 5870B (lower guide device in this example) when shifting one of the guide devices 5870A. Note also, that the non-linear movement of the roller assembly 5830 may not be caused solely based on the pulling force of the travel mechanism 5860, but rather may be due to the movement of multiple walking apparatuses that are oriented in different directions to accomplish a spin movement, or other steering movement, as also shown in the co-pending applications.

Figure 35C:
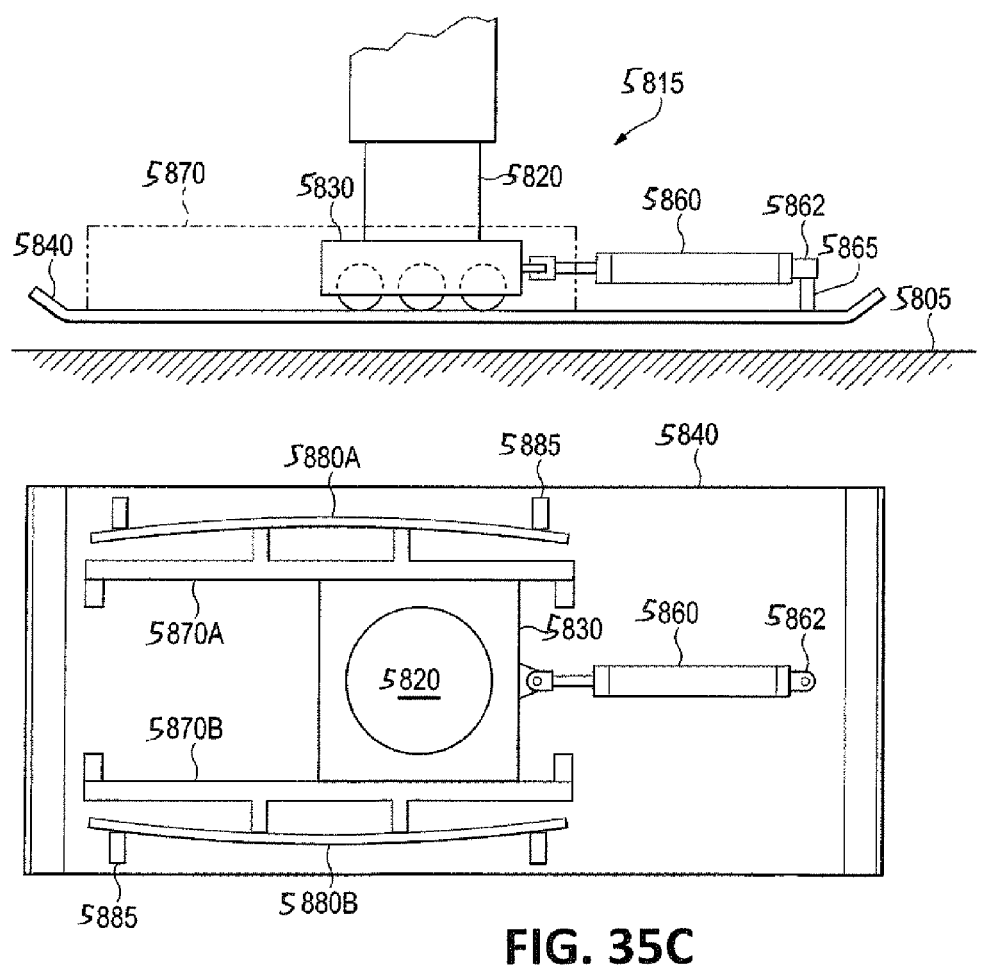

Referring to FIG. 35C, the lift mechanism 5820 is activated to lower the load to the ground surface 5805 and lift the walking apparatus 5815 above the ground surface. As the support foot 5840 loses contact with the ground surface 5805, the upper deflected leaf spring 5880A releases its stored potential energy by shifting the upper guide device 5870A back down toward the roller assembly 5830. The shifting upper guide device 5870A in turn pushes the roller assembly back to a centered position along a set direction of travel or longitudinal centerline of the support foot as shown in FIG. 35C. If this returning centering force from the deflected leaf spring 5880A is more than needed to return the roller assembly 5830 to a centered position, the lower guide device 5870B and lower biasing device 5880B help prevent the roller assembly 5830 from being pushed back past the centered position. This process shown in FIG. 35C may be part of the recovery phase of a walking cycle.

Figure 35D:
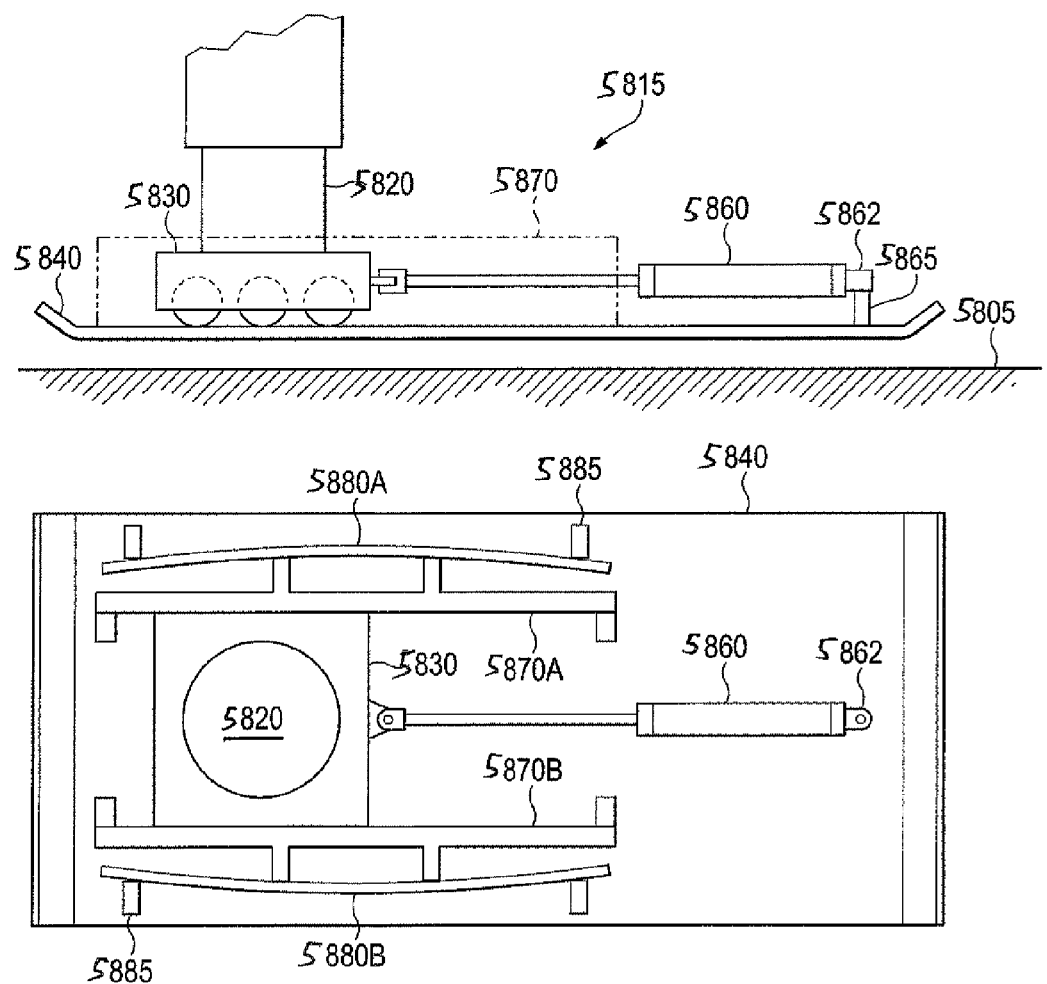

Referring to FIG. 35D, the travel cylinder 5860 is activated again to move the support foot 5840 forward in the direction of travel (here to the right). This movement repositions the support foot in anticipation of another walking cycle. From here, the lift mechanism would be activated to lower the support foot 5840 to the ground surface 5805 and raise the load, as shown in FIG. 35A.

FIG. 36 is a perspective view of another example walking apparatus. The embodiment of FIG. 36 is similar to the embodiment shown in FIG. 34 above except that instead of using a leaf spring 5780 as a biasing device, the embodiment in FIG. 36 uses individual coil springs 5980.

Referring to FIG. 36, a load transporting or walking apparatus 5915 includes a lift mechanism 5920, a roller assembly 5930, and a support foot 5940. The lift mechanism 5920 may include a hydraulic jack suspended from a horizontal beam of the load-bearing frame 310 (FIGS. 3A and 3B).

The lift mechanism 5920 may include a lift cylinder 5920 that is connected to a load-bearing frame 5910, and a cylinder rod 5922 coupled to the roller assembly 5930. Here, the cylinder rod 5922 may be structured to allow the roller assembly 5930 to rotate about a substantially vertical axis in the center of the cylinder rod. That is, the roller assembly 5930 may be free to rotate around the cylinder rod 5922. The connection between the roller assembly 5930 and the cylinder rod may be a bearing or one of a number of different connection variations. In one embodiment, the cylinder rod 5922 may include a groove (not shown) around side edges of a lower portion of the cylinder rod, where the groove corresponds to a retainer cuff (not shown) of the roller assembly 5930. In this example the retainer cuff is rotatable around the groove, but may easily be assembled or disassembled during installation, break-down, or transportation of the walking apparatus 5915.

Although the embodiment shown in FIG. 36 shows the lift cylinder 5921 connected to the load-bearing frame 310 (FIGS. 3A and 3B) and the cylinder rod 5922 connected to the roller apparatus 5930, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 5915 may also include a travel mechanism 5960 that is connected to the support foot 5940 and coupled to the roller assembly 5930 such that when the travel mechanism is activated, the roller assembly moves relative to the support foot. In some embodiments, the travel mechanism 5960 is attached to the support foot with a pin connection 5962 and pivot rod 5965 to allow the travel mechanism 5960 to rotate relative to the support foot. The travel mechanism 5960 may also be coupled to the roller assembly 5930 with a pin connection to allow the roller assembly to pivot relative to the travel mechanism.

Although the travel mechanism 5960 is shown as a single cylinder in FIG. 36, the travel mechanism may include two or more travel cylinders in other embodiments. In other embodiments, the travel mechanism 5960 may include different movement structures, such as pulleys, levers, winches, tracks, etc.

In the embodiments shown in FIG. 36, the roller assembly 5930 may include a plurality of rollers or roller chain that rotate as well as roll on the roller track 5950. That is, in some embodiments, the roller assembly 5930 may include a WBOT series roller assembly from Hilman Rollers. Due to the configuration of the roller chain of the roller assembly 5930 and the tolerance between the roller assembly and the support foot 5940 of the walking machine 5915, the rollers of the roller chain will typically be engaged with the support foot 5940 during operation and use of the walking machine.

The roller assembly 5930 may be secured to the lower end of the lift mechanism 5920, with the roller assembly being captured within a U-shaped track created in part by the guide devices 5970. The roller assembly 5930 may be configured to roll along the bottom inside surface of the support foot 5940 as well as along the underside of two upper flanges (not shown for clarity purposes) that hold the roller assembly and support foot 5940 when the walking apparatus 5915 is raised above the ground surface 5905 by the lift mechanism 5920 during the recovery phase of a walking cycle. As will be understood from the more detailed discussion below, the travel mechanism 5960 permits for the translation of the support foot 5940 relative to the lift mechanism 5920 and vice versa.

As shown in FIG. 36, guide devices 5970 are positioned on either side of the roller apparatus and extend along a travel path of the roller assembly in a direction substantially parallel to the direction of travel. The guide devices 5970 may include stops on either end to help restrict the movement of the roller assembly 5930. In this illustrated embodiment, the biasing devices 5980 are coil springs that are attached to spring stops 5985. These coil springs 5980 may be positioned near end portions of the guide devices 5970 to provide stable deflection during the shifting of the guide devices. The spring stops 985 are further fixed to the support foot 5940 to provide fixed points of reference for the coil springs 5980. In operation, which is discussed in additional detail below with reference to FIGS. 37A-37D, the coil springs 5980 are deflected by compressing toward the spring stops 5985 when the roller assembly 5930 pushes against and shifts the guide devices 5970. The coil springs 5980 may include steel, plastic, or any other type of material that can act as spring device.

FIGS. 37A, 37B, 37C, and 37D are diagrams illustrating an example operation progression of the walking apparatus shown in FIG. 36.

Figure 37A:
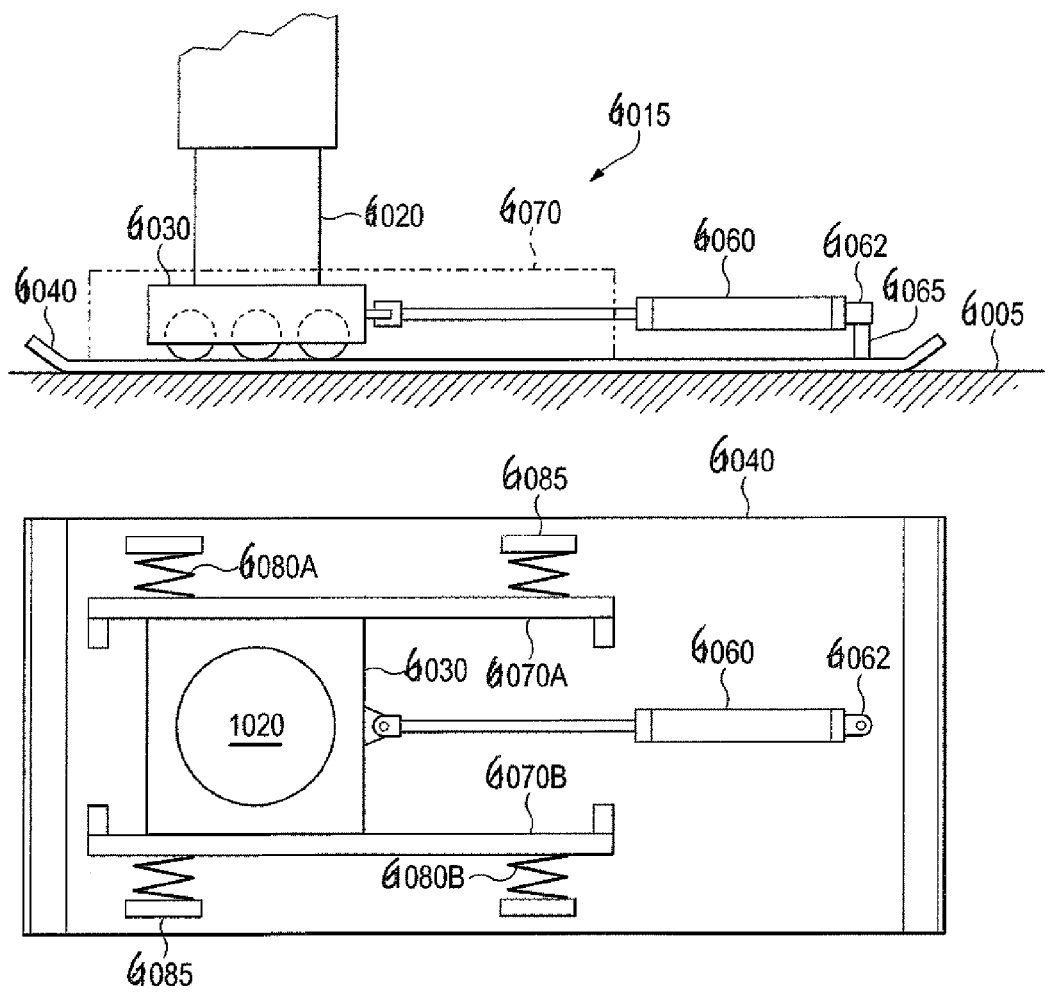
FIGS. 37A, 37B, 37C, and 37D are diagrams illustrating an example operation progression of the walking apparatus shown in FIG. 36.

Referring to FIG. 37A, a walking apparatus 6015 includes a lift cylinder 6020, roller assembly 6030, travel mechanism 6060, and support foot 6040 as described above with reference to FIG. 36. Briefly, the travel mechanism, which is fixed to the support foot 6040 with a pin connection 6062 and pivot rod 6065, is configured to displace the roller assembly 6030 relative to the support foot 6040 during the load-movement phase of a walking cycle when the walking apparatus is engaged with a ground surface 6005 and a load is lifted above the ground surface by the lift mechanism 6020.

As discussed above with respect to FIG. 36, the walking apparatus 6015 also includes guide devices 6070A, 6070B positioned on either side of the roller assembly 6030, and biasing devices 6080A, 6080B, such as coil springs, engaged with the respective guide devices. The coil springs 6080A, 6080B are further fixed to spring stops 6085, which are attached to the support foot 6040. In FIG. 37A, the walking apparatus 6015 is shown at a point in the load-movement phase of a walking cycle prior to movement of the load.

Figure 37B:
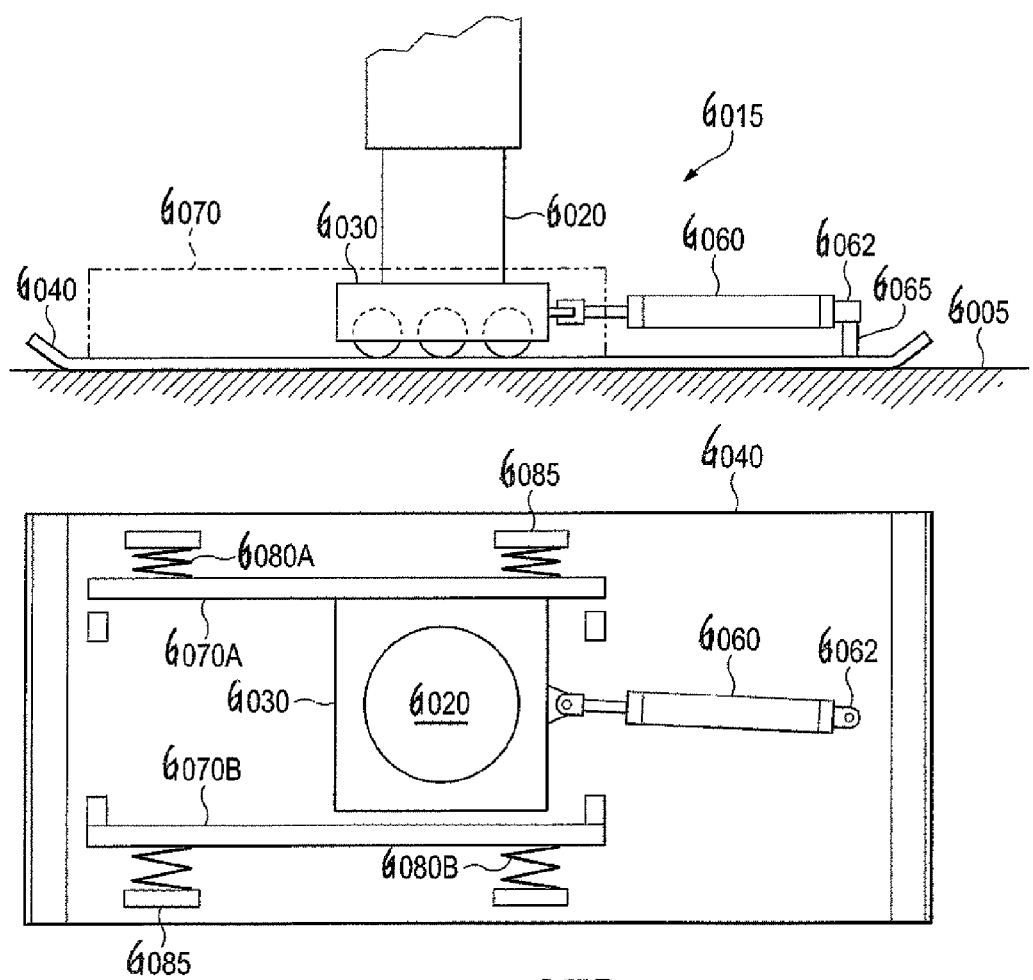

Referring to FIG. 37B, a spin movement or other non-linear movement is made by the walking apparatus 6015 as part of the load-movement phase of a walking cycle. Here, the travel mechanism 6060 is activated to pull the roller assembly 6030 toward the travel mechanism. In this instance, because the movement was non-linear, the roller assembly deviates from a set direction of travel (i.e., the orientation of the lengthwise direction of the support foot 6040) and presses against the upper guide device 6070A. By pressing against the upper guide device 6070A, the roller assembly 6030 shifts the guide device upward into the upper biasing coil springs 6080A. This upward shift of the guide device 6070A compresses the upper coil springs 6080A. Note that the roller assembly 6030 may become separated from the other guide device 6070B (lower guide device in this example) when shifting one of the guide devices 6070A. Note also, that the non-linear movement of the roller assembly 6030 may not be caused solely based on the pulling force of the travel mechanism 6060, but rather may be due to the movement of multiple walking apparatuses 6015 that are oriented in different directions to accomplish a spin movement, or other steering movement, as also shown in the co-pending applications.

Figure 37C:
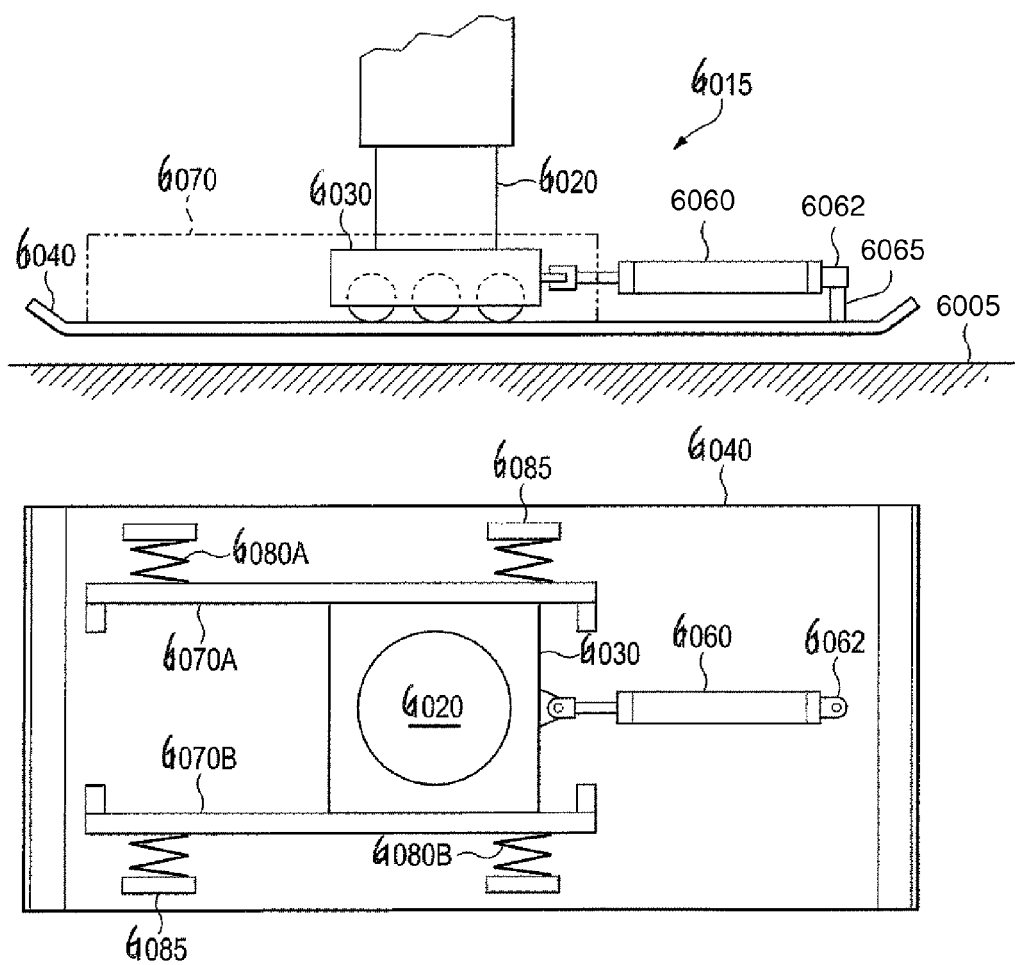

Referring to FIG. 37C, the lift mechanism 6020 is activated to lower the load to the ground surface 6005 and lift the walking apparatus 6015 above the ground surface. As the support foot 6040 loses contact with the ground surface 6005, the upper deflected coil springs 6080A release their stored potential energy by shifting the upper guide device 6070A back down toward the roller assembly 6030. The shifting upper guide device 6070A in turn pushes the roller assembly back to a centered position along a set direction of travel or longitudinal centerline of the support foot as shown in FIG. 37C. If this returning centering force from the deflected coil springs 6080A is more than needed to return the roller assembly 6030 to a centered position, the lower guide device 6070B and lower biasing device 6080B help prevent the roller assembly 6030 from being pushed back past the centered position.

Figure 37D:
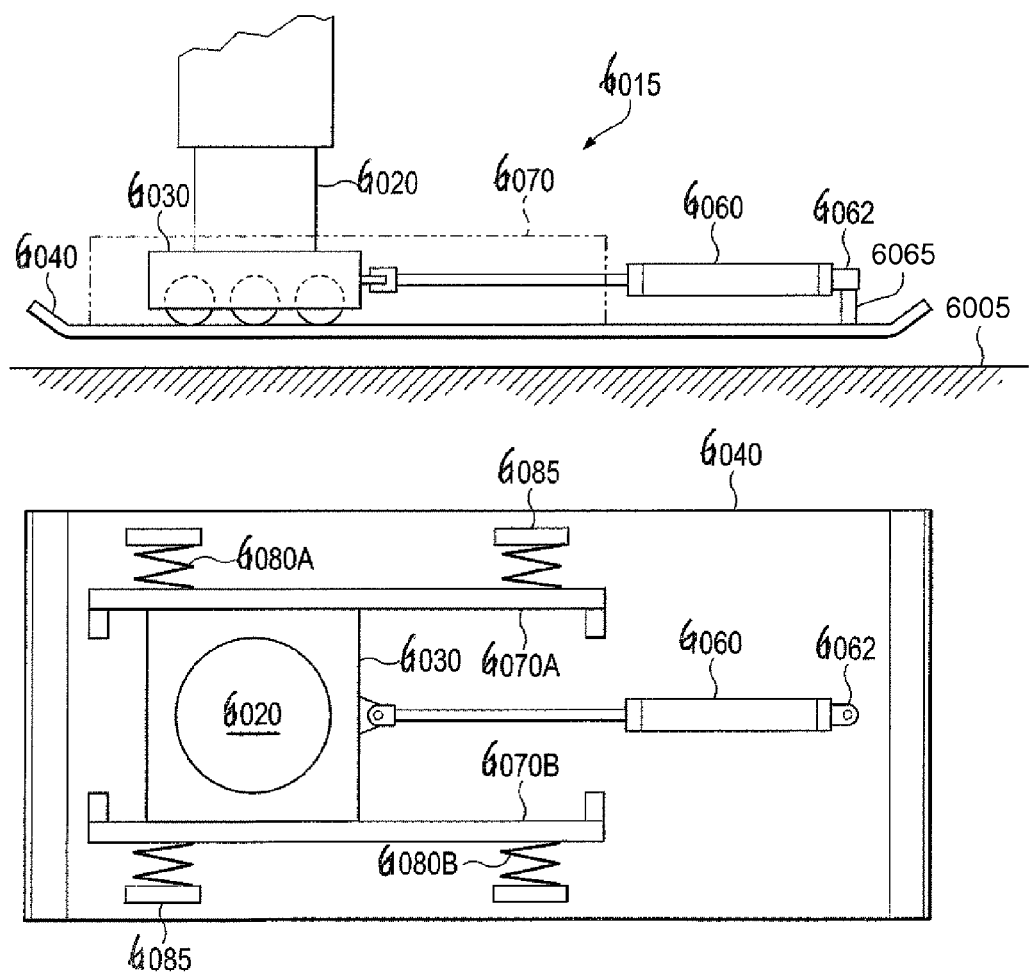

Referring to FIG. 37D, the travel cylinder 6060 is activated again to move the support foot 6040 forward in the direction of travel (here to the right). This movement repositions the support foot in anticipation of another walking cycle. From here, the lift mechanism would be activated to lower the support foot 6040 to the ground surface 6005 and raise the load, as shown in FIG. 37A.

Figure 38A:
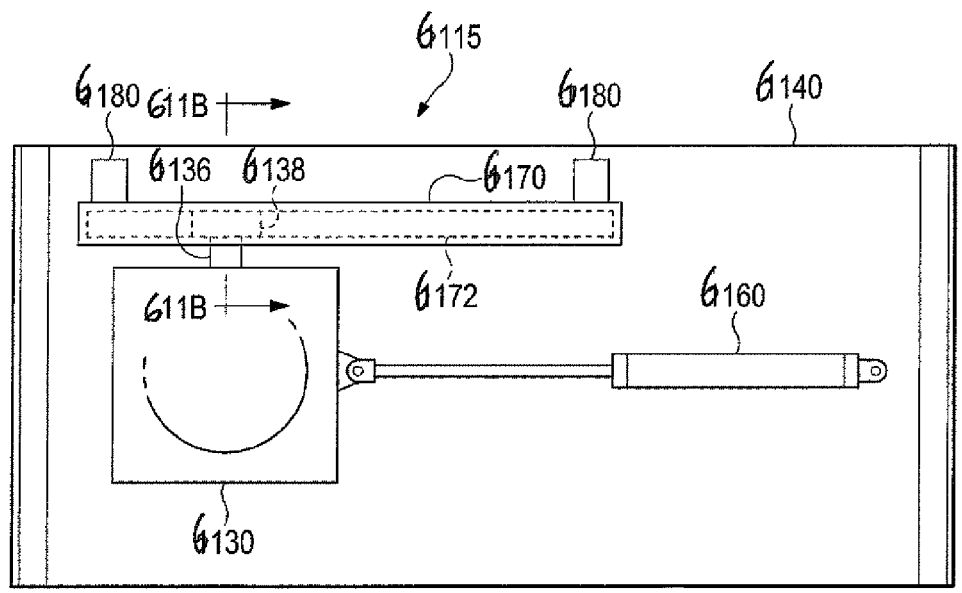
FIG. 38A is a top view of another example walking apparatus.
Figure 38B:
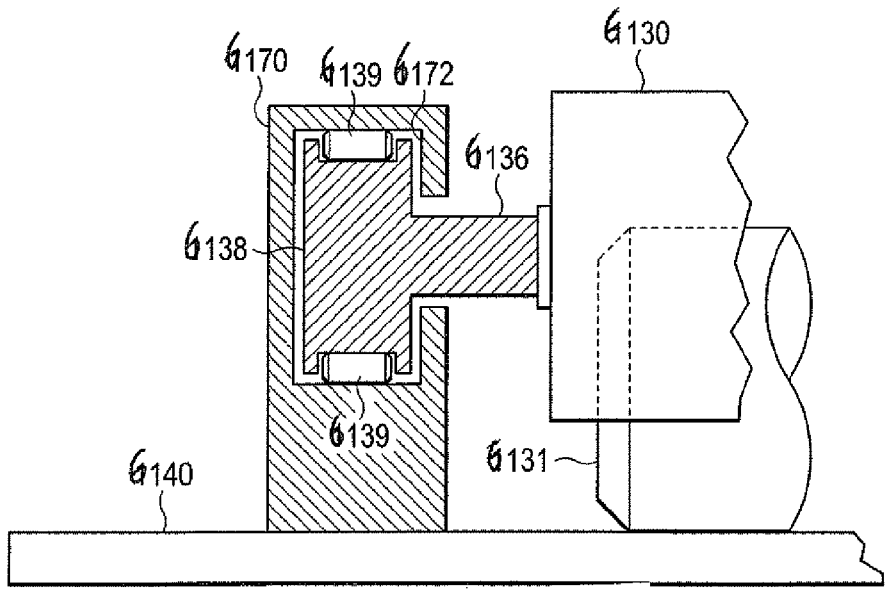
FIG. 38B is a cross-sectional detail diagram taken along line 611B of the walking apparatus shown in FIG. 38A.

FIG. 38A is a top view of another example walking apparatus. FIG. 38B is a cross-sectional detail diagram taken along line 611B of the walking apparatus shown in FIG. 38A. Referring to FIGS. 38A and 38B, a walking apparatus 6115 includes a roller assembly 6130 positioned on a support foot 6140. The roller assembly 6130 may include one or more rollers 6131 that allow the roller assembly to be moved by a travel mechanism 6160 connected to the roller assembly. The travel mechanism 6160 can be activated to move the roller assembly 6130 in a desired direction of travel relative to the support foot 6140 as described above. The walking apparatus 6115 also includes a guide device 6170 and one or more biasing devices 6180. The biasing devices 6180 may be fixed to the support foot 6140 (or roller track, as described above) and coupled to the guide device 6170. This configuration allows the guide device 6170 to be shifted relative to the support foot 6140 during non-linear movements, such as spin movements of the walking apparatus 6115.

Unlike some of the embodiments discussed above, the embodiment of the walking apparatus 6115 shown in FIGS. 38A and 38B include only a single guide bar 6170 positioned on one side of the roller assembly. To center the support foot 6140 during a recovery phase of a walking cycle when the roller assembly 6130 is displaced on either side of a longitudinal centerline of the support foot 6140 (i.e., deviates from a set direction of travel), the guide bar 6170 includes a slot 6172 that partially encloses a retaining portion 6138 of a guide spacer 6136. The guide spacer 6136 may be fixed to the roller assembly 6130 and move within the slot 6172 of the guide bar 6170 via guide rollers 6139. By partially enclosing the retaining portion 6138 of the guide spacer 6136, the guide device 6170 will compress the biasing devices 6180 if the roller assembly deviates from the direction of travel toward the guide device, and the guide device will expand the biasing devices if the roller assembly deviates from the direction of travel away from the guide device. Hence, this embodiment requires only a single guide bar 6170 rather than multiple guide bars around the roller assembly.

Figure 39A:
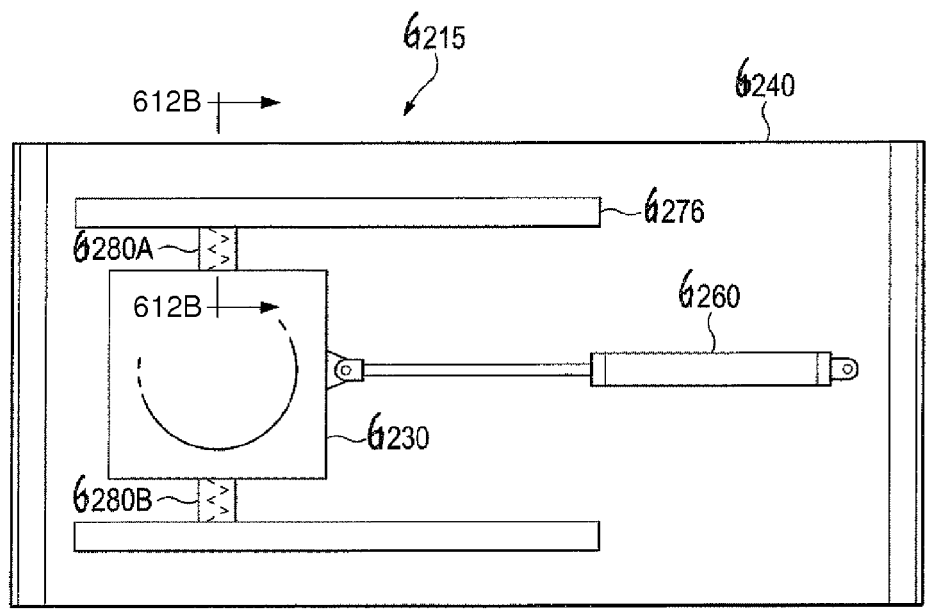
FIG. 39A is a top view of another example walking apparatus.
Figure 39B:
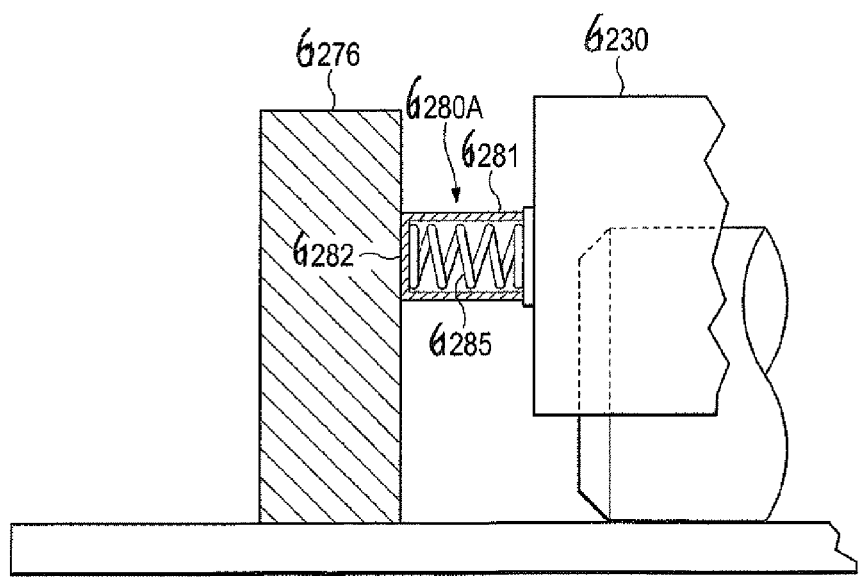
FIG. 39B is a cross-sectional detail diagram taken along line 612B of the walking apparatus shown in FIG. 39A.

FIG. 39A is a top view of another example walking apparatus. FIG. 39B is a cross-sectional detail diagram taken along line 612B of the walking apparatus shown in FIG. 39A. Referring to FIGS. 39A and 39B, a walking apparatus 6215 includes a roller assembly 6230 positioned on a support foot 6240. The roller assembly 6230 may include one or more rollers that allow the roller assembly to be moved by a travel mechanism 6260 connected to the roller assembly. The travel mechanism 6260 can be activated to move the roller assembly 6230 in a desired direction of travel relative to the support foot 6240 as described above. The walking apparatus 6215 also includes a guide device 6276 and one or more biasing devices 6280A, 6280B. In this embodiment, the guide bars 6276 of the guide device are fixed to the support foot 6240 and do not substantially move when the roller assembly is moved in a linear or non-linear manner relative to the set direction of travel. Rather, the biasing devices 6280A, 6280B are positioned between the fixed guide bars 6276 and the roller assembly 6230. This configuration allows the biasing devices 6280A, 6280B to be directly deflected by the movement of the roller assembly. Here, a first biasing device 6280A may be positioned and fixed on one side of the roller assembly 6230, and a second biasing device 6280B may be positioned and fixed on an opposite side of the roller assembly 6230.

In some embodiments, the biasing devices may each include a housing 6281, a pre-compressed spring 6285, and a rub surface 6282. The pre-compressed spring 6285 may be compressed a desired amount in the housing 6281. This pre-compression allows the biasing devices 6280A, 6280B to be deflected or compressed further when a deviation of travel from the roller assembly 6230 is directed toward the biasing device, while allowing the other biasing device on the other side of the roller assembly to disengage from the guide bar 6276. This allows a faster and easier return to a centered position because the biasing devices are not acting against each other. The housing 6281 may be structured to be flexible to allow further compression of the spring 6285, but have a maximum fixed extendable length to prevent the spring from extending beyond a desired pre-compressed state. The rub surface 6282 may be structured to move along the fixed guide bars 6276 without excessive friction. Hence, the rub surface may include a material with a relatively low coefficient of friction. Additionally, the rub surface may be replaceable in case it is excessively worn or otherwise damaged.

Figure 40:
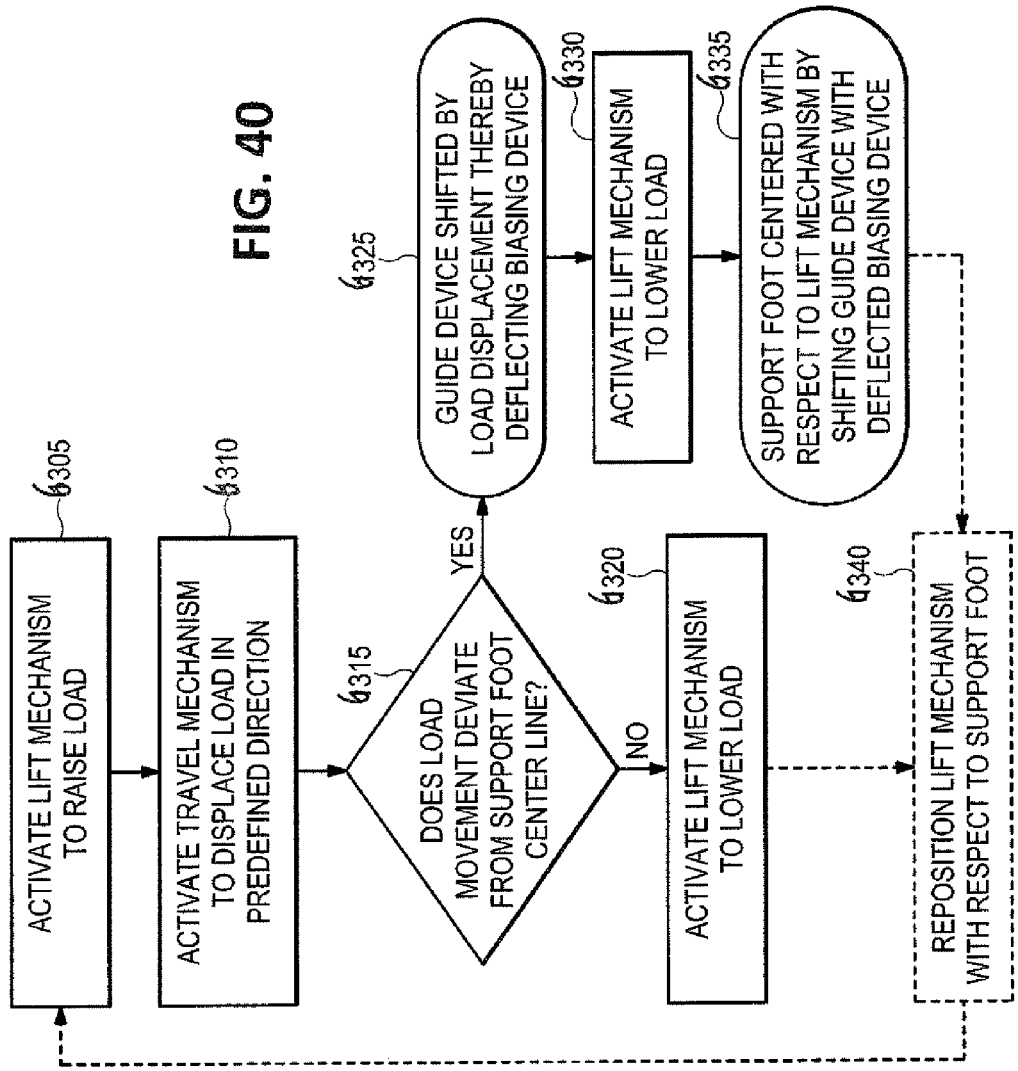
FIG. 40 is a flow diagram illustrating method of operating a load transporting apparatus.

FIG. 40 is a flow diagram illustrating method of operating a load transporting apparatus. In particular, the flow diagram of FIG. 40 illustrates a method of centering a lift mechanism of a load transporting device relative to a support foot during a load-transporting movement. The load transporting device includes a roller assembly coupled to the lift mechanism, a travel mechanism structured to displace the roller assembly relative to the support foot, and one or more guide devices coupled to the support foot by a biasing device and positioned adjacent to the roller assembly.

Referring to FIG. 40, a flow begins at process 6305 where the lift mechanism is activated to lower the support foot to a ground surface and raising a load supported by the load-bearing frame. In process 6310, the travel mechanism is activated to displace the roller assembly connected to the lift mechanism relative to the support foot and ground surface, thereby moving a position of the load in a predefined direction of travel. Depending on the movement of the travel mechanism relative to the centerline of the support foot (or in embodiments with a roller track, relative to the centerline of the roller track, or set direction of travel), the position of the lift cylinder may deviate from the longitudinal centerline of the support foot or roller track (i.e., deviate from a set direction of travel). As discussed above, when the roller assembly and load are moved off of a set direction of travel, the guide devices are shifted by the load displacement thereby deflecting the biasing devices. On the other hand, if the roller assembly moves along the set direction of travel (i.e., stays centered on a longitudinal centerline of the support foot or roller track), the guide devices are not shifted and the biasing devices are not further activated. In process 6315, it is observed whether the resulting position of the roller assembly has deviated from a set direction of travel or centerline of the support foot or roller track.

When the roller assembly has followed the set direction of travel, the flow proceeds to process 6320 where the lift mechanism is activated to lower the load and raise the support foot. However, when the roller assembly has deviated from a set direction of travel, the guide device is shifted by the movement of the roller assembly and load thereby deflecting the biasing device as shown in step 6325. That is, the biasing devices are deflected when movement of the roller assembly results in deviation from a set direction of travel. In process 6330, the lift mechanism is activated to lower the load and raise the support foot from the ground surface. As the support foot loses contact with the ground surface, the deflected biasing device acts on the support foot or roller track to center the support foot relative to the roller assembly, as shown in step 6335. That is, support foot and roller track, if present, are automatically centered with respect to the lift mechanism or lift cylinder. After step 6335 or process 6320, the flow may include optional process 6340 where the lift mechanism is repositioned with respect to the support foot. If further walking steps are needed to move the load to a final position, the flow may return to process 6305 to initiate another walking cycle.

As described above, some examples are directed to a load transporting apparatus configured to move a load over a ground surface in one or more incremental steps each including a load-movement phase and a recovery phase. The load transporting apparatus may include a load bearing frame attached to the load, and a lift mechanism having a lift cylinder connected to the load bearing frame and a cylinder rod. The lift mechanism may be structured, for example, to lift the load-bearing frame at the start of the load-movement phase. A roller assembly may be coupled to the cylinder rod of the lift mechanism, where the roller assembly includes a roller frame and one or more rollers set in the roller frame. The load transporting apparatus also includes a support foot coupled to the roller frame of the roller assembly and structured to interface with the ground surface. The support foot has a length, width, and longitudinal centerline bisecting the width of the support foot. A travel mechanism may be coupled to the roller assembly, where the travel mechanism is structured to move the roller assembly relative to the support foot during, for example, the load-movement phase of a walking cycle. Guide bars positioned on opposite sides of the roller frame are displaced adjacent to the roller frame. The guide bars may be positioned substantially parallel with the length of the support foot. Additionally, one or more biasing devices may be coupled between the guide bars and the support foot. The biasing devices may be structured to become deflected during a load-movement phase where the roller assembly is non-linearly displaced by the travel mechanism relative to the longitudinal center line of the support foot, and structured to return the support foot to a centered position relative to the roller assembly about the longitudinal center line of the support foot during a recovery phase.

Figure 41:
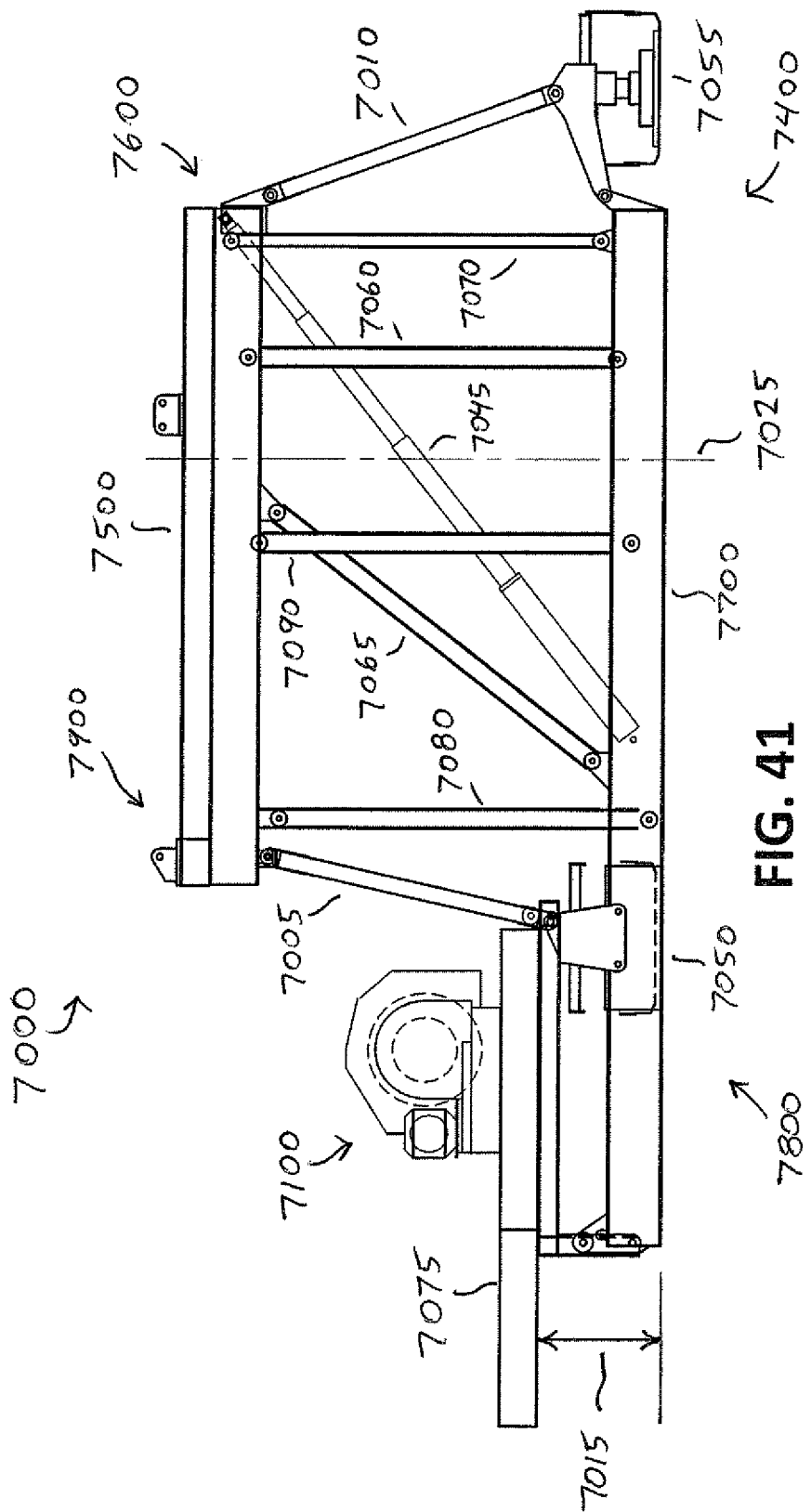
FIG. 41 illustrates an example lifting system for a rig with a hoisting device mounted in an elevated position.

FIG. 41 illustrates an example lifting system 7000 for a rig with a drawworks 7100 mounted in an elevated position 7015. The rig may comprise a drill floor 7500 connected to a base 7700 by one or more front legs 7060, 7070 and one or more rear legs 7080, 7090. In some examples, the rig may be placed over a well head such that a well head centerline 7025 is located between the one or more front legs 7070 and the one or more rear legs 7080. Additionally, the drill floor 7500 may be connected to the base 7700 by one or more diagonal braces, such as diagonal brace 7065, and one or more hydraulic cylinders, such as hydraulic cylinder 7045. Hydraulic cylinder 7045 may comprise a telescoping hydraulic cylinder.

The lifting system 7000 may comprise a walking system including number of transportation devices 7050, 7055 configured to position or move the lifting system 7000 over the well head 7030. The transportation devices 7050, 7055 may comprise one or more of the transportation devices and systems as described in the prior FIGS. 1-40, or any combination thereof.

The drawworks 7100 may provide the primary hoisting function of the rig, for example to raise and lower traveling blocks. The drawworks 7100 may comprise a drum, one or more motors or engines, a reduction gear, a brake, an auxiliary brake, other devices, and/or any combination thereof. In some examples, the drawworks 7100 may weigh up to 100, 000 pounds or more.

The drawworks 7100 may be mounted directly to a top surface of the base 7700. The drawworks 7100 may be mounted on a rear platform 7075 or other framework of the base 7700, such that the elevated position 7015 provides a clearance between the drawworks and the ground and/or surface over which the rig is located. In some examples, the rear platform 7075 may provide a clearance of approximately six to eight feet off the ground. As the lifting system 7000 is operated, for example to move the rig from a first well head to a second well head, the elevated position 7015 similarly provides clearance between the drawworks 7100 and the first well head as the relative position of the first well head moves from the well head centerline 7025 to a position located behind the rig. The rear platform 7075 may comprise an assembly of one or more beams, channels, or other supports that are configured to attach the drawworks 7100 the base 7700. In some examples, the rear platform 7075 may comprise a planar platform that attaches to the base 7700.

Oftentimes the well head may comprise casing or valving (such as a completion tree) that extends four feet or more off the ground. Methods of moving a rig which include dragging the drawworks may require maneuvering the drawworks around the well head and/or temporarily detaching the drawworks until the well head has been cleared. Such a method may cause significant delay in positioning the rig and, subsequently, the ability to operate the rig.

The drawworks 7100 may be mounted directly to a top surface of the base 7700. The drawworks 7100 may be mounted on a rear platform 7075 or other framework of the base 7700, such that the elevated position 7015 provides a clearance between the drawworks and the ground and/or surface over which the rig is located. In some examples, the rear platform 7075 may provide a clearance of approximately six to eight feet off the ground. As the lifting system 7000 is operated, for example to move the rig from a first well head to a second well head, the elevated position 7015 similarly provides clearance between the drawworks 7100 and the first well head as the relative position of the first well head moves from the well head centerline 7025 to a position located behind the rig. The rear platform 7075 may comprise an assembly of one or more beams, channels, or other supports that are configured to attach the drawworks 7100 to the base 7700. In some examples, the rear platform 7075 may comprise a planar platform that attaches to the base 7700.

Figure 42:
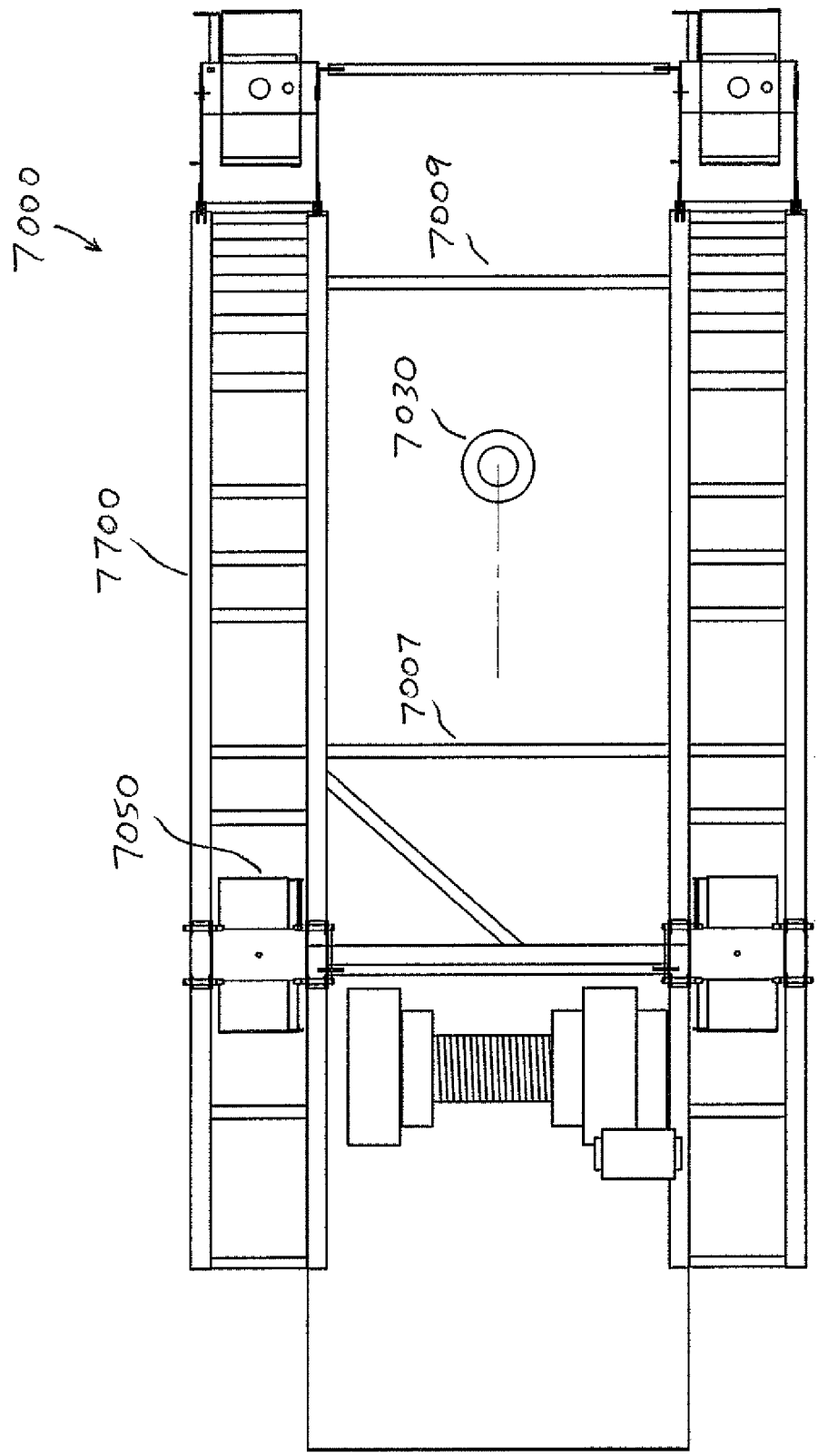
FIG. 42 illustrates a bottom view of the example lifting system of FIG. 41.

FIG. 42 illustrates a bottom view of the example lifting system 7000 of FIG. 41. The bottom view shows that the rig may include horizontal struts 7007, 7009 connecting left and right sides of the base 7700. One of the transportation devices 7050 is illustrated as being located with the base 7700. Locating the transportation device 7050 within the framework of the base 7700 provides lateral clearance when the rig travels over the well head 7030, such that the well head 7030 and associated casing, valving, etc. pass between the left side and the right side of the base. The transportation devices 7050 are configured to lift both the rig and the drawworks 7100 while it is mounted to the platform 7075. Additionally, the transportation device 7050 comprises a footprint that is sufficiently large to distribute the combined weight of the rig and drawworks 7100 according to the type of terrain that the lifting system 7000 is operating on.

While drilling, the front legs 7070 and the rear legs 7080 may be configured to provide the structural load path of the drill. Adding one or more struts, such as front strut 7010 and/or rear strut 7005 would not affect the structural load path through the front and rear legs 7070, 7080. Rather, the struts 7005, 7010 may be configured to primarily provide structural support while the lifting system 7000 is moving the rig and the drawworks 7100. In some examples, the struts 7005, 7010 are oriented at a diagonal angle in order to distribute the load of the rig out to the transportation devices 7050, 7055 of the lifting system 7000 while the rig is being transported.

Figure 43:
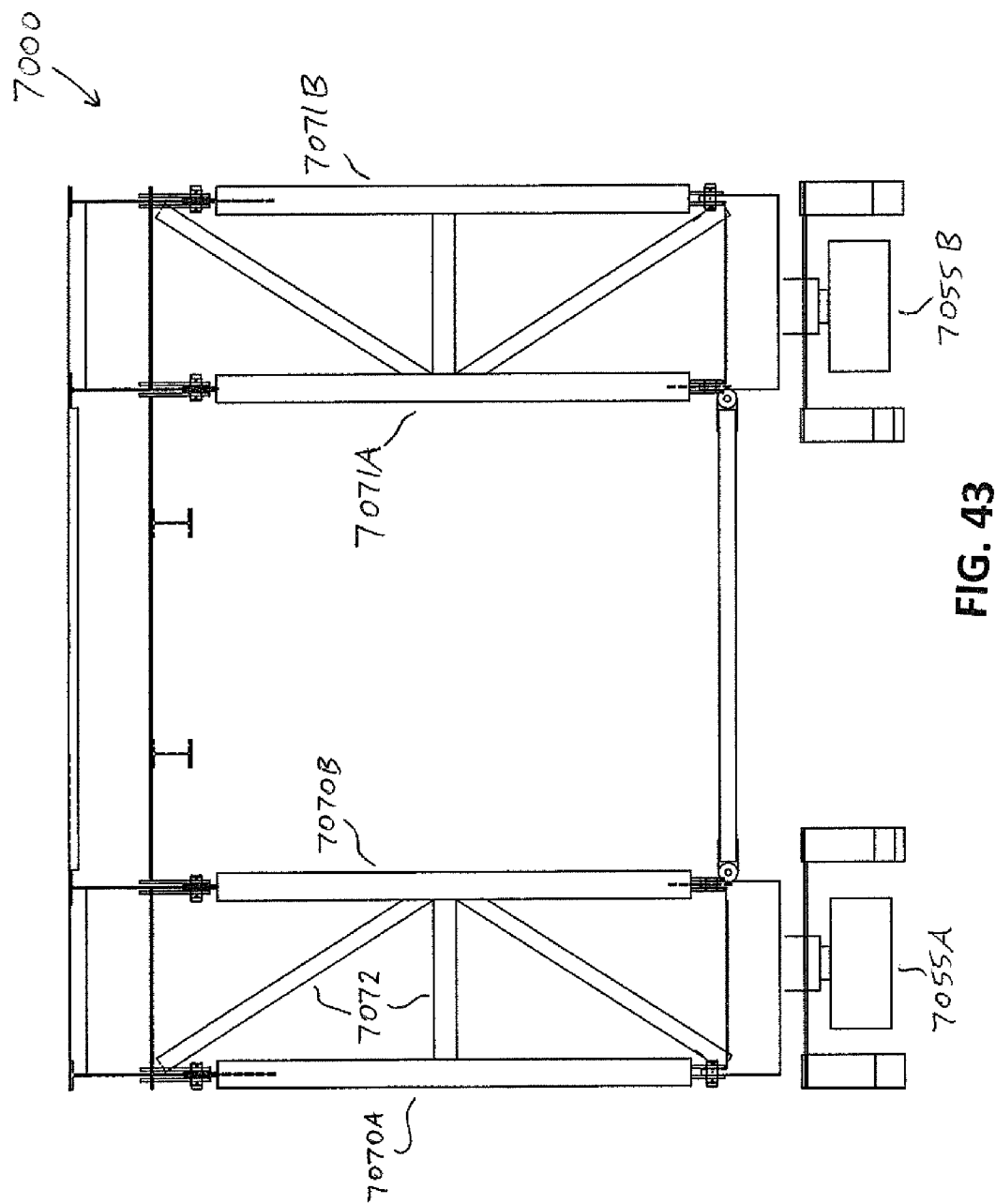
FIG. 43 illustrates a front view of the lifting system of FIG. 41, including front legs.

FIG. 43 illustrates a front view of the lifting system 7000 of FIG. 41. A first side of the rig may comprise two front legs, including first front leg 7070A and second front leg 7070B. A second side of the rig is shown as additionally comprising two front legs, including first front leg 7071A and second front leg 7071B. The front legs may be supported by one or more cross bracing 7072 to provide lateral support of the rig. In some examples, each side of the rig may comprise two struts, such as strut 7010. The corresponding front struts of the first side and the second side of the rig are not shown for purposes of clarity in illustrating the front legs. Additionally, each side of the rig may comprise a transportation device, such as front transportation devices 7055A and 7055B.

Figure 44:
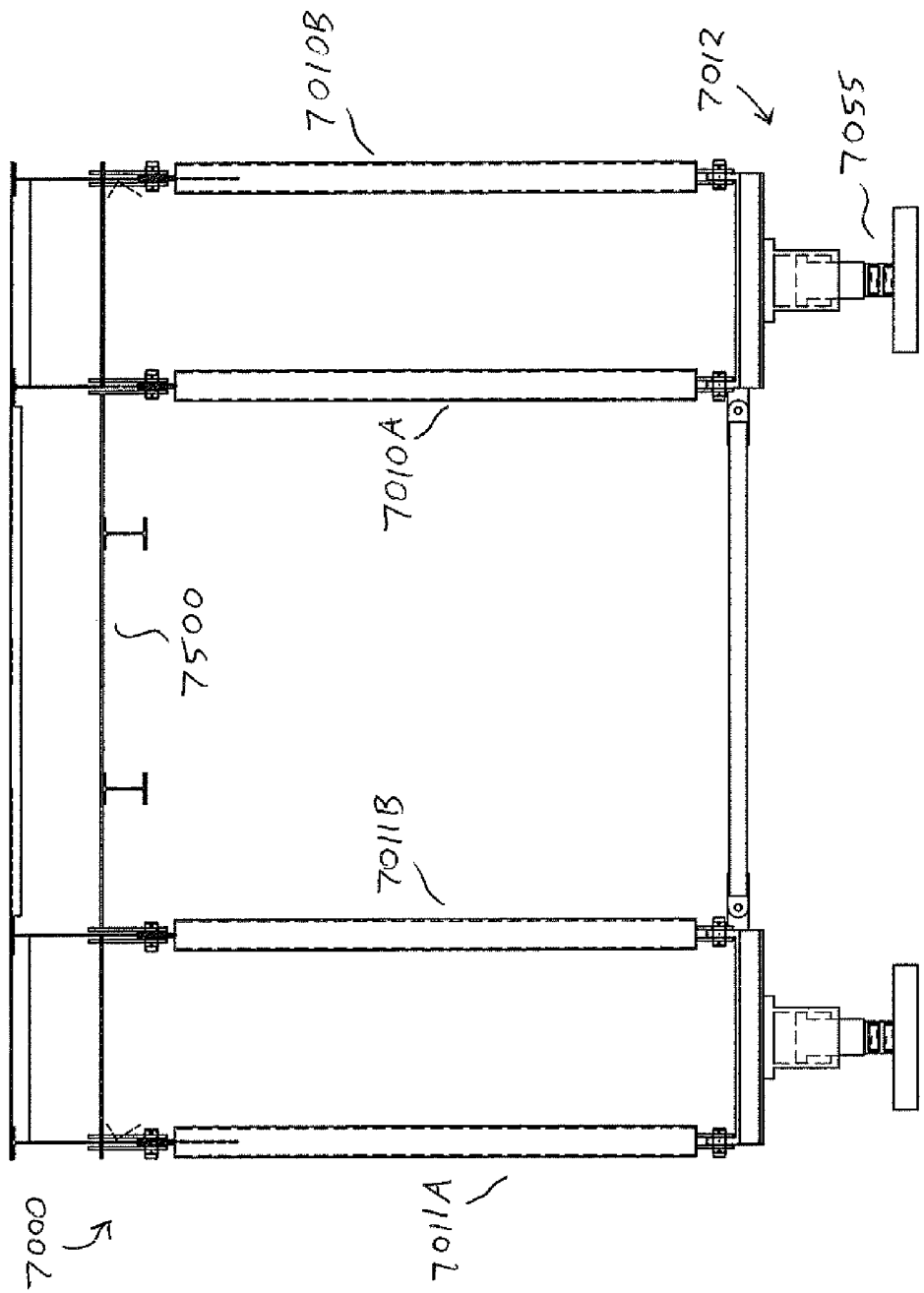
FIG. 44 illustrates a front view of the lifting system of FIG. 41, including front struts.

FIG. 44 illustrates a front view of the lifting system 7000, including a number of struts connected on either side of the rig. For example, a first side of the rig may comprise a first front strut 7010A and a second front strut 7010B, and a second side of the rig may similarly comprise a first front strut 7011A and a second front strut 7011B. One or more of the struts may connect the rig floor 7500 with one or more transportation device housings, such as a transportation device housing 7012.

Figure 45:
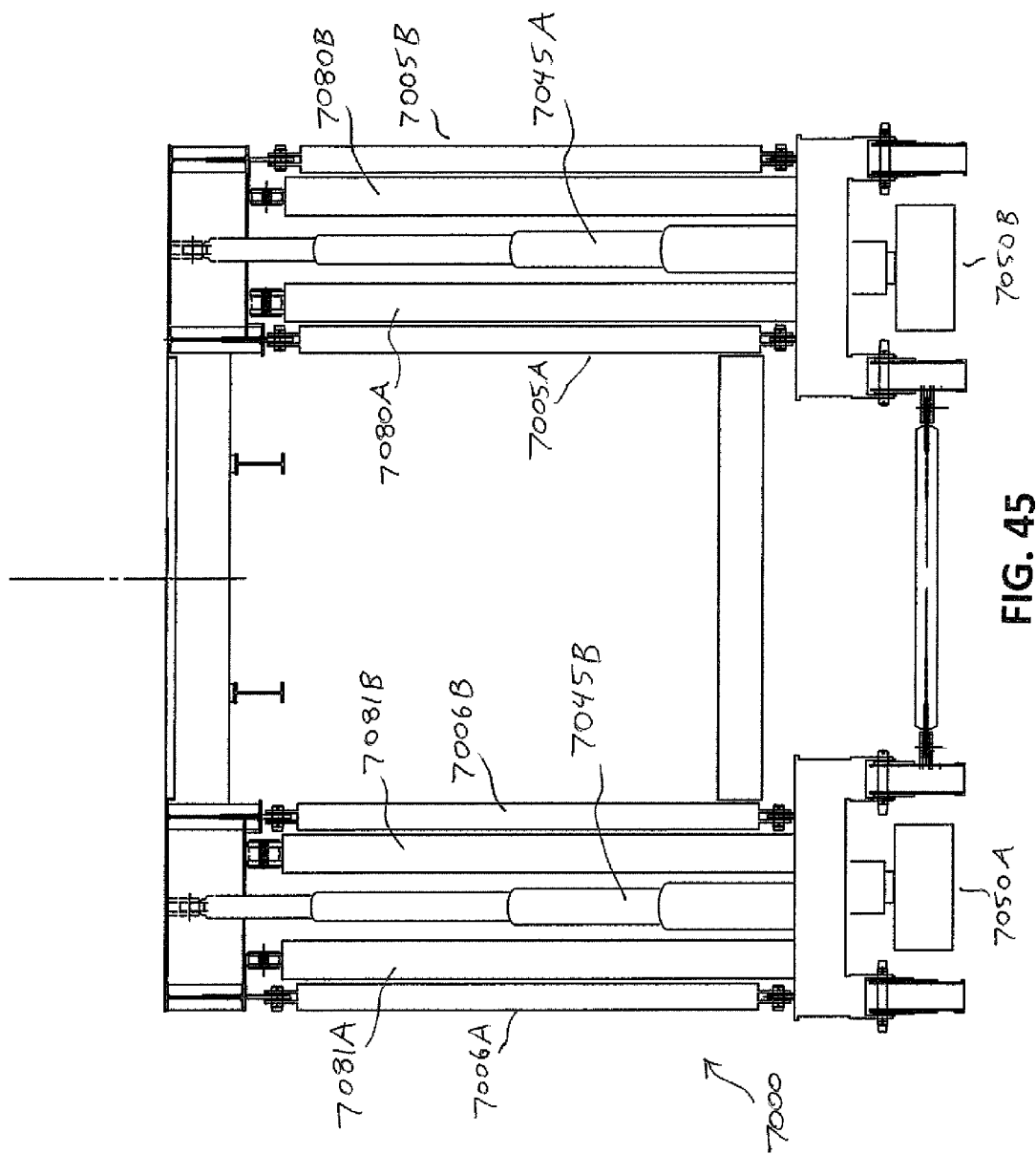
FIG. 45 illustrates a rear view of the lifting system of FIG. 41.

FIG. 45 illustrates a rear view of the lifting system 7000 of FIG. 41. The first side of the rig may comprise two rear struts, including first rear strut 7005A and second rear strut 7005B, two rear legs, including first rear leg 7080A and second rear leg 7080B, and a first hydraulic cylinder 7045A. The second side of the rig is shown as additionally comprising two rear struts, including third rear strut 7006A and fourth rear strut 7006B two rear legs, including first rear leg 7081A and second rear leg 7081B, and a second hydraulic cylinder 7045B. Additionally, each side of the rig may comprise a transportation device, such as rear transportation devices 7050A and 7050B.

Figure 46:
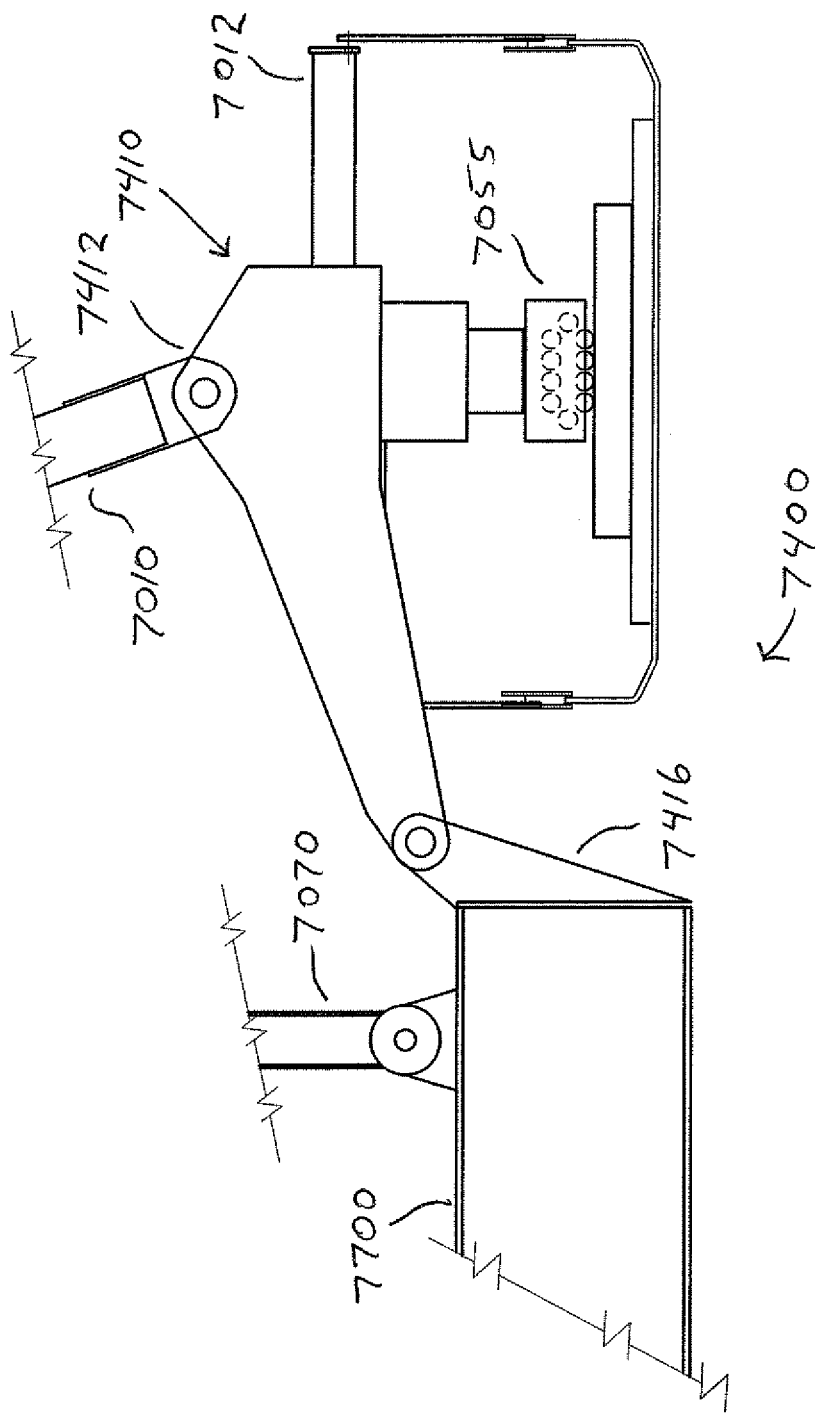
FIG. 46 illustrates a close up view of the lifting system of FIG. 41.

FIG. 46 illustrates a close up view of section 7400 of the lifting system 7000 of FIG. 41. A jack assembly 7410 may comprise a lower front strut connection 7412, a base connection 7416 and/or the transportation device 7055. The lower front strut connection 7412 may be configured to connect the front strut 7010 (FIG. 41) to the jack assembly 7410. The base connection 7416 may be configured to connect the jack assembly 7410 to the base 7700. The front leg 7070 is also shown as being connected to the base 7700. In some examples, the jack assembly 7410 may be configured to connect the front strut 7010 to the base 7700. The front strut 7010 may be connected to the lower front strut connection 7412 at a point above the transportation device 7055 located within transportation device housing 7012. In some examples, the front strut 7010 may be configured to diagonally connect the drill floor 7500 to the transportation device 7055 located in front of the drill floor 7500 and/or in front of the base 7700.

Figure 47:
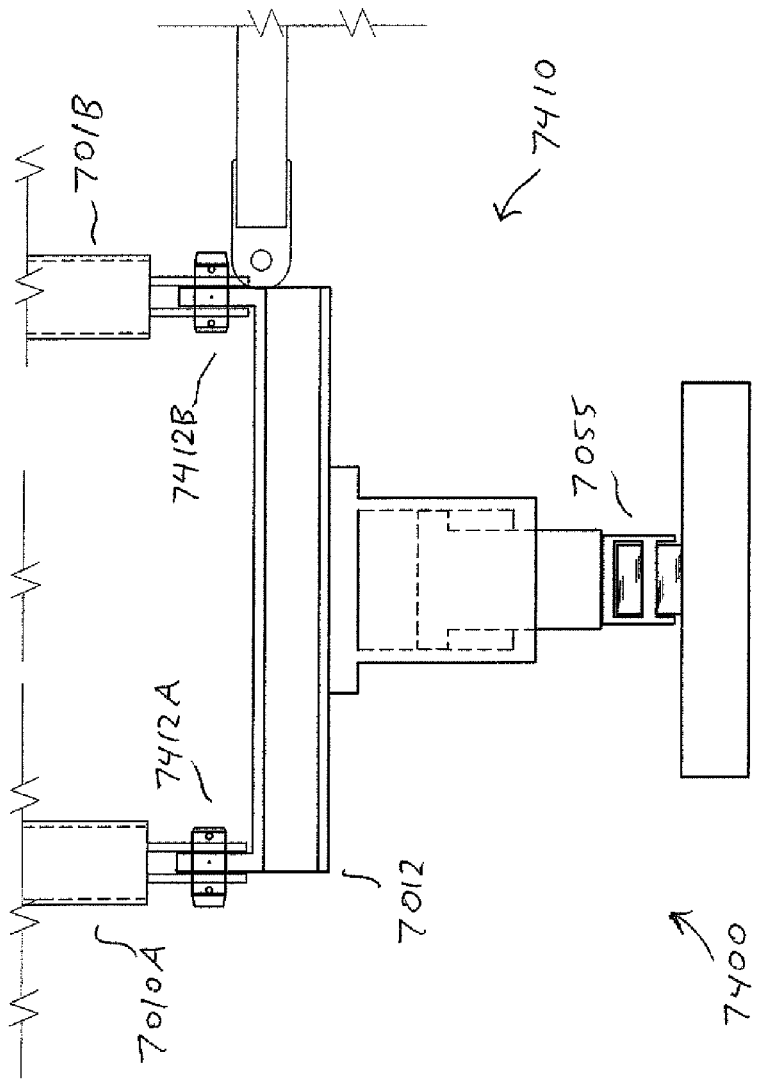
FIG. 47 illustrates a front view of the close up view of FIG. 46.

FIG. 47 illustrates a front view of section 7400. The jack assembly 7410 may comprise a first lower front strut connection 7412A that is configured to connect the first front strut 7010A to the jack assembly 7410 and a second lower front strut connection 7412B that is configured to connect the second front strut 7010B to the jack assembly 7410. One or both of the lower front strut connections 7412A, 7412B may be connected to the transportation device housing 7012 and/or be configured to connect the struts 7010A, 7010B to the transportation device 7055.

Figure 48:
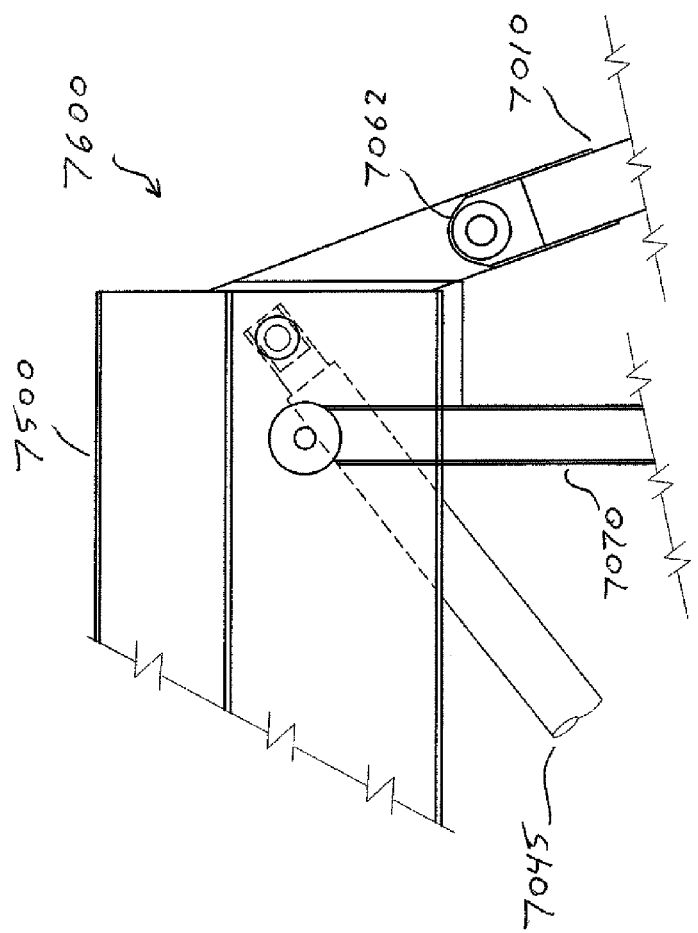
FIG. 48 illustrates another close up view of the lifting system of FIG. 41.

FIG. 48 illustrates a close up view of section 7600 of the lifting system 7000 of FIG. 41. Both the front leg 7070 and the front strut 7010 may be connected to the drill floor 7500. For example, an upper front strut connection 7062 may be configured to connect the front strut 7010 to the drill floor 7500.

Figure 49:
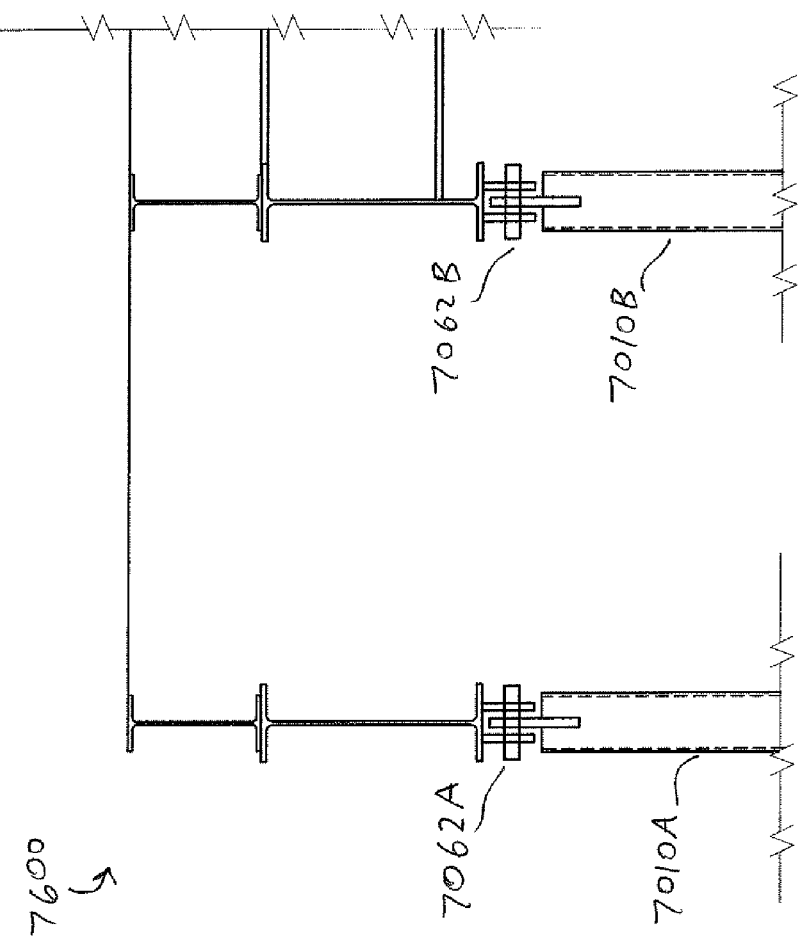
FIG. 49 illustrates a front view of the close up view of FIG. 48.

FIG. 49 illustrates a front view of section 7600 including a close up view of the first front strut 7010A, the second front strut 7010B, a first front leg 7070A, and a second front leg 7070B. The first front strut 7010A may be connected to a first upper front strut connection 7062A. Additionally, the second front strut 7010B may be connected to a second upper front strut connection 7062B.

Figure 50:
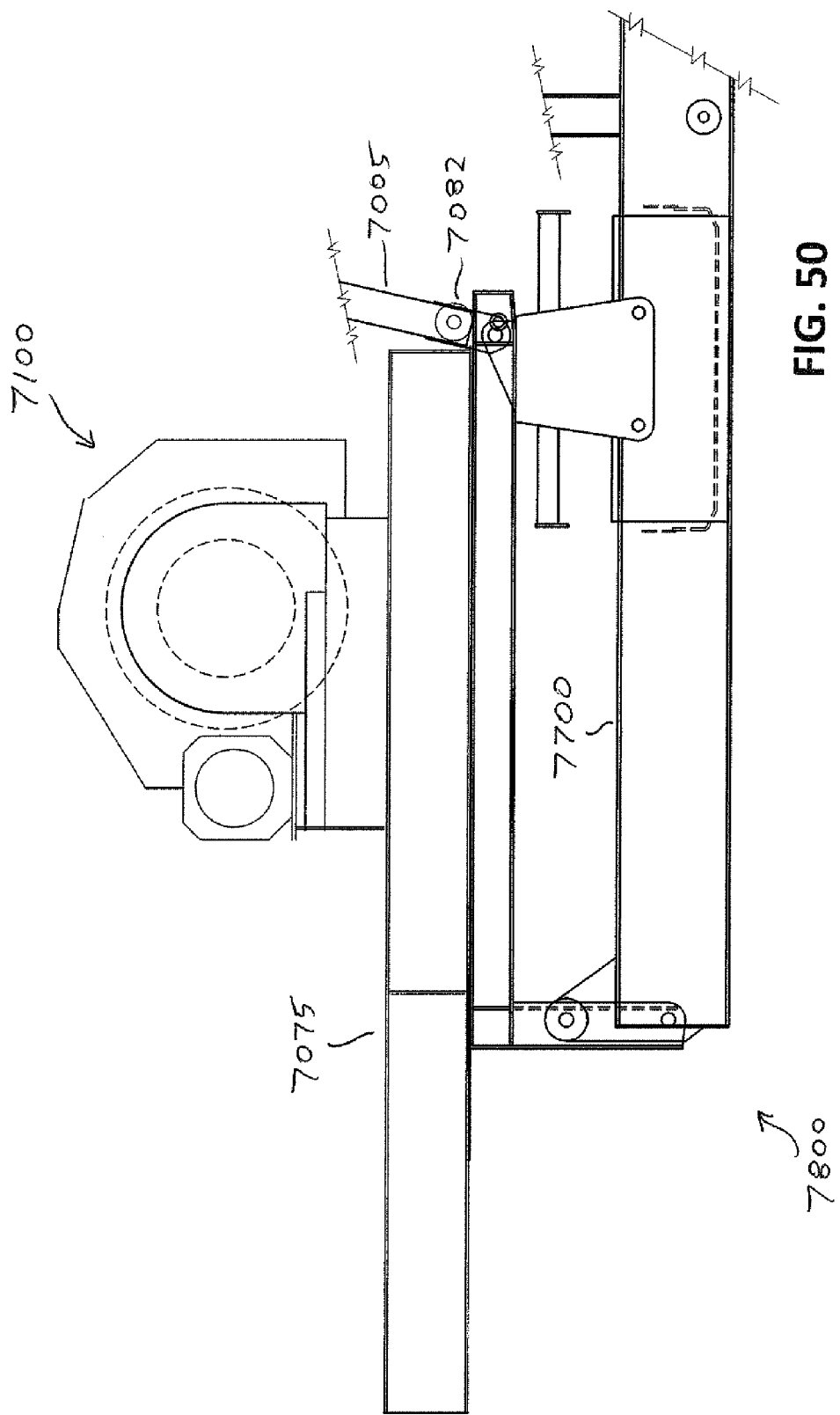
FIG. 50 illustrates another close up view of the lifting system of FIG. 41.

FIG. 50 illustrates a close up view of section 7800 of the lifting system 7000 of FIG. 41. The rear strut 7005 may be connected to the rear platform 7075 by lower rear strut connection 7082. The rear strut 7005 may be connected to the lower rear strut connection 7082 at a point above the transportation device 7050 (FIG. 41). In some examples, the rear platform 7075 may be configured to connect the rear strut 7005 to the base 7700. In some examples, the rear strut 7005 may be configured to diagonally connect the drill floor 7500 to a transportation device located in back of the drill floor 7500 and/or in back of the base 7700.

Figure 51:
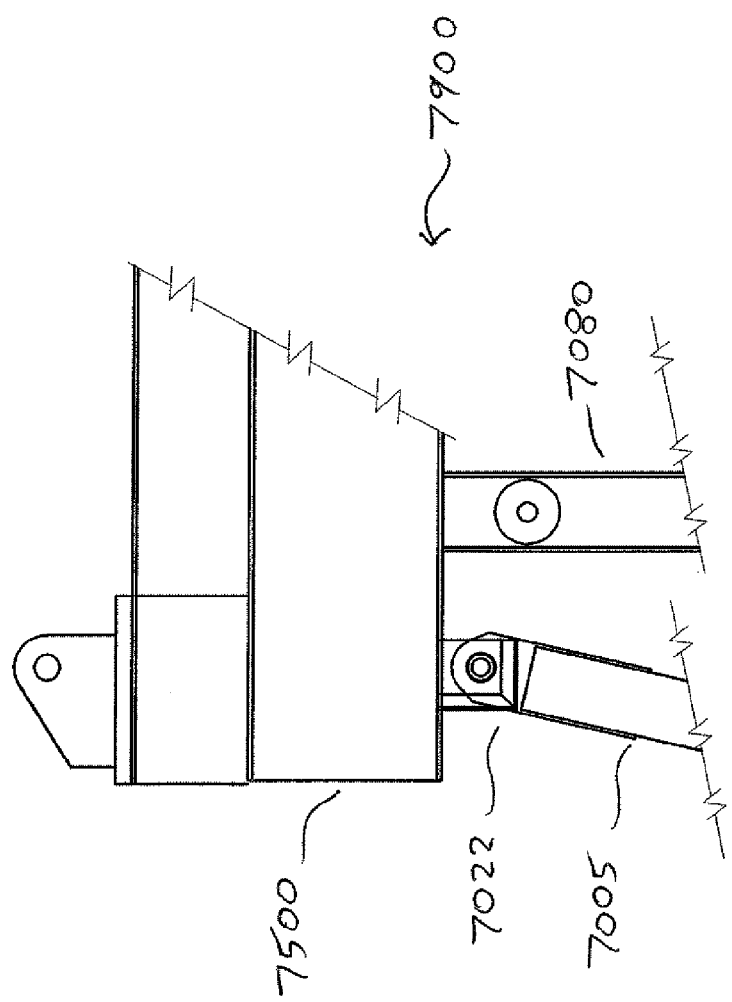
FIG. 51 illustrates another close up view of the lifting system of FIG. 41.

FIG. 51 illustrates a close up view of section 7900 of the lifting system 7000 of FIG. 41. Both the rear leg 7080 and the rear strut 7005 may be connected to the drill floor 7500. For example, an upper rear strut connection 7022 may be configured to connect the rear strut 7005 to the drill floor 7500. Additionally, one or more diagonal braces may be connected to the drill floor 7500.

Figure 52:
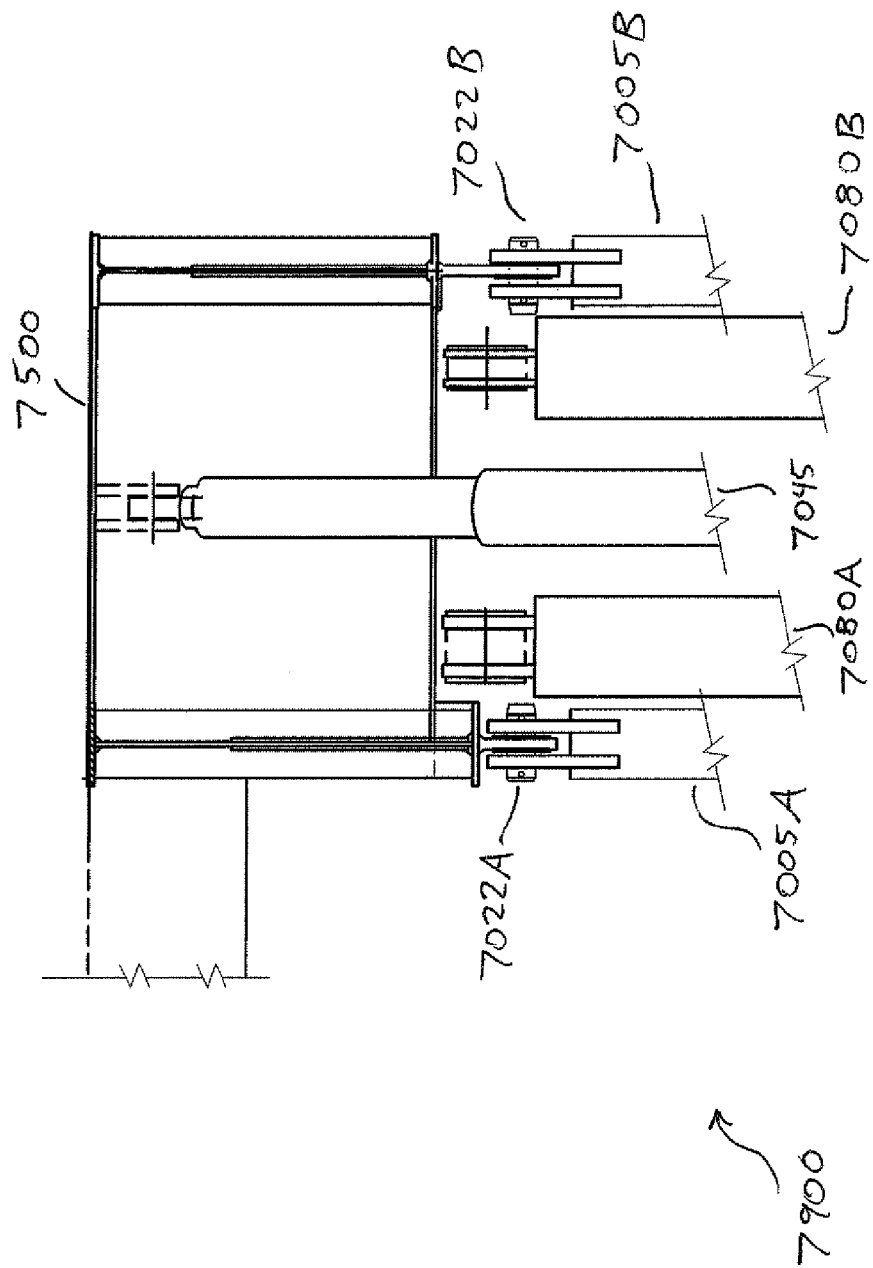
FIG. 52 illustrates a front view of the close up view of FIG. 51.

FIG. 52 illustrates a front view of section 7900 including a close up view of the first rear strut 7005A, the second rear strut 7005B, a first rear leg 7080A, and a second rear leg 7080B. The first rear strut 7005A may be connected to a first upper rear strut connection 7022A. Additionally, the second rear strut 7005B may be connected to a second upper rear strut connection 7022B.

Figure 53:
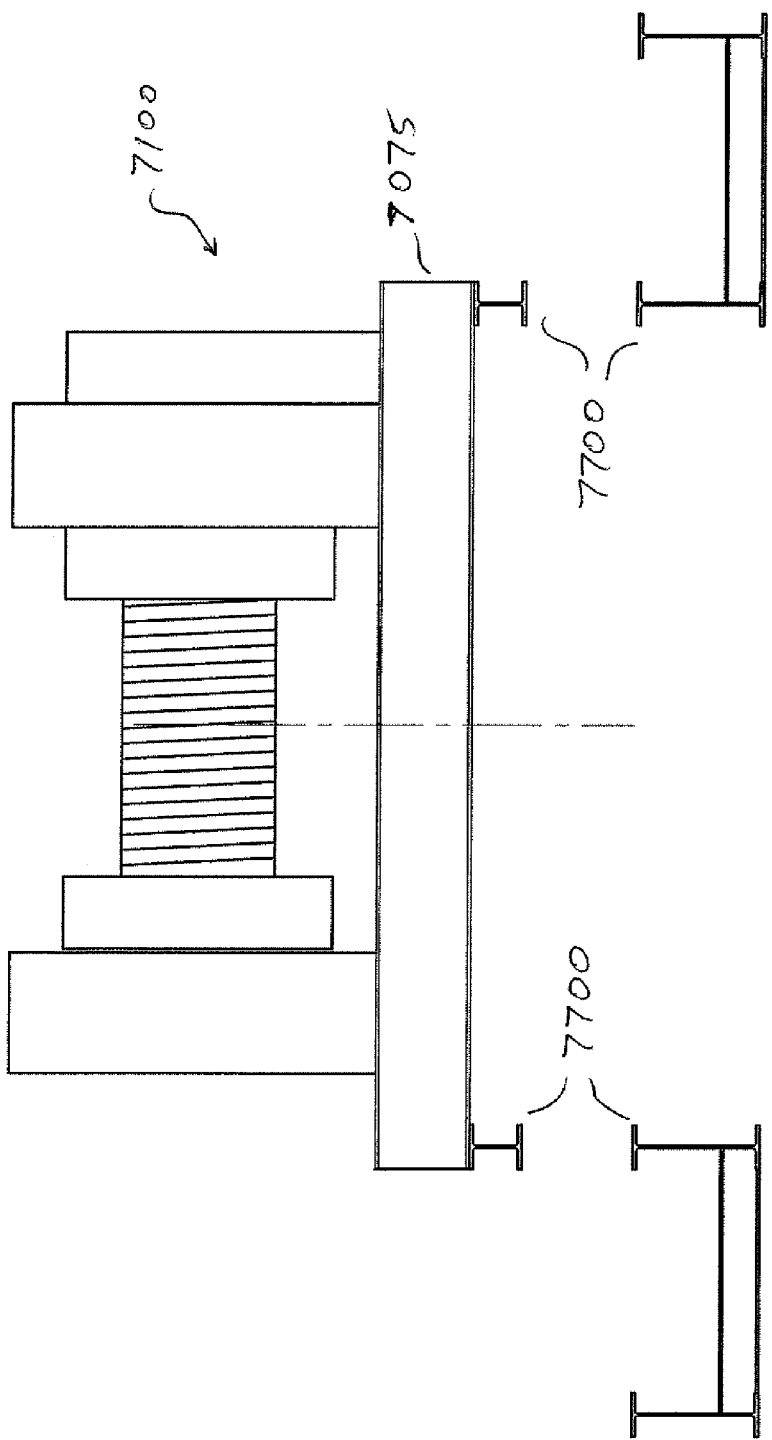
FIG. 53 illustrates a front view of the hoisting device mounted on a platform.

FIG. 53 illustrates a front view of the drawworks 7100 mounted on the platform 7075. The platform 7075 may be mounted on one or more beams, supports, braces, etc. of the base 7700. In some examples, the platform 7075 may be integral with, or be part of, the base 7700.

Figure 54:
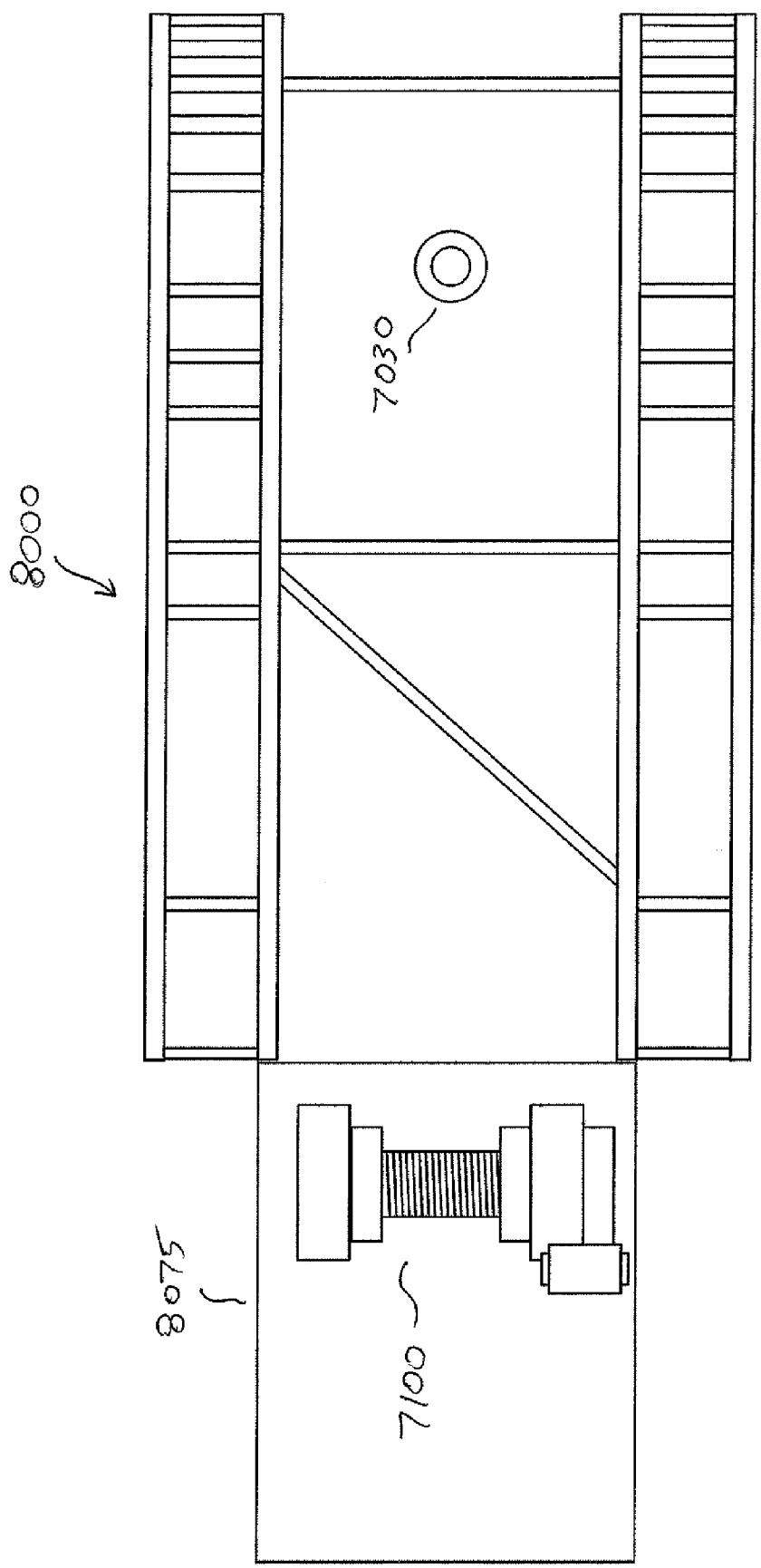
FIG. 54 illustrates an example lifting system for a rig with the hoisting device mounted in lowered position.

FIG. 54 illustrates an example lifting system 8000 for a rig with the drawworks 7100 mounted in lowered position. The rig may be placed over a well head 7030 such that a well head centerline is located between left and right sides of the lifting system 8000. The drawworks 7100 may be mounted to a rear platform 8075 located behind the rig. The rear platform 8075 may be placed on the ground. In some examples, the rear platform 8075 may be elevated from the ground on skids, such that as the lifting system 8000 is operated, the rear platform 8075 may provide clearance between the drawworks 7100 and the well head 7030 as the rig moves over the well head 7030. The rear platform 8075 may comprise an assembly of one or more beams, channels, or other supports that are configured to be attached to the rig. In some examples, the rear platform 8075 may comprise a planar platform that attaches to the rig.

The drawworks 7100 may be installed on the rear platform 8075 directly from a flatbed truck. The drawworks 7100 may be rolled off the back end of the truck onto the platform 8075, without any need for a crane, for example, to lift the drawworks 7100 onto the platform 8075. The rear platform 8075 may be mounted to a base of the rig.

Figure 55:
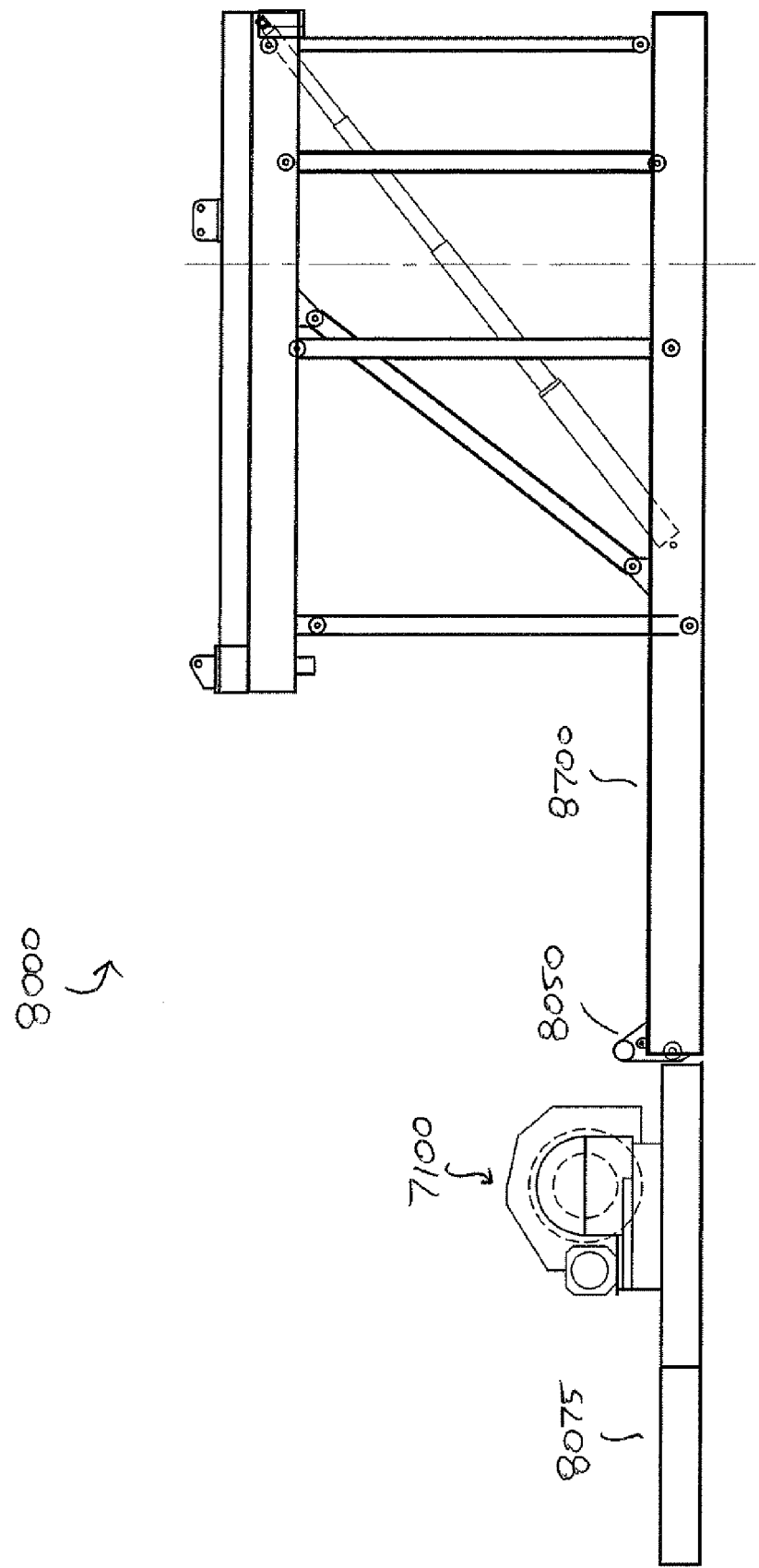
FIG. 55 illustrates a side view of the example lifting system of FIG. 54.

FIG. 55 illustrates a side view of the example lifting system 8000 of FIG. 54. The side view shows that the rear platform 8075 may be attached to the base 8700 of the rig by an attachment 8050. The attachment 8050 may be configured to pivot and/or rotate to allow the rear platform 8075 and drawworks 7100 to follow the rig when it is being moved.

Figure 56:
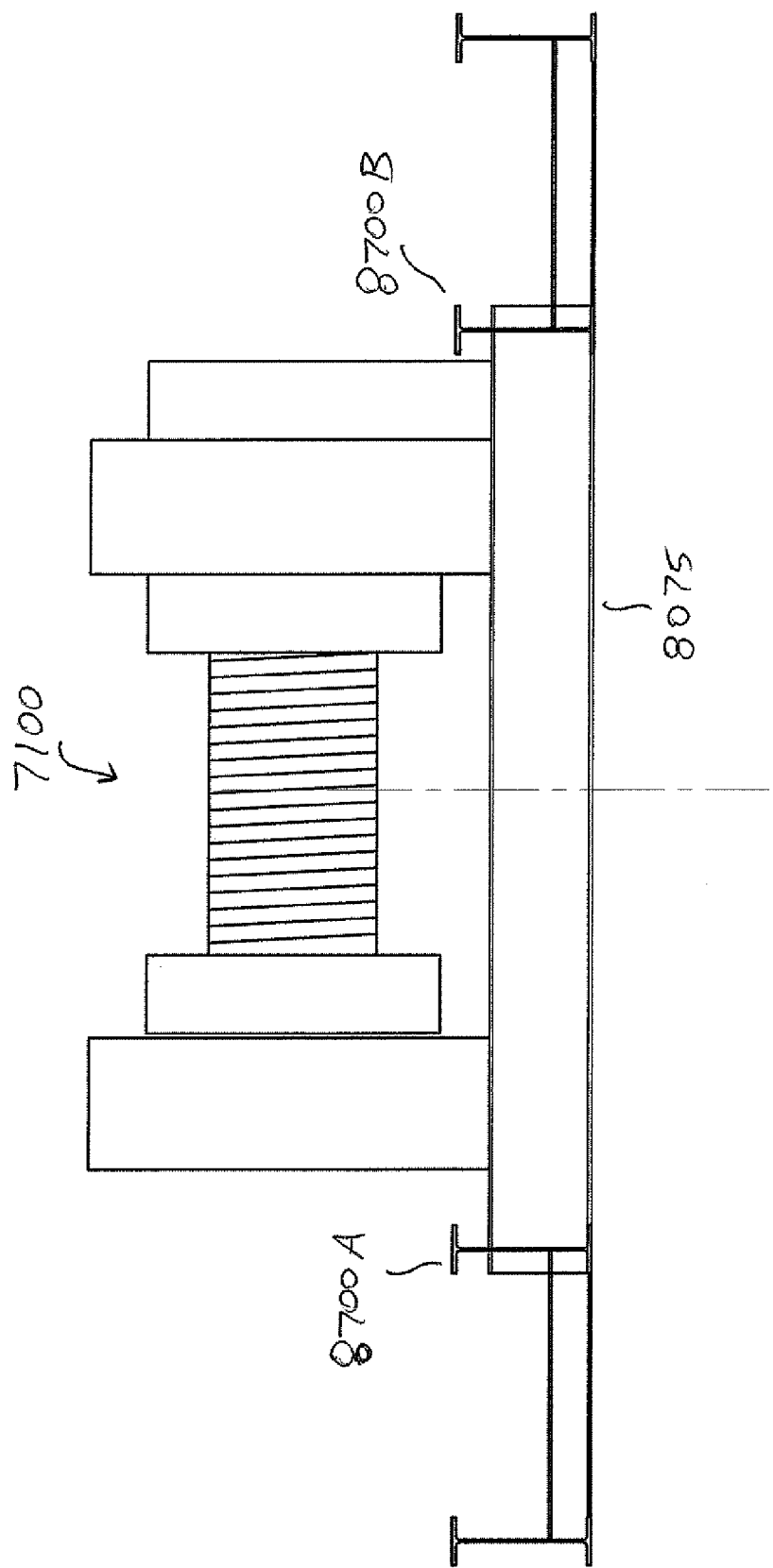
FIG. 56 illustrates a close up rear view of a hoisting device mounted on a rear platform.

FIG. 56 illustrates a close up rear view of the drawworks 7100 mounted on the rear platform 8075. The drawworks 7100 and rear platform 8075 are shown as being located approximately between a left side of the base 8700A and a right side of the base 8700B.

Figure 57:
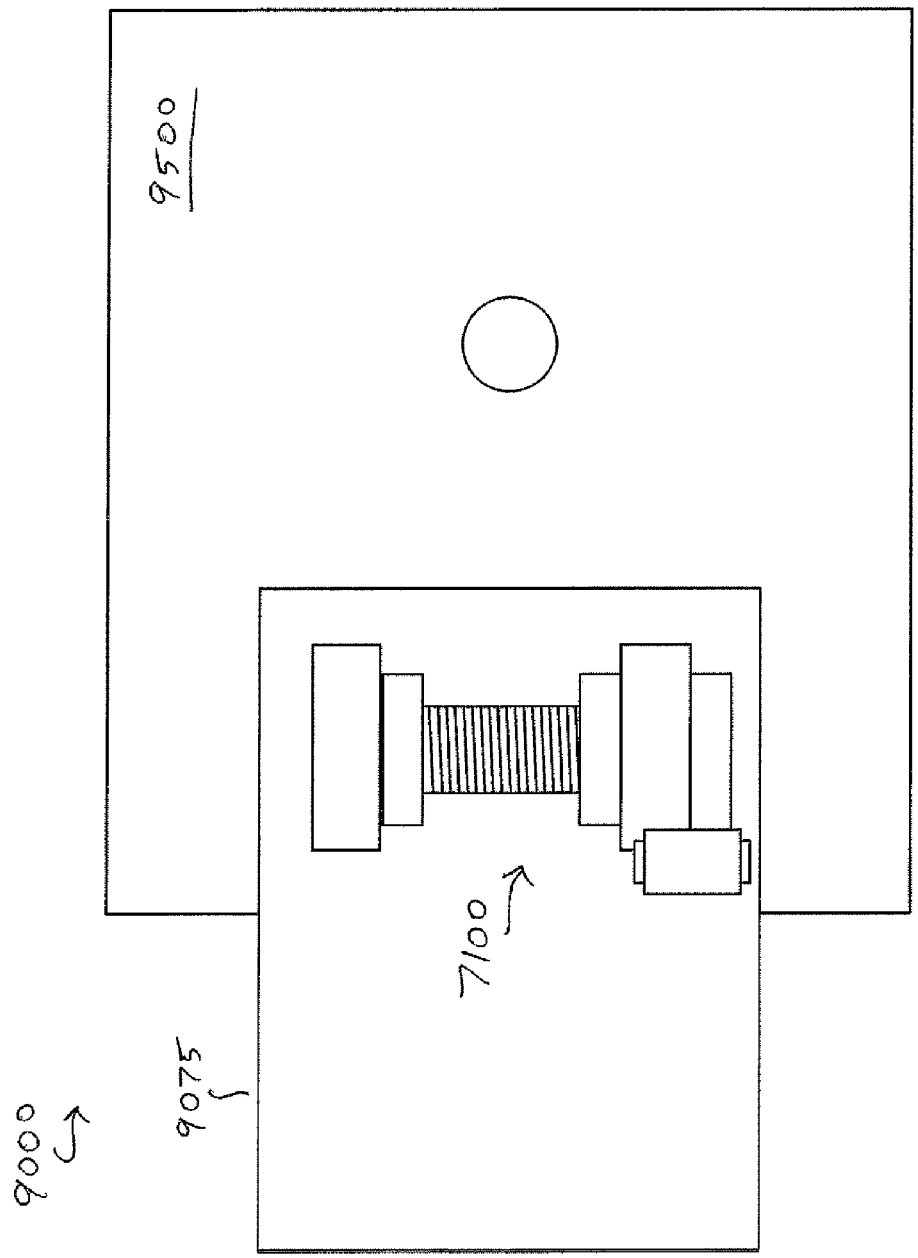
FIG. 57 illustrates an example lifting system for a rig with the hoisting device mounted above a rig floor.

FIG. 57 illustrates an example lifting system 9000 for a rig with the drawworks 7100 mounted above a rig floor 9500. In some examples, the drawworks 7100 may be installed on a raised platform 9075 mounted to the rig floor 9500.

Figure 58:
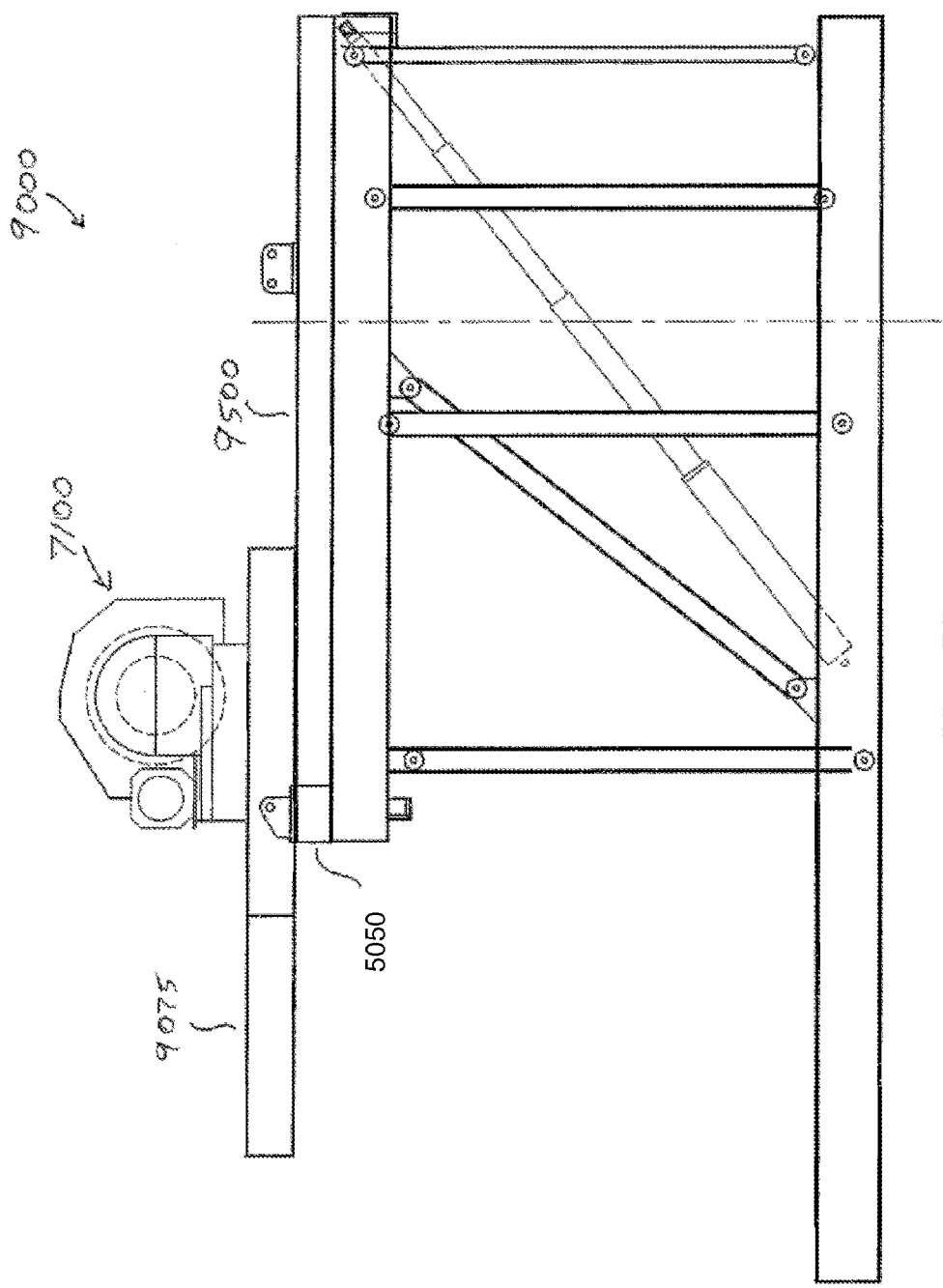
FIG. 58 illustrates a side view of the example lifting system of FIG. 57

FIG. 58 illustrates a side view of the example lifting system 9000 of FIG. 57. The side view shows that the raised platform 9075 may be attached to the rig floor 9500 of the rig by an attachment 5050.

Figure 59:
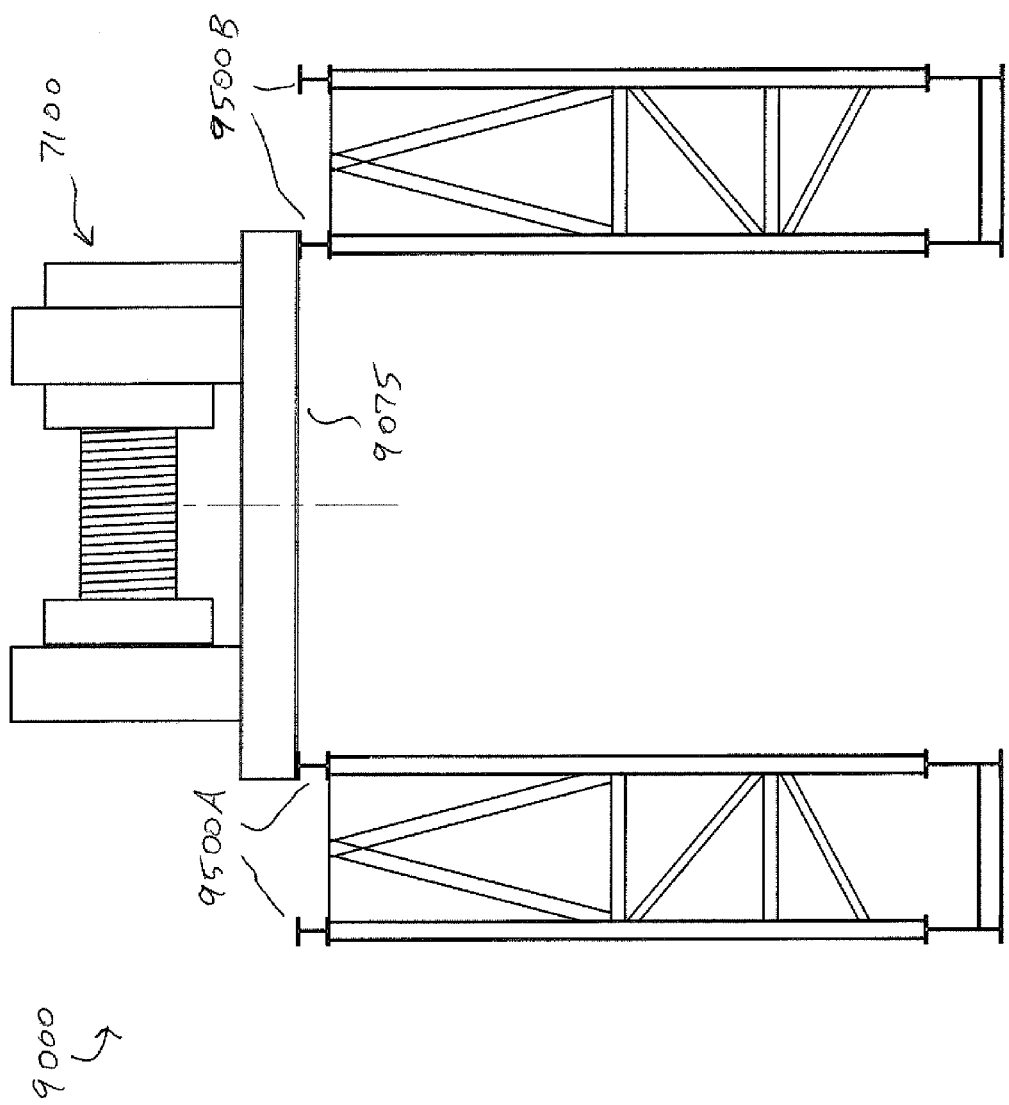
FIG. 59 illustrates a close up rear view of the hoisting device mounted on a raised platform.

FIG. 59 illustrates a close up rear view of the drawworks 7100 mounted on the raised platform 9075. The drawworks 7100 and raised platform 9075 are shown as being located approximately between a left side of the rig floor 9500A and a right side of the rig floor 9500B. In some examples, the raised platform 9075 is mounted to a top surface of the rig floor.

Figure 60:
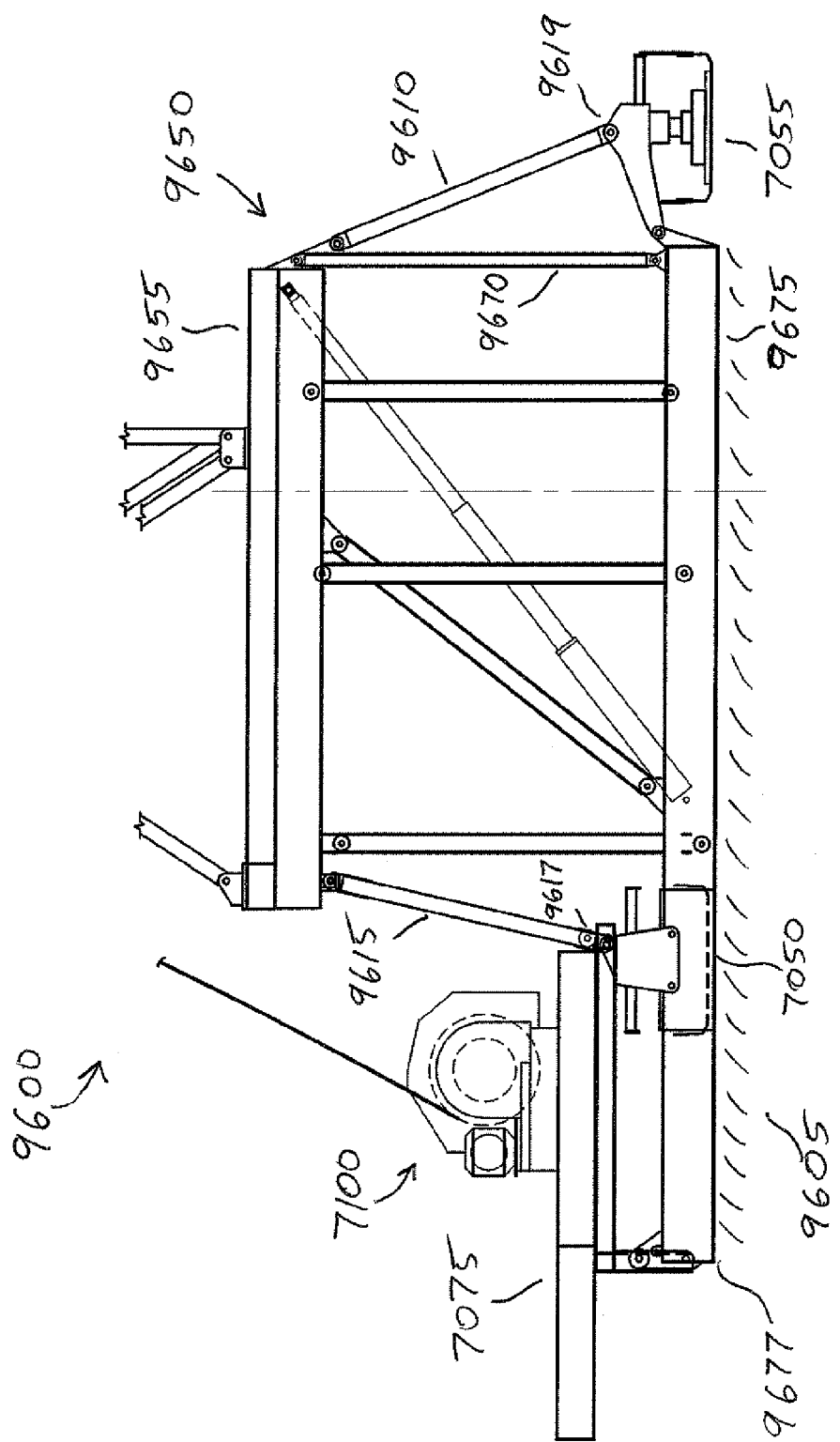
FIG. 60 illustrates a further example of a rig comprising a base structure in contact with an operating surface.

FIG. 60 illustrates a further example of a rig 9600 comprising a base structure 9675 in contact with an operating surface 9605. The operating surface 9605 may comprise ground, a platform, a pad, or any other kind of surface upon which the rig may be located on. The base structure 9675 may be configured to support the rig 9600 on the operating surface 9605.

A transportation system may include one or more transportation devices 7050, 7055 operatively coupled to the base structure 9675 and configured to position the rig 9600 over an extraction point. A raised platform 9655 may be connected to the base structure 9675 by a plurality of support beams, such as vertical support beam 9670. The drawworks 7100 may be supported by and/or mounted to base structure 9675.

The base structure 9675 may comprise a portion 9677 that extends laterally outside of the raised platform 9655. The drawworks 7100 may be positioned on the portion 9677 of the base structure 9675 which is located laterally outside of the raised platform 9655. The portion 9677 of the base structure 9675 may comprise a rear end of the rig 9600, and the plurality of support beams may comprise a diagonal strut 9615 connecting the base structure 9675 to an end of the raised platform 9655 located towards the rear end of the rig 9600.

The first transport device 7050 may be configured to lift the rear end of the rig 9600. The diagonal strut 9615 may be connected to the base structure 9675 at a connection point 9617 located above the first transport device 7050. The connection point 9617 may be located at an end of the rear platform.

A rear platform 7075 may be attached to the portion 9677 of the base structure 9675 which is located laterally outside of the raised platform 9655. Rear platform 7075 may be configured to mount the drawworks 7100 on the base structure 9675 and to provide a clearance between the drawworks 7100 and a well head located above an extraction point.

The second transport device 7055 may be configured to lift a front end of the rig 9600 opposite the rear end, and the plurality of support beams comprise a second diagonal strut 9610 connecting a second end of the raised platform located towards the front end of the rig 9600 to a second connection point 9619 located above the second transport device 7055. In some examples, the second transport device 7055 may be located in front of the rig 9600.

Rear platform 7075 may comprise a mounting structure that is attached to the portion 9677 of the base structure 9675 which is located laterally outside of the raised platform 9655. The mounting structure may be connected to the base structure 9675 at both a left side of the rig 9600 and a right side of the rig 9600. The drawworks 7100 may be positioned on the mounting structure at an intermediate position between the left side of the rig 9600 and the right side of the rig 9600. In some examples, the mounting structure may be located above the base structure 9675 to provide a clearance between the drawworks 7100 and a well head located above an extraction point.

Figure 61:
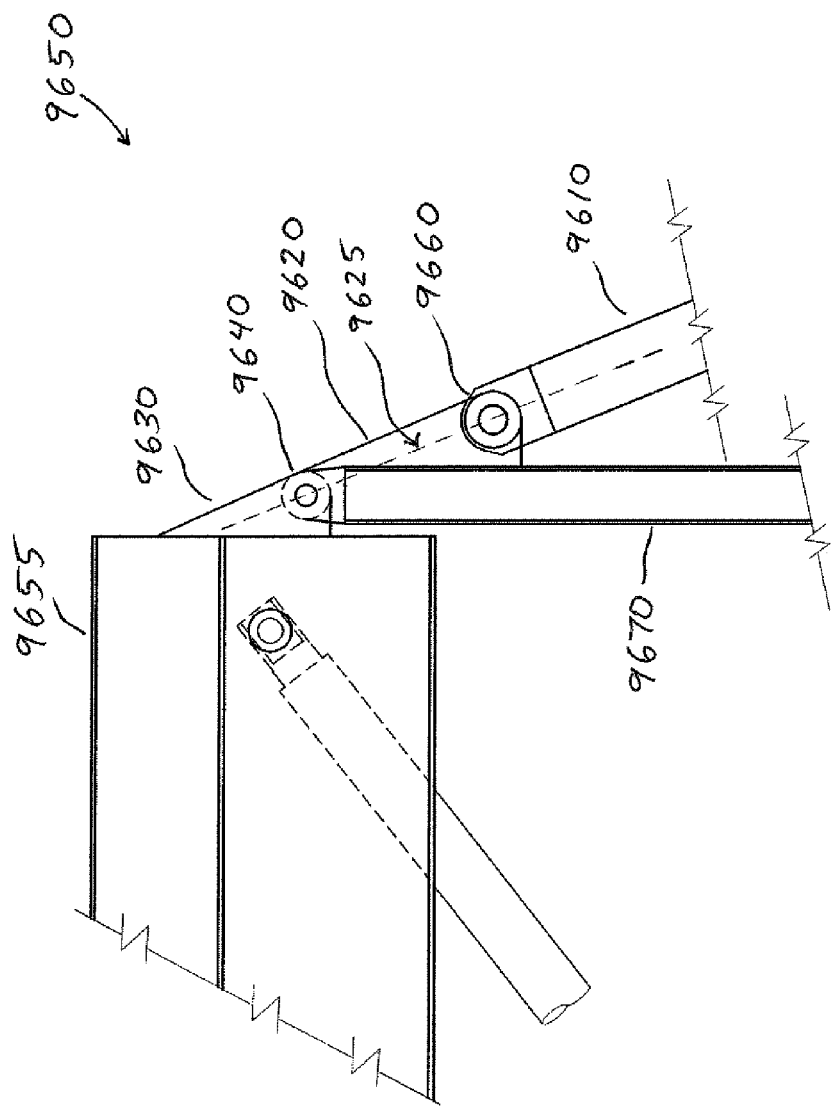
FIG. 61 illustrates a close up of section of FIG. 60, showing a connection of diagonal strut 9610 to vertical support beam.

FIG. 61 illustrates a close up of section 9650 of FIG. 60, showing a connection of diagonal strut 9610 to vertical support beam 9670. Vertical support beam 9670 may be connected to raised platform 9655 by a platform bracket 9630. An upper end of vertical support beam 9670 may be attached to the platform bracket 9630 at connection point 9640. Additionally, diagonal strut 9610 may be connected to vertical support beam 9670 by a support beam bracket 9620. An upper end of diagonal strut 9610 may be attached to the support bracket 9620 at connection point 9660. In some examples, a longitudinal centerline 9625 of diagonal strut may pass through one or both of connection point 9640 and connection point 9660.

Figure 62:
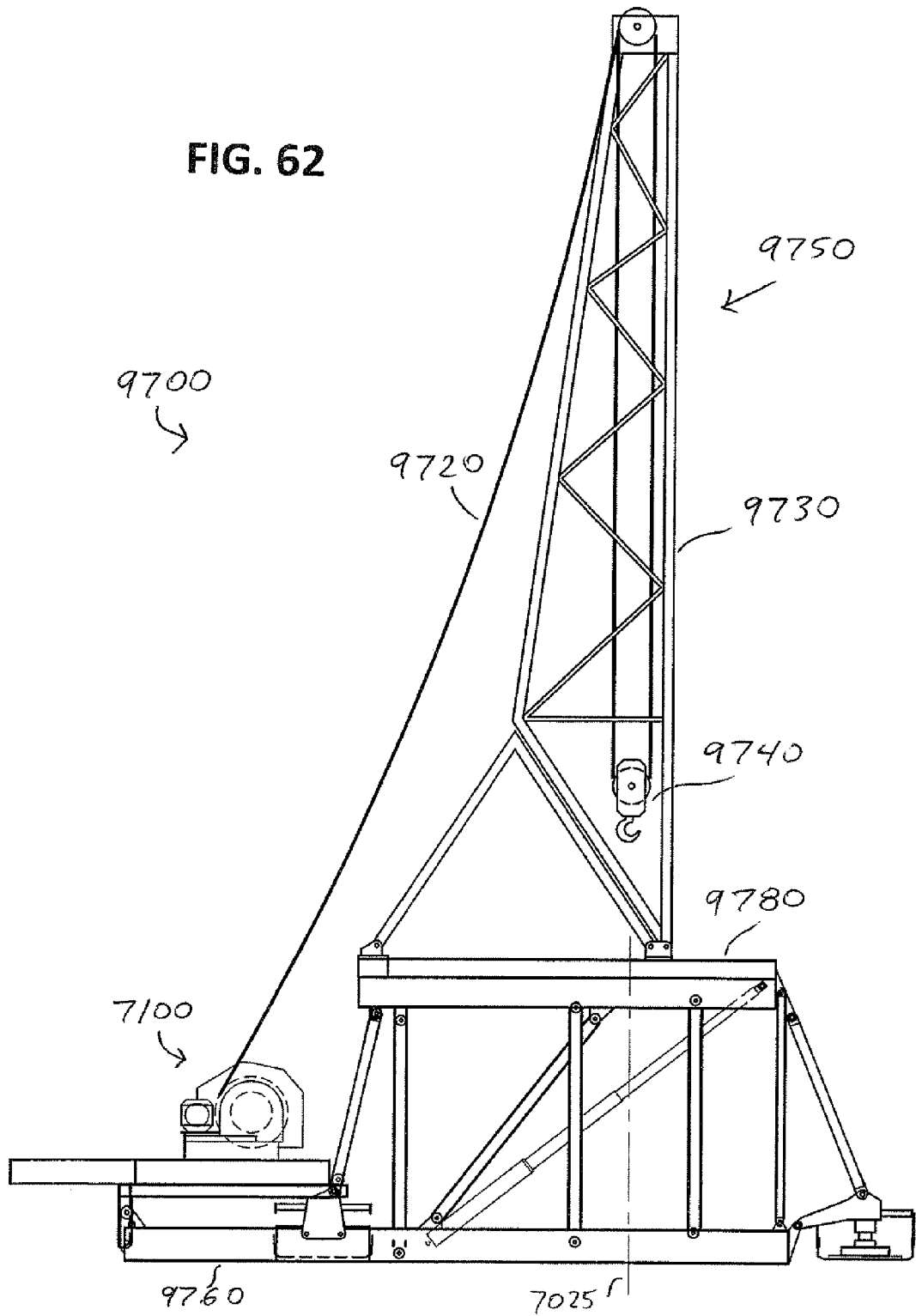
FIG. 62 illustrates an example of a rig comprising drawworks supported on a base structure and operatively connected to a hoisting device.

FIG. 62 illustrates an example of a rig 9700 comprising drawworks 7100 supported on a base structure 9760 and operatively connected to a hoisting device 9750. Hoisting device 9750 may be connected to and/or mounted on a raised platform 9780. Additionally, hoisting device may comprise a cable 9720 and a mast 9730. Drawworks 7100 may be operatively connected to the hoisting device 9750 via cable 9720 to raise and lower one or more traveling blocks 9740. The travelling blocks 9740 may be configured to raise and/or lower pipes, lines, drill collars, casing, or tubing along well head centerline 7025 into an extraction point.

Figure 63:
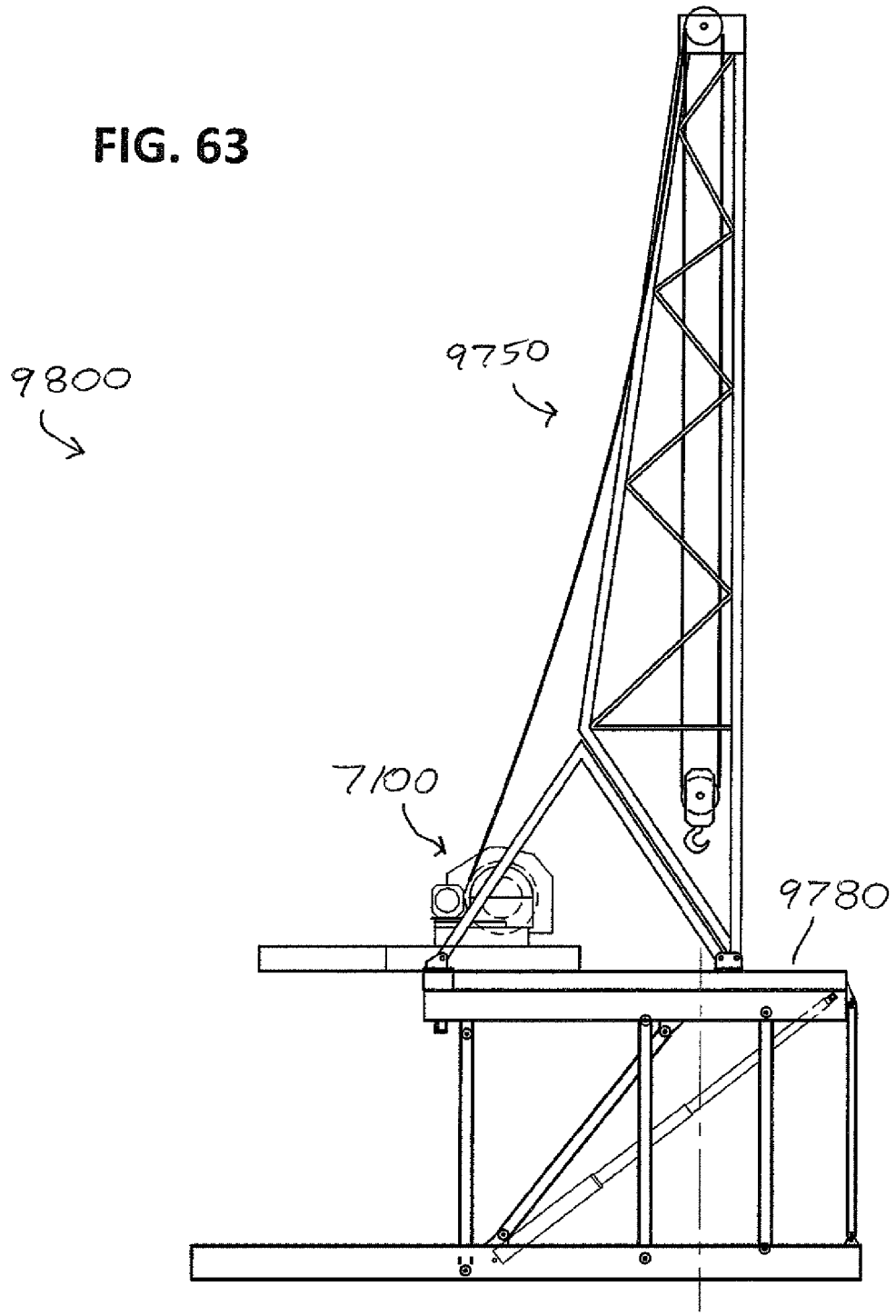
FIG. 63 illustrates an example of a rig comprising drawworks supported by a raised platform and operatively connected to hoisting device.

FIG. 63 illustrates an example of a rig 9800 comprising drawworks 7100 supported by a raised platform 9780 and operatively connected to hoisting device 9750. In some examples, drawworks 7100 may be supported by and/or mounted on raised platform 9780 in a similar manner as described with respect to FIG. 58.

Figure 64:
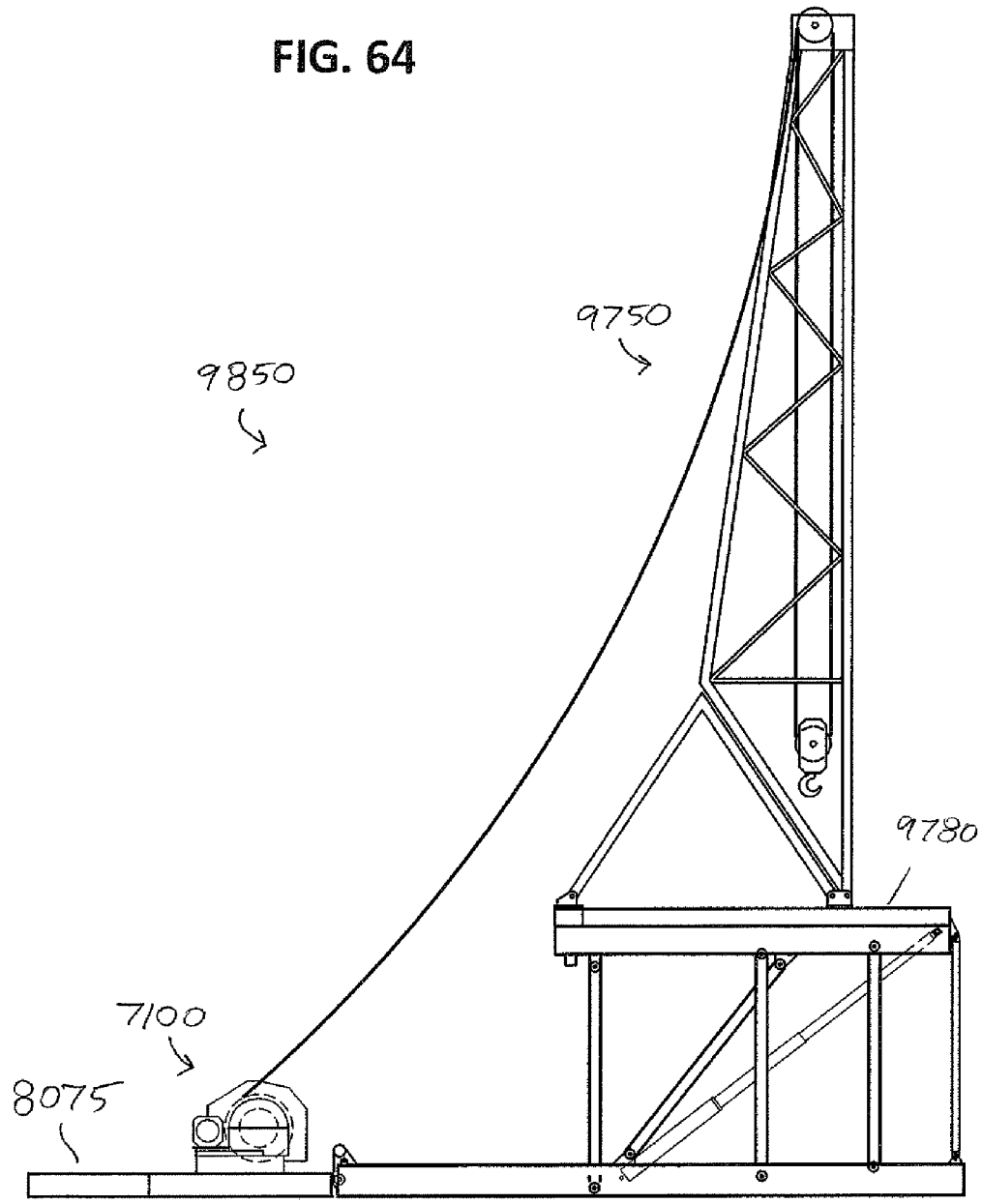
FIG. 64 illustrates an example of a rig comprising drawworks mounted on rear platform and operatively connected to hoisting device.

FIG. 64 illustrates an example of a rig 9850 comprising drawworks 7100 mounted on rear platform 8075 and operatively connected to hoisting device 9750. In some examples, drawworks 7100 may be supported by and/or mounted on rear platform 8075 in a similar manner as described with respect to FIG. 55.

Figure 65:
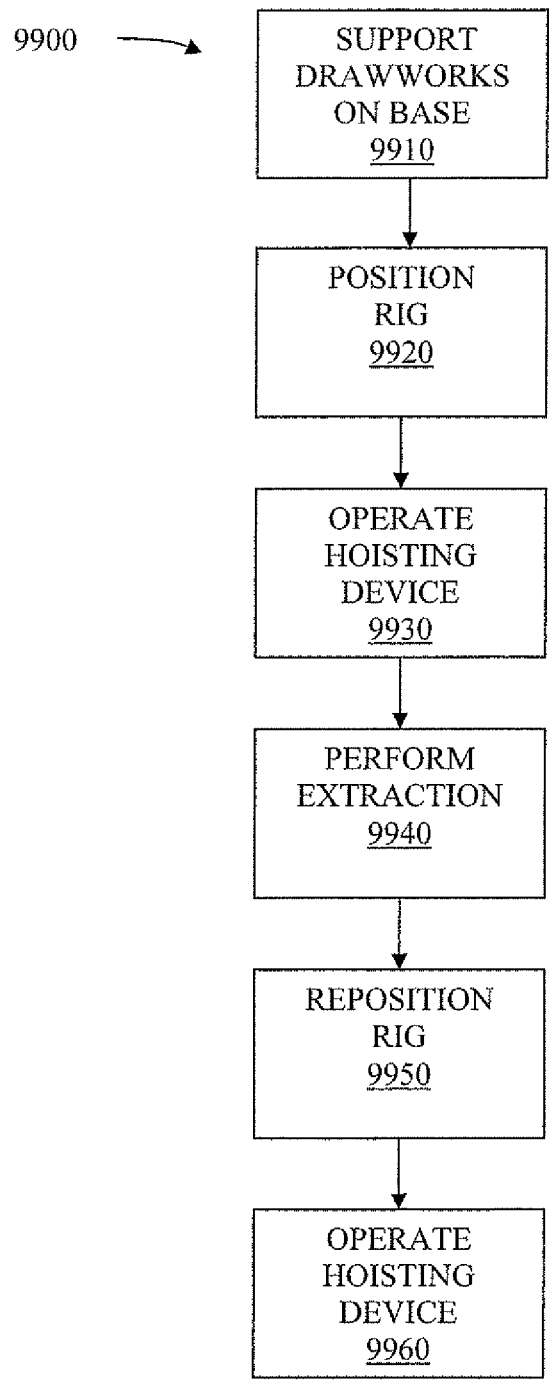
FIG. 65 illustrates a method of operating a rig.

FIG. 65 illustrates a method 9900 of operating a rig. At operation 9910, a drawworks may be supported on a base structure of the rig. The base structure may be connected to a raised platform of the rig with one or more support beams. In some examples, at least one of the support beams may comprise a diagonal strut connecting the raised platform to the base structure at a rear end of the rig. The base structure may be located below a raised platform. In some examples, the drawworks may be positioned at an elevation that is between a top surface of the base structure and a lower surface of the raised platform.

At operation 9920, the rig may be positioned over an extraction point. The rig may be positioned by a first transport system positioned at the rear end of the rig and a second transport system positioned at a front end of the rig, opposite the rear end. The rig may be positioned by raising the rear end of the rig with the first transport system. In some examples, the diagonal strut may be connected to a first connection point located above the first transport system. Positioning the rig may further comprise raising the front end of the rig with the second transport system. A second diagonal strut may be connected at a second connection point located above the second transport system. The second transport system may be located in front of the base structure. In some examples, the rig may be positioned by the first transport system and the second transport system by moving both the rig and the drawworks with the rig located in a raised position.

At operation 9930, the drawworks may operate a hoisting device supported by the raised platform. The hoisting device may be operatively connected to the drawworks. The drawworks may be supported by the base structure in an elevated position. The extraction point may comprise a raised well head having a vertical height, and a lower clearance of the drawworks in an elevated position may be greater than the vertical height of the raised well head.

At operation 9940, an extraction of a petroleum-based resource may be performed at a first, or initial, extraction point.

At operation 9950, the rig may be repositioned or moved to a new location, such as a second extraction point, following the extraction process at the initial extraction point. The rig may be repositioned by lifting the rig with the first transport system and the second transport system while the drawworks is supported by the base structure. In some examples, both a raised well head and the drawworks may be located between a left side of the rig and a right side of the rig. The drawworks may be configured to travel or pass directly over the raised well head when the rig is moved to the new location. The rig may be repositioned by moving the rig from the initial location to the new location while the drawworks is supported by the base structure.

At operation 9960, the drawworks may again operate the hoisting device, for example, during a second extraction process at the new location.

Some or all of the connections discussed above with respect to FIGS. 41-65 may be configured to allow the drill floor 7500 to collapse down to the base 7700 during breakdown or transportation of the rig to a drill site. In some examples, the connections provide pivot points where they connect to one or more of the struts, braces, and/or legs.

A rig may be modified with one or more of the struts, legs, braces, connections, and/or structural features described with reference to FIGS. 41-65 to enable the placement of a drawworks on a rig and/or rig platform. The placement of the structural features, such as the struts, provides the ability to maintain a structural load path of the original rig design while drilling, after the rig has been modified.

Some examples have been described above, and in addition, some specific details are shown for purposes of illustrating the inventive principles. However, numerous other arrangements may be devised in accordance with the inventive principles of this patent disclosure. Further, well known processes have not been described in detail in order not to obscure the novel features. Thus, while examples are described in conjunction with the specific embodiments illustrated in the drawings, the examples are not limited to these embodiments or drawing

The invention claimed is:

1. A rig, comprising:
   a base structure in contact with an operating surface and configured to support the rig on the operating surface;
   a raised platform connected to the base structure by a plurality of support beams, wherein a first portion of the base structure extends laterally outside of the raised platform towards a rear end of the rig, and wherein a second portion of the base structure extends in contact with the operating surface from directly below a first end of the raised platform located towards the rear end of the rig to directly below a second end of the raised platform located towards a front end of the rig, opposite the rear end of the rig;
   a transportation system operatively coupled to the base structure, wherein the transportation system comprises a first transport device located towards the rear end of the rig and configured to lift the rear end of the rig and a second transport device located towards a front end of the rig and configured to lift the front end of the rig, wherein the second transport device is located in front of the second portion of the base structure, and wherein the transportation system is configured to position the rig over an extraction point;
   a hoisting device connected to the raised platform;
   a rear platform attached to the second portion of the base structure, wherein at least a portion of the rear platform is located above the base structure; and
   a drawworks mounted on the rear platform and operatively connected to the hoisting device, wherein the rear platform is configured to provide a clearance between the drawworks and a well head located above the extraction point.

2. The rig of claim 1, wherein the hoisting device comprises a cable and a mast.

3. The rig of claim 1, wherein the raised platform is further connected to the base structure by a hydraulic cylinder.

4. The rig of claim 1, wherein the rear platform is connected to the base structure at both a left side of the rig and a right side of the rig, and wherein the drawworks is positioned on the rear platform at an intermediate position between the left side of the rig and the right side of the rig.

5. The rig of claim 4, wherein the entirety of the rear platform is located above the base structure.

6. The rig of claim 1, wherein the base structure comprises two beams extending parallel to each other along the operating surface from below the raised platform toward the rear end of the rig, wherein the first transport device is located between the two beams, and wherein the first transport device is configured to rotate while remaining between the two beams.

7. The rig of claim 1, wherein the plurality of support beams comprise:
   a first diagonal strut connecting the first end of the raised platform to the base structure at a first connection point located directly above the first transport device; and
   a second diagonal strut connecting the second end of the raised platform to the base structure at a second connection point located directly above the second transport device.

8. A rig, comprising:
   a base structure in contact with an operating surface and configured to support the rig on the operating surface;
   a raised platform connected to the base structure by a plurality of support beams, wherein a first portion of the base structure extends laterally outside of the raised platform toward a rear end of the rig, and wherein a second portion of the base structure extends in contact with the operating surface from directly below a first end of the raised platform located towards the rear end of the rig to directly below a second end of the raised platform located towards a front end of the rig, opposite the rear end of the rig;
   a transportation system operatively coupled to the base structure, wherein the transportation system is configured to position the rig over an extraction point, and wherein the transportation system comprises:
      a first transport device configured to lift the first portion of the base structure; and
      a second transport device located towards a front end of the rig and configured to lift the front end of the rig, wherein the second transport device is located in front of the second portion of the base structure;
   a hoisting device connected to the raised platform; and
   a drawworks supported on the base structure and operatively connected to the hoisting device, wherein the drawworks is mounted on a rear platform, and wherein the rear platform is located above the first portion of the base structure.

9. The rig of claim 8, wherein the second transport device is further located at a front end of the rig.

10. The rig of claim 8, wherein the plurality of support beams comprise:
    a first diagonal strut connecting the first end of the raised platform to the base structure at a first connection point located above the first transport device; and
    a second diagonal strut connecting the second end of the raised platform to the base structure at a second connection point located above the second transport device.

11. The rig of claim 8, wherein the base structure comprises a first beam and a second beam continuously extending parallel to each other along the contact surface from at least the first end of the raised platform to the second end of the raised platform, wherein the first beam passes by the first transport device on a first side and the second beam passes by the first transport device on a second side opposite the first side, and wherein the first transport device is configured to rotate without interference from the first beam or the second beam.

12. The rig of claim 8, further comprising a base connection connecting the second transport device to the base structure, wherein the base structure maintains spacing between the second transport device and the base structure.

13. A method of operating a rig having a drawworks located on a base structure of the rig, wherein the base structure is connected to a raised platform of the rig with one or more support beams, wherein a first portion of the base structure extends laterally outside of the raised platform towards a rear end of the rig, and wherein a second portion of the base structure extends in contact with an operating surface from directly below a first end of the raised platform located towards the rear end of the rig to directly below a second end of the raised platform located towards a front end of the rig, opposite the rear end of the rig, and wherein the drawworks is supported by the base structure in an elevated position, comprising:
    positioning the rig over an extraction point, wherein the rig is positioned by a first transport system positioned at the rear end of the rig and a second transport system located towards the front end of the rig and configured to lift the front end of the rig, wherein the second transport system is located in front of the second portion of the base structure, wherein the extraction point comprises a raised well head having a vertical height, and wherein a lower clearance of the drawworks in the elevated position is greater than the vertical height of the raised well head, and wherein positioning the rig comprises:
- raising the rear end of the rig with the first transport system;
- raising the front end of the rig with the second transport system; and
- moving, with the first transport system and the second transport system, both the rig and the drawworks with the rig located in a raised position;

operating, with the drawworks, a hoisting device supported on the raised platform and operatively connected to the drawworks to perform an extraction process at the extraction point; and moving the rig to a new location using the first transport system and the second transport system, following the extraction process at the extraction point, wherein the well head passes between a left side of the rig and a right side of the rig for a length of the rig extending from the front end of the rig to the rear end of the rig, and wherein the drawworks passes directly over the raised well head when the rig is moved to the new location.

14. The method of claim 13, wherein positioning the rig further comprises moving the rig from an initial location to the extraction point while the drawworks is supported by the base structure.

15. The method of claim 13, wherein the drawworks is mounted on a rear platform, wherein the rear platform is attached to the first portion of the base structure, and wherein at least a portion of the rear platform is mounted above the base structure.

16. The method of claim 13, wherein positioning the rig comprises lifting the rig with the first transport system and the second transport system while the drawworks is supported by the base structure, and wherein both the drawworks and the base structure are lifted together with the rig.

17. The method of claim 13, wherein the base structure is located below the raised platform, and wherein supporting the drawworks comprises positioning the drawworks at an elevation that is between a top surface of the base structure and a lower surface of the raised platform.

18. A rig, comprising:
- a base structure in contact with an operating surface and configured to support the rig on the operating surface;
- a transportation system operatively coupled to the base structure and configured to position the rig over an extraction point, wherein the transportation system comprises a first transport device located towards a front end of the rig and configured to lift the front end of the rig and a second transport device configured to lift a rear end of the rig;
- a raised platform connected to the base structure by a plurality of support beams, wherein a first portion of the base structure extends laterally outside of the raised platform toward the rear end of the rig, wherein a second portion of the base structure extends in contact with the operating surface from directly below a first end of the raised platform located towards the rear end of the rig to directly below a second end of the raised platform located towards the front end of the rig, opposite the rear end of the rig, and wherein the first transport device is located in front of the second portion of the base structure;
- a hoisting device comprising:
  - a mast having a lower end connected to the raised platform;
  - a cable, wherein the cable passes over a top end of the mast; and
  - travelling blocks operatively coupled to the cable;
- a drawworks supported on the base structure and operatively configured to raise and lower the travelling blocks via the cable, wherein the drawworks is located intermediate the raised platform and the base structure; and
- a rear platform connected to the base structure, wherein at least a portion of the rear platform resides above the base structure, wherein the drawworks is mounted to the rear platform, wherein a lower clearance of the rear platform is greater than a vertical height of a raised well head, and wherein when the rig is moved by the first transport device and the second transport device following an extraction process at the raised well head, the well head passes between a left side of the rig and a right side of the rig for a length of the rig extending from the front end of the rig to the rear end of the rig, and the rear platform passes directly over the raised well head.

19. The rig of claim 18, wherein the mast comprises a plurality of diagonal struts.

20. The rig of claim 18, wherein the plurality of support beams comprise:
- a first diagonal strut, wherein the first diagonal strut connects the raised platform to the base structure at a first connection point located directly above the first transport device; and
- a second diagonal strut, wherein the second diagonal strut connects the raised platform to the base structure at a second connection point located directly above the second transport device.

21. The rig of claim 18, wherein the second transport device is located between two beams continuously extending parallel to each other along the contact surface from at least the first end of the raised platform to the second end of the raised platform, and wherein the rear platform resides above the portion of the base structure extending laterally outside of the raised platform.

22. The rig of claim 18, wherein a base connection connects the first transport device to the base structure, and wherein the base connection creates a gap between the first transport device and the base structure.

* * * * *